(12) United States Patent
Bonev et al.

(10) Patent No.: US 8,510,123 B2
(45) Date of Patent: *Aug. 13, 2013

(54) COMMUNICATIONS SYSTEM AND METHOD FOR SERVING ELECTRONIC CONTENT

(75) Inventors: Robert Bonev, Grand Forks, ND (US); Samuel Louis Palahnuk, Burbank, CA (US)

(73) Assignee: Smooth Productions Inc., Wilmington, DE (US)

( * ) Notice: Subject to any disclaimer, the term of this patent is extended or adjusted under 35 U.S.C. 154(b) by 629 days.

This patent is subject to a terminal disclaimer.

(21) Appl. No.: 12/337,622

(22) Filed: Dec. 17, 2008

(65) Prior Publication Data

US 2009/0157513 A1   Jun. 18, 2009

Related U.S. Application Data

(60) Provisional application No. 61/051,339, filed on May 7, 2008, provisional application No. 61/014,422, filed on Dec. 17, 2007, provisional application No. 61/073,650, filed on Jun. 18, 2008.

(51) Int. Cl.
*G06Q 10/00* (2006.01)
(52) U.S. Cl.
USPC .......................................................... 705/1.1
(58) Field of Classification Search
USPC ............................................. 705/1.1, 14.4, 5
See application file for complete search history.

(56) References Cited

U.S. PATENT DOCUMENTS

| | | | |
|---|---|---|---|
| 6,369,840 B1 | 4/2002 | Barnett et al. | |
| 6,480,830 B1 | 11/2002 | Ford et al. | |
| 6,590,568 B1 | 7/2003 | Astala et al. | |
| 6,654,789 B1 | 11/2003 | Bliss et al. | |
| 6,694,353 B2 | 2/2004 | Sommerer | |
| 6,820,204 B1 | 11/2004 | Desai et al. | |
| 6,978,246 B1 | 12/2005 | Ruvolo et al. | |
| 7,103,563 B1 * | 9/2006 | Voisin et al. | 705/14.54 |
| 7,117,254 B2 | 10/2006 | Lunt et al. | |
| 7,383,254 B2 | 6/2008 | Wen et al. | |
| 7,441,194 B2 | 10/2008 | Vronay et al. | |
| 7,519,663 B1 | 4/2009 | Bostick et al. | |
| 7,526,762 B1 | 4/2009 | Astala et al. | |

(Continued)

FOREIGN PATENT DOCUMENTS

KR   10-2005-0055657   6/2005

OTHER PUBLICATIONS

First page of free calendar Website "www.famundo.com" copyright 2008 by Famundo LLC.

(Continued)

*Primary Examiner* — Shannon Campbell
(74) *Attorney, Agent, or Firm* — Andrew Bodendorf

(57) ABSTRACT

A network system for serving digital content to a graphical user interface of a user device is provided. The system includes a database storing user data including user preferences and events in a calendar of a system user; a processor configured to automatically scan the database to determine an event scheduled for a predetermined window of time; to automatically determine the event is associated with entertainment of the user and access one or more entertainment services, and to prepare content conveying an entertainment package customized to the event of the user; and a server to serve the content for presentation by the graphical user interface.

23 Claims, 65 Drawing Sheets

(56) References Cited

U.S. PATENT DOCUMENTS

| | | |
|---|---|---|
| 7,673,248 B2 | 3/2010 | Narayanaswami |
| 7,721,210 B2 | 5/2010 | Mansikkaniemi et al. |
| 7,747,966 B2 | 6/2010 | Leukart et al. |
| 7,788,598 B2 | 8/2010 | Bansal et al. |
| 7,930,640 B2 | 4/2011 | Dong et al. |
| 8,015,049 B1 | 9/2011 | Tam et al. |
| 8,051,380 B2 | 11/2011 | Knapp et al. |
| 2002/0016729 A1 | 2/2002 | Breitenbach et al. |
| 2002/0055880 A1 | 5/2002 | Unold et al. |
| 2002/0063732 A1 | 5/2002 | Mansikkaniemi et al. |
| 2002/0065109 A1 | 5/2002 | Mansikkaniemi et al. |
| 2002/0065881 A1 | 5/2002 | Mansikkaniemi et al. |
| 2002/0120498 A1 | 8/2002 | Gordon et al. |
| 2002/0154178 A1 | 10/2002 | Barnett et al. |
| 2003/0014296 A1 | 1/2003 | Meine |
| 2003/0023463 A1 | 1/2003 | Dombroski |
| 2003/0131023 A1* | 7/2003 | Bassett et al. ............... 707/200 |
| 2003/0177190 A1 | 9/2003 | Moody et al. |
| 2004/0073615 A1 | 4/2004 | Darling |
| 2004/0093317 A1 | 5/2004 | Swan |
| 2004/0119760 A1 | 6/2004 | Grossman et al. |
| 2004/0267585 A1* | 12/2004 | Anderson et al. ............... 705/8 |
| 2005/0005249 A1 | 1/2005 | Hill et al. |
| 2005/0015710 A1 | 1/2005 | Williams |
| 2005/0039142 A1 | 2/2005 | Jalon et al. |
| 2006/0048059 A1 | 3/2006 | Etkin |
| 2006/0195472 A1 | 8/2006 | Cadiz et al. |
| 2006/0195474 A1 | 8/2006 | Cadiz et al. |
| 2006/0229941 A1* | 10/2006 | Gupta ............................ 705/14 |
| 2006/0230137 A1 | 10/2006 | Gare et al. |
| 2006/0282319 A1 | 12/2006 | Maggio |
| 2006/0287919 A1 | 12/2006 | Rubens et al. |
| 2006/2087919 | 12/2006 | Rubens et al. |
| 2007/0064920 A1 | 3/2007 | Ruckart |
| 2007/0088801 A1 | 4/2007 | Levkovitz et al. |
| 2007/0130221 A1 | 6/2007 | Abdo et al. |
| 2007/0136430 A1 | 6/2007 | Qureshi et al. |
| 2007/0162328 A1 | 7/2007 | Reich |
| 2007/0180377 A1 | 8/2007 | Gittelman et al. |
| 2007/0192333 A1* | 8/2007 | Ali .................................. 707/10 |
| 2007/0250645 A1 | 10/2007 | Meadows et al. |
| 2008/0010297 A1 | 1/2008 | Goldfarb et al. |
| 2008/0033797 A1 | 2/2008 | Chickering et al. |
| 2008/0046311 A1 | 2/2008 | Shahine et al. |
| 2008/0052162 A1 | 2/2008 | Wood |
| 2008/0059297 A1 | 3/2008 | Vallier et al. |
| 2008/0109376 A1* | 5/2008 | Walsh et al. ..................... 705/80 |
| 2008/0114737 A1 | 5/2008 | Neely et al. |
| 2008/0115088 A1 | 5/2008 | Frankel et al. |
| 2008/0120396 A1 | 5/2008 | Jayaram et al. |
| 2008/0129835 A1 | 6/2008 | Chambers et al. |
| 2008/0133677 A1 | 6/2008 | Pattabhiraman et al. |
| 2008/0141145 A1 | 6/2008 | Klausmeier |
| 2008/0141247 A1 | 6/2008 | Saravanan |
| 2008/0148181 A1 | 6/2008 | Reyes et al. |
| 2008/0155547 A1* | 6/2008 | Weber et al. .................. 718/102 |
| 2008/0162260 A1 | 7/2008 | Rohan et al. |
| 2008/0177609 A1 | 7/2008 | Grieb et al. |
| 2008/0215426 A1 | 9/2008 | Guldimann et al. |
| 2008/0222127 A1 | 9/2008 | Bergin |
| 2008/0235078 A1 | 9/2008 | Hong et al. |
| 2008/0235681 A1 | 9/2008 | Barnett |
| 2008/0244425 A1 | 10/2008 | Kikin-Gil et al. |
| 2008/0244666 A1 | 10/2008 | Moon et al. |
| 2008/0250334 A1 | 10/2008 | Price |
| 2008/0281665 A1 | 11/2008 | Opaluch |
| 2008/0294655 A1 | 11/2008 | Picault et al. |
| 2008/0294994 A1 | 11/2008 | Kruger et al. |
| 2008/0319818 A1 | 12/2008 | Gurdin et al. |
| 2009/0037806 A1 | 2/2009 | Yang et al. |
| 2009/0063732 A1 | 3/2009 | D'Angelo et al. |
| 2009/0070219 A1 | 3/2009 | D'Angelo et al. |
| 2009/0094093 A1 | 4/2009 | Phan |
| 2009/0100347 A1 | 4/2009 | Schemers et al. |
| 2009/0150489 A1 | 6/2009 | Davis et al. |
| 2009/0152349 A1 | 6/2009 | Bonev et al. |
| 2009/0157658 A1 | 6/2009 | Bonev et al. |
| 2009/0157693 A1 | 6/2009 | Palahnuk et al. |
| 2009/0157717 A1 | 6/2009 | Palahnuk et al. |
| 2009/0158173 A1 | 6/2009 | Palahnuk et al. |
| 2009/0158186 A1 | 6/2009 | Bonev et al. |
| 2009/0158200 A1 | 6/2009 | Palahnuk et al. |
| 2009/0216569 A1 | 8/2009 | Bonev et al. |
| 2009/0313299 A1 | 12/2009 | Bonev et al. |
| 2010/0065881 A1 | 3/2010 | Eraker et al. |
| 2010/0198684 A1 | 8/2010 | Eraker et al. |

OTHER PUBLICATIONS

WO 2009-079609 International Search Report of PCT/US2008/987293 published Jun. 25, 2009.

* cited by examiner

FIG. 19

CALENDAR 1901

May 08

| M | T | W | T | F | S | S |
|---|---|---|---|---|---|---|
|   |   |   | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | 29 | 30 | 31 |   |

AGENDA 1915

TODAY
12PM Staff Meeting
7PM Dinner with Family
TOMORROW
No events
THURSDAY
9AM Breakfast Meeting
11AM Plumber Here
12PM Lunch with Jessica
3PM Wine Tasting
FRIDAY
All day – Flight to Maui

1910

LOCATIONS

Chili's
Denny's
Café Del Sol
TGI Fridays
McDonalds
Joe's Café
Donut World search/add

MAPS

ACTIVITIES

Lunch
Dinner
Bowling
Poker Run search/add

To-Do
☒ Fix Sprinkler
☐ Oil Change
☐ Anniversary search/add

Shopping

Read 1 bowling, Bob

Send

Chat  Share

PEOPLE

| Jennifer S. | 500 Main Street |
| Cindy Cole | 123 Oak Ave |
| Larry K. | 5446 Round Circle Drive |
| Robert B. | 56 Central Park Circle |
| Marisa D. | 44556 J St. Apt 456 |
| Faith P. | 546 David Street |
| Heather J. | 990 Divide Ave |
| Arnold S. | 12 ½ High Line Ave |
| Steve S. | 4990 Venice Blvd. |
| Roger H. | 112 Fromage Blvd |
| Shannon D. | One Edge Plaza, Suite 345 |
| Susan K. | 19002 42nd Street |
| Nick | 5446 Round Circle Drive |
| Sandy | 56 Central Park Circle |
| Howard | 446 J St. Apt 486 |
| Mister T | 546 David Street |
| Miss T | 997 Divide Ave |

| < May 08 > Today | | | | | | |
|---|---|---|---|---|---|---|
| Sun | Mon | Tue | Wed | Thr | Fri | Sat |
| 28 breakfast | 29 | 30 staff dinner | 1 | 2 | 3 | 4 | Week View |
| 5 | 6 | 7 | 8 | 9 dinner | 10 meeting | 11 | Week View |
| 12 | 13 cheese | 14 | 15 | 16 | 17 | 18 | Week View |
| 19 shop mow | 20 | 21 Vegas trip | 22 | 23 | 24 Remodel bath | 25 | Week View |
| 26 | 27 | 28 resume | 29 | 30 | 31 | 1 | Week View |

COMMUNICATIONS SYSTEM AND METHOD FOR SERVING ELECTRONIC CONTENT

CROSS-REFERENCE TO RELATED APPLICATIONS

This application claims the benefit under 35 U.S.C. §119 (e) of U.S. Provisional Application No. 61/014,422, titled "Communications System" filed on Dec. 17, 2007 in the U.S. Patent and Trademark Office and U.S. Provisional Application No. 61/051,339, titled "Dynamic Communications, Data, and Marketing System" filed on May 7, 2008 and U.S. Provisional Application No. 61/073,650, titled "Communications Network System" filed on Jun. 18, 2008 in the U.S. Patent and Trademark Office, all of which are herein incorporated by reference in their entirety for all purposes.

TECHNICAL FIELD

The following description relates generally to web-based contact management, and in particular to a communications system and method for serving electronic content.

BACKGROUND

A recent poll reveals the average computer user has four different email addresses—which is just one indication that users have too many sources of incoming communications to competently maintain. In addition, conventional systems place the burden of electronic communications squarely on the shoulders of the user. Users also are presented with many different types of communications devices. Many users are simply overwhelmed by the numbers and choices of functions of these devices and software such that many of the functions provided go unused, and to make matters worse, communications and conversation topics often jump between a variety of mediums including voice mails, text messages, faxes, and conversations. In addition, consumers using online organizers and websites are continually bombarded with advertisements, very few of which, if any, are directed to items of interest. The approaches currently used for providing these advertisements are only slightly better than using a "shotgun", hoping that one user out of millions actually notices the ad. In fact, most users find these ads intrusive and bothersome and some go to great lengths to block them. Therefore, an improved communications system is needed to aid, and organize communications between users.

This same situation also applies to personal organization. Most people have a large amount of information associated with each of these various types of communications. In particular, a user may have several address books, spread across various software applications/services (e.g., Outlook, Hotmail, Yahoo) and devices, such as their cell-phone or personal data assistant (PDA) of which varies entries at any time are not up-to-date and/or incorrect. The user also may have various types of contact information associated with different groups of individuals, such as work, family, and friends that are stored in many different locations. Maintaining all of these contacts is impractical and time-consuming and in many cases simply does not happen. Therefore, an improved organizational system is needed to simplify, aid, and organize this information.

In addition, Internet social networking websites are actually much like dating websites. A user creates an account, uploads personal pictures and description hoping to attract other people with similar interests much in the way a person tries to attract dates on a dating website. A problem with such web sites is the flood of unwanted solicitations among the few genuinely interest parties seeking new friends. Any images that are shared on these websites are soon downloaded and otherwise copied from the website at which point the poster loses any control over the distribution of the images. The images may end up posted in undesired places or "photoshopped" with unwanted modifications. As a result, many users are disappointed by their experiences while others avoid the whole situation due to the potential negative consequences of sharing information and dealing with volumes of junk messages and unwanted propositions. Therefore, an improved social networking technologies, processes, and system are needed to overcome these and other difficulties experience during social networking.

SUMMARY

In one general aspect, a network system for serving digital content to a graphical user interface of a user device includes a database storing user data including user preferences and events in a calendar of a system user; a processor configured to automatically scan the database to determine an event scheduled for a predetermined window of time; to automatically determine the event is associated with entertainment of the user and access one or more entertainment services, and to prepare content conveying an entertainment package customized to the event of the user; and a server to serve the content for presentation by the graphical user interface.

The processor may be configured to receive a response from the user device presenting the graphical user interface and automatically book the entertainment package in response. The entertainment package may include one or more of a movie ticket, a sporting event ticket, a show ticket, a event ticket of admission to an event, a dinner reservation. The entertainment services may be one or more of a ticket agency, a website, a team, guest services, a promotional agency, a discount service. The served content may be configured to solicit a user response. The solicited response may be one of book the entertainment, edit the entertainment package, postpone booking, and cancel.

The system also may include a database including graphical advertisements (GLADs) contributed by system partners wherein the processor is configured to apply filters to the user data stored by the database to determine GLADS relevant to the event and to serve the GLADS as content for presentation by the graphical user interface. The system also may include a database including graphical advertisements (GLADs) contributed by system partners wherein the processor is configured to apply filters to the user data stored by the database to determine GLADS relevant to the event and include the GLADs as part of the entertainment package.

The processor may be configured to save the package information in the database as part of the event on the calendar. The processor may be configured to parse a record stored in the database associated with the event to determine keywords associated with the event and to apply natural language interpretation to the keywords to determine the event is associated with entertainment.

In another general aspect, a method for serving digital content from a network system server to a graphical user interface of a user device includes storing user data including user preferences and events in a calendar in a database of the system; automatically scanning the database by a processor to determine an event stored in the database is scheduled for a predetermined window of time; automatically determining by the processor that the event is associated with entertainment and accessing by the processor one or more entertainment services; preparing by the processor content conveying a entertainment package customized to the event of the user; and serving the content by the server for presentation by the graphical user interface of the user device.

Other features will be apparent from the detailed description, drawings, and claims.

DESCRIPTION OF DRAWINGS

FIG. 19 is an exemplary illustration of the user interface with an extra large people lozenge and a large calendar lozenge of the user interface.

FIG. 22 is an exemplary illustration of the WHO strip with the calendar lozenge focused on a contact.

FIG. 23 is an exemplary illustration of the WHO strip with the calendar lozenge filtered for the family category.

FIG. 24 is an exemplary illustration of the WHO strip with the calendar lozenge in the Month view.

FIG. 26 is an exemplary illustration of the WHO strip with the calendar lozenge in the Expanded Day view.

FIGS. 30, 31, 32, 33, and 34 illustrate an exemplary sequence of selecting items from multiple lozenges to drag to create an event.

FIGS. 35, 36, 37, and 38 illustrate an exemplary sequence of create an event by dragging a location to the calendar lozenge.

FIGS. 48, 49, 50, and 51 illustrate the dragging and dropping of a glad to a strip of the user interface.

Throughout the drawings and the detailed description, like reference numerals refer to the like elements.

DETAILED DESCRIPTION

A recent poll reveals the average computer user has four different email addresses—which is just one indication that users have too many sources of incoming communications to competently maintain. In addition, conventional systems place the burden of electronic communications squarely on the shoulders of the user. Users also are presented with many different types of communications devices. Many users are simply overwhelmed by the numbers and choices of functions of these devices and software they use such that many functions go unused. And to make matters worse, communications and conversation topics often jump between a variety of mediums including voice mails, text messages, faxes, and conversations. Therefore, an improved organizational system is needed to simplify, aid, and organize this information.

The following describes a system and methods that provide integrated web-based graphic user interface to manage communications for a variety of WEB-accessible mobile devices, computers, and other consumer electronic devices. The user interface provided in conjunction with a server architecture simplifies all of a user's daily communications and information. The system logic is based on utilizing networked, online, or web-based processing devices, such as servers, as the central processing and database engine for content management and communications. As the system is device and source agnostic, the system is designed to work with any web-accessible device. As a result, the user devices may provide a communications portal to collect information from and present content to the user. The system also facilitates organization and communication between family members by providing a centralized depository of all family data including calendars, shopping lists, and messages. The family organizer user interfaces, website, system, and various processes are described in further detail below.

System Architecture

Figure 1:
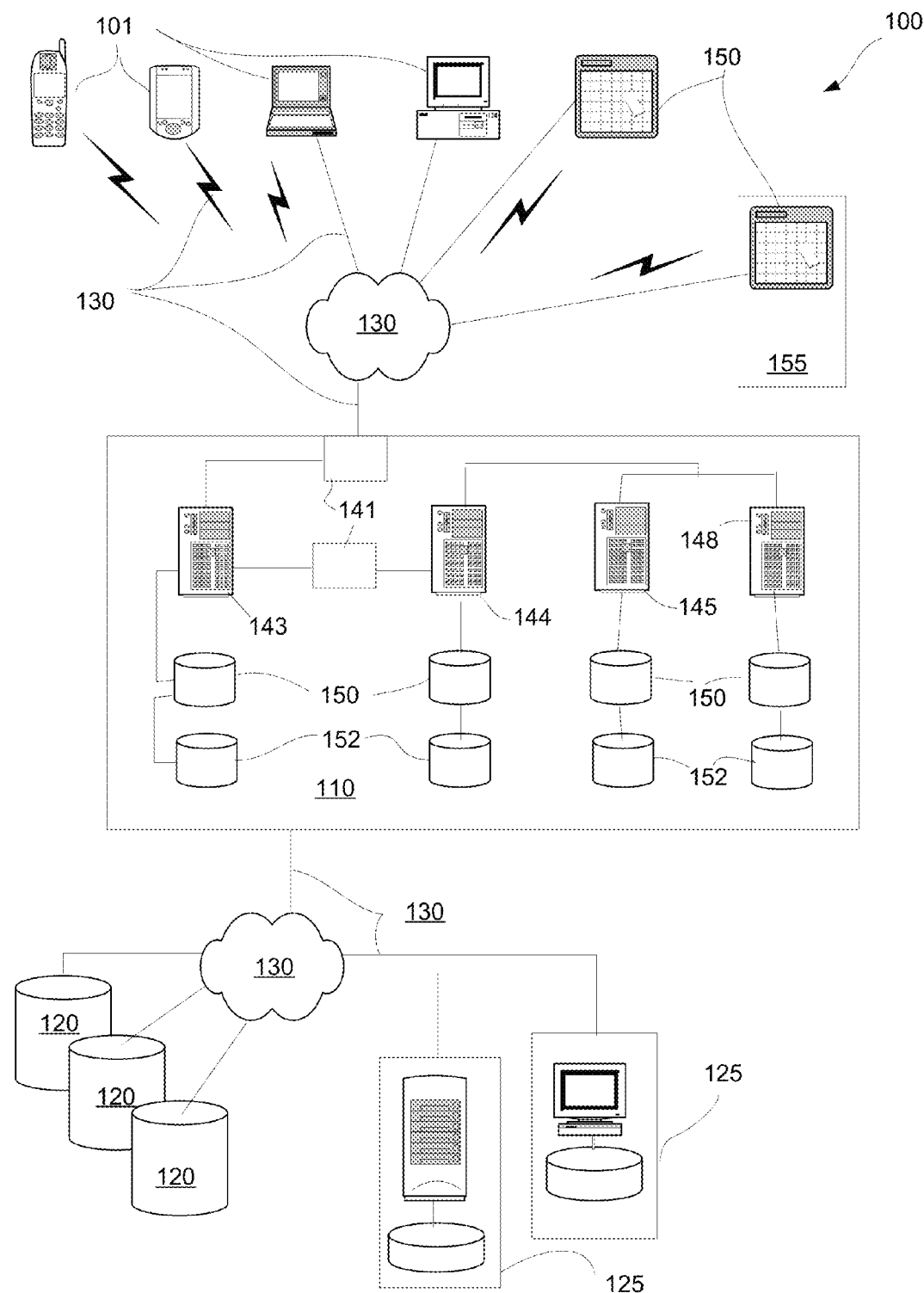
FIG. 1 and FIG. 2 show one exemplary block diagram of a communications system.

FIG. 1 shows one block diagram of an exemplary communications system 100. The communications system 100 includes one or more user devices 101, a service provider system 110, other Internet Service Providers and websites 120, and various communication paths 130. As the communications system 100 is device and source agnostic, the communications system 100 is designed to work with any web-accessible user device, as explained in further detail below.

The user device 101 may be any type of electronic device that presents content received from the service provider system to the user. For example, the user device 101 may be a consumer electronics device, a mobile phone, a smart phone, a personal data assistant, a digital tablet/pad computer, a hand held/mobile computer, a personal computer, a notebook computer, a work station, a vehicle computer, a game system, a set-top-box, or any other device that can implement a user interface and/or browser to communicate with and present content from the service provider system 110.

The user device 101 may include one or more processing devices, one or more storage devices, and one or more communications interfaces. A user device 101 also may include additional elements, such as, for example, one or more displays or screens, one or more speakers, one or more user input devices, and a microphone. Additional elements may include a digital camera and an optical reader (e.g., a bar code scanner or infrared scanner). A user device 101 also may include one or more associated peripheral devices, such as, for example, a display, a memory, a printer, an input device, an output device, and speakers.

The processing device may be implemented using any general-purpose or special purpose computer, such as, for example, a processor, a digital signal processor, a microcomputer, a field programmable array, a programmable logic unit, a microprocessor or any other device capable of responding to and executing instructions in a defined manner. The processing device may run one or more software applications that communicate with the service provider system 110 and present content received from the server provider system 110 to the user. The processing device also may access, store, manipulate, process, and create data in response to the applications. The software applications may include a computer program, a piece of code, an instruction, or some combination thereof, for independently or collectively instructing the processing device to operate as desired. Examples of software applications include: a browser, a mini browser, or other programs that interact with a front end interface application (FEIA) provided by the service provider system 110 to provide content, a login/signup, a user interface, and email among other features. Other examples of applications, include a mobile front end interface applications (e.g., for a cell or a smart phone) that allow the user device to communicate with the system service provider 110. Other browser based tools and plug-in applications also may be used, such as such as Java, Acrobat Reader, QuickTime, or Windows Media Player, and a Flash Player (e.g., Adobe or Macromedia Flash). Once the applications are loaded in and/or applied to the processor and device, the processor and the device becomes a specific machine configured to provide content and services of the service provider system.

The applications, content, and data may be embodied permanently or temporarily in any type of machine, component, physical or virtual equipment, storage medium or device, or a propagated signal wave capable of providing instructions or data to or being interpreted by the processing device. In particular, the applications or data may be stored by a storage medium or a memory including volatile and non-volatile memories that store digital data (e.g., a read only memory (ROM), a random access memory (RAM), a flash memory, a floppy disk, a hard disk, a compact disk, a tape, a DROM, a flip-flop, a register, a buffer, an SRAM, DRAM, PROM, EPROM, OPTROM, EEPROM, NOVRAM, or RAMBUS), such that if the memory is read or accessed by the processing device, the specified steps, processes, and/or instructions are performed and/or data is accessed, processed, or stored. The memory may include an I/O interface, such that data and applications may be loaded and stored in the memory allowing the applications, programming, and data to be updated, deleted, changed, or augmented. The memory may be removable, such as, for example, a card, a stick, or a disk that is inserted in or removed from the unit.

The communications interface may exchange data and content with the service provider system 110 using various communications paths 130. The interface allows the processing device to send and receive information using the communications paths 130. The communications interface may be implemented as part of the processing device or separately to allow the processing device to communicate using the communications paths 130. The interface may include two or more types of interfaces, including interfaces for different types of hardware and/or software to interact with different types of communications media and protocols and to translate information/data into a format that may be used by the processing device. Similarly, the interface may translate information/data received from the processing device to a format that may be transmitted to the service provider system 110 via a communications path 130.

The communications paths 130 may be configured to send and receive signals (e.g., electrical, electromagnetic, or optical) that convey or carry data streams representing various types of analog and/or digital data including content for presentation to a user. For example, the communications paths 130 may be implemented using various communications media and one or more networks comprising one or more network devices (e.g., network interface cards, servers, routers, switches, hubs, bridges, repeaters, blades, processors, and storage devices). The one or more networks may include a local area network (LAN), a wide area network (WAN), a global area network (GAN), a plain old telephone service (POTS) network, a digital subscriber line (DSL) network, an integrated services digital network (ISDN), a synchronous optical network (SONNET), Passive and Active Optical Networks (PON or AON), or a combination of two or more of these networks. In addition, the communications paths 130 may include one or more wireless links (e.g., microwave, radio, and satellite) that transmit and receive electromagnetic signals, such as, for example, radio frequency, infrared, and microwave signals, to convey information/data signal. For example, communications links may include IMT-2000, such as 2G (GSM, GPRS, EDGE, EDGE Evolution, CSD, HSCSD), 2.5G, 2.75G, 3G (W-CDMA, HSPDA, HSUPA, UMTS-TDD, FOMA), 4G, and IEEE 802.11 standards such as Wi-Fi or WLAN. In one example, a communications path 130 may include the Internet or World Wide Web.

The service provider system 110 facilitates communication by, organization of, and presentation of content to users in addition to providing many services. The service provider system 110 also stores and manages user associated information from the perspective of the user in a centralized location. The central location may be one physical location, such as a room, building, or campus providing the hardware components of the system. Alternatively, the central location may be virtual and providing services and storing date over a number of distributed system and locations. In particular, the service provider system 110 implements a user interface to aggregate, consolidate, organize, and simplify a user's daily communications, such as email and instant messaging into a central point for one-stop organization, data, and content management.

The service provider system 110 includes one or more communications devices, processors, memories/storage devices, communications interfaces, network devices, and communications paths to store, process, manipulate, organize, consolidate, maintain, and present content and data for a user. In the example shown in FIG. 1, the service provider system 110 may include a one or more security devices 141 (e.g., firewalls), web servers 142, an application server 144, an SQL server, MySQL server, or another database system, 145 and a mirror servers 148, and associated memory 150 and backup memory devices 152. It is understood, however, that the example given in FIG. 1 is for illustrative purposes only, and that different configurations, combinations of devices, and numbers of devices may be provided for any particular service provider system 110. For example, a cloud architecture also may be used as described below.

In one example, the web server 143 may be implemented using a Dell PowerEdge 1900 2-Socket, Quad-Core Tower Server with a Red Hat Enterprise Linux 5 operating system using an apache HTTP server programming language to provide JavaServer Pages (JSP). The web server 143 may run a FEIA to aid in login, signup, and creation of a user account, and receive information from the first time wizard. The application server 144 may be implemented using a Dell PowerEdge 1900 2-Socket, Quad-Core Tower Server with a Red Hat Enterprise Linux 5 operating system using programming languages YoLinux Java, Eclipse C/C++ IDE. The application server 144 may run a contact importer, a harvester, and a maintainer. The SQL Server 145 may be implemented using a Dell PowerEdge 1900 2-Socket, Quad-Core Tower Server with a Red Hat Enterprise Linux 5 operating system using an Oracle Database 11g Enterprise Edition for Linux (or equivalent) to maintain various databases, such as, for example, a contact database (DB). The mirror SQL 148 server mirrors the SQL Server 145. The contact DB keeps track of every user's contact information. The contact information includes various email addresses, avatar images, phone numbers, birthday info, etc. Although, one configuration is shown here, others may be used. For example, other types of hardware may be used, such as various types of computer (e.g., a PC or a Macintosh) featuring any of various processors (e.g., an Intel Core, Pentium, Celeron, Server or Workstation processors) running any of several operating systems (e.g., Windows, Mac OS X, Unix, or Linux). In addition, languages such as HTML, XML, ASP, Ajax, CSS, and various other protocols may be used to link the browser and its programming using JavaScript and Flash in front-end user interface to the MySQL database back-end.

Figure 2:
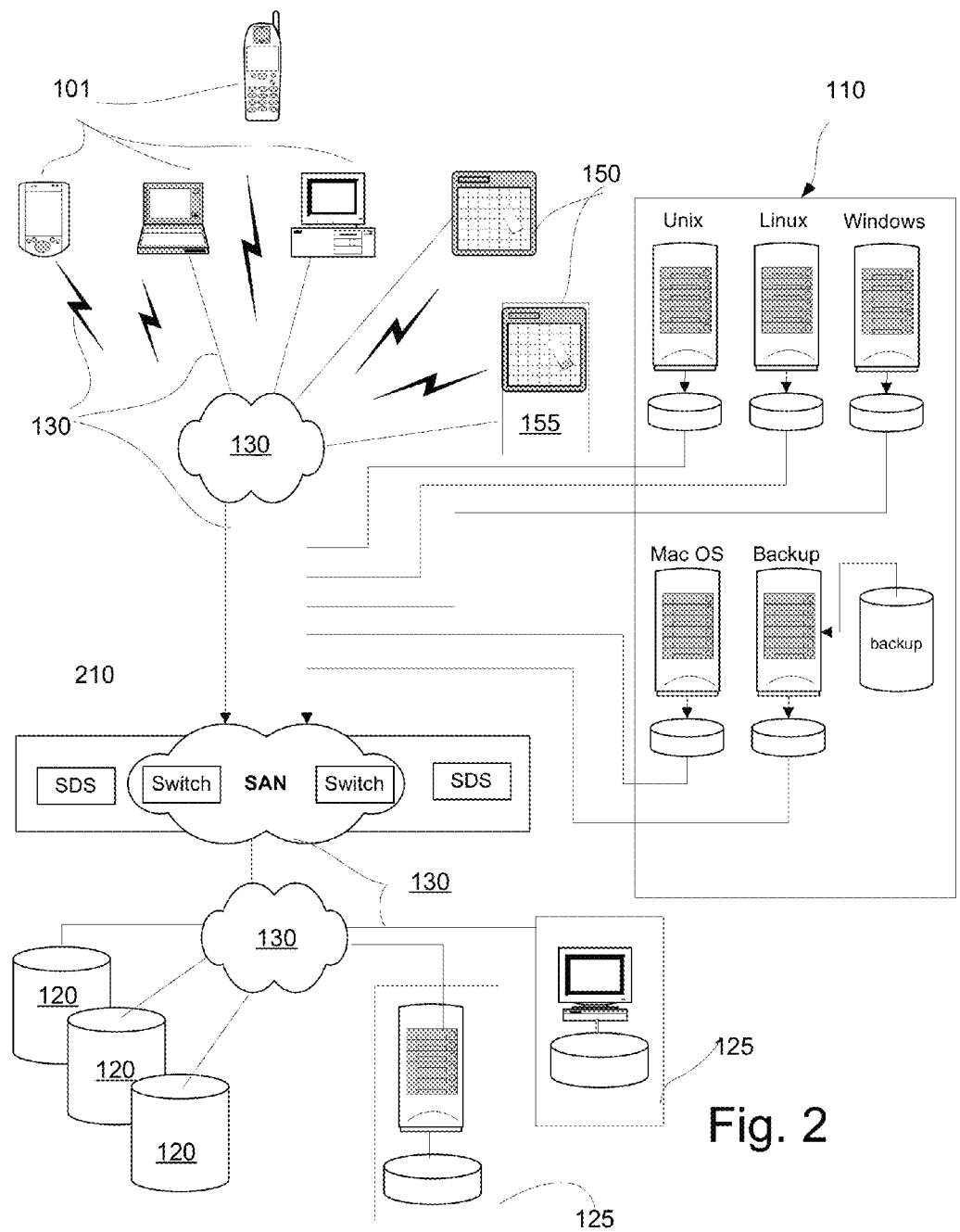

As shown in FIG. 2, the service provider system 110 may be hosted utilizing an accelerated cloud infrastructure 210. As shown in FIG. 2 the cloud processing network 210 includes a virtualizer network of accelerators for virtual servers. The virtualizer utilizes a Storage Domain Servers (SDS), network switchers, and an Storage Area Network (SAN) to provide a variety of server capacity and functionality that is emulated and provided as a load-balanced resource. The network 210 is connected to various servers and their corresponding data storage and databases of the system service provider allowing easy access to many different operating systems (e.g., Unix, Linux, Windows, Mac OS, Backup). As a result, a variety of server operating system and capacity may be provided to the end user. The cloud processing network may be part of the system service provider or hosted by a third party.

The accelerators provide virtualized servers (8+ cores, 32+GB RAM) with vast amounts of NAS storage. The accelerators are deployed within the cloud of a fast networking and routing fabric (e.g., Force 10), and efficient hardware load balancers (e.g., F5 Networks). Various applications, such as Apache, Nginx, MySQL, PHP, Ruby on Rails, and JAVA are preinstalled.

The Accelerators use full root access to provide control of setup and security configurations. The configuration provides accelerators that deliver massive scalability, both vertical and horizontal. For example, on the vertical scale the accelerators come in sizes ranging from ¼ GB of Ram up to 32 GB of RAM. On the horizontal scale, application-layer accelerators may be added that use hardware load balancing to support potentially hundreds of nodes.

In order to interact with the service provider system 110, a user needs to establish an account. The user must activate the account from a user device 101 running an application allowing the user device 101 to communicate with the service provider system 110, such as a browser. A browser may include any application that communicates with a web server primarily using hypertext transfer protocols HTTP (e.g., HTTP/1.1) along with various plug-ins and tools to fetch, present, manipulate, and interact with content and/or provide access to services provided by the service provider system 110. HTTP allows the browser to submit information to servers in addition to fetching content from them. Content may be located by the browser using a uniform resource locator (URL) as an address. Many browsers also support a variety of other URL types and their corresponding protocols, such as Gopher (a hierarchical hyperlinking protocol), file transfer protocol (FTP), real-time streaming protocol (RTSP), and an SSL encrypted version of HTTP (HTTPS). Content may be provided in a hyper-text markup language (HTML) that is identified using a MIME content type. Most browsers natively support a variety of formats in addition to HTML, such as the JPEG, PNG, and GIF image formats, and can be extended to support more through the use of plugins and/or scripts. The combination of HTTP content type and URL protocol specification allows images, animations, video, sound, and streaming media to be embedded in the content. Various plug-ins and tools, such as Java, Acrobat Reader, QuickTime, or Windows Media Player, and a Flash Player (e.g., Adobe or Macromedia Flash).

Figure 3:
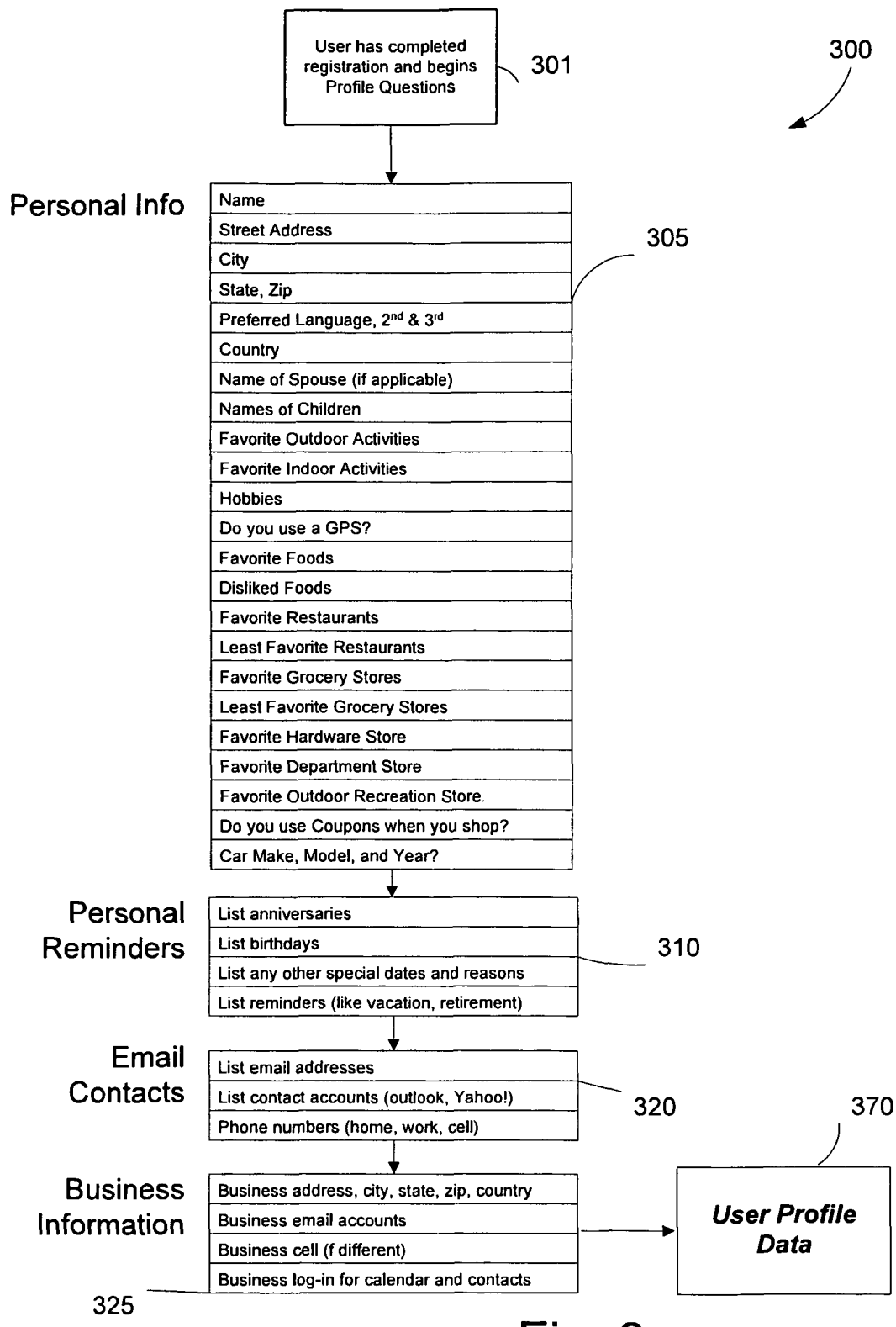
FIG. 3 is an exemplary process for a user profile questionnaire.

The browser may include coding that interacts with the FEIA. The initial code that is run in the browser may be downloaded from the service provider system 110 (e.g., with purchase of an account) or retrieved from a storage medium (e.g., a CD promotional gift). The browser running on the client device 101 connects with the FEIA application run by the service provider system 110 web server 143 to initiate login, account activation, and provide a first-time questionnaire. During the initial account setup, the user may create a password and/or user identification (ID). In addition, the service provider system 110 may configure settings and data on the user device 101 (e.g., set cookies). The service provider system 110 also provides the user with a user profile questionnaire. FIG. 3 illustrates an example 300 of how the service provider system 110 conducts the initial user profile questionnaire.

As shown in FIG. 3, when the user login is first initiated 301, the service provider system 110 asks the user several questions to help tailor the content and services that are delivered to the user. After the initial questionnaire is completed, an edit function provided by the user interface allows the user to update their profile information at any time. After the user completes their initial registration, the user then responds to the questionnaire provided by the user interface, which may be updated or changed at any time. The questionnaire may be provided in any number of formats that allow a user to provide information to the service provider system 110. For example, the questionnaire may be a webpage that includes content, such as a series, list, or groups of questions for the user to answer. Various windows, fields, boxes, lists, or drop down menus may be provided to solicit and receive information from a user. Some examples of questions asked or information requested may include personal information 305, personal reminders 310, email contacts 320, and business information 325.

Examples of the personal information 305 may include: a user name, a zip code, a name of spouse, and the names of children. The user also may provide their address/contact data or the system can automatically provide address data.

The service provider system 110 also collects information about personal reminders 310 so the service provider system 110 may remind the user of important dates, such as, anniversaries; birthdays (e.g., spouse, kids, relatives, and friends); an unlimited number of special dates and names of those events; and reminders (e.g., such as vacation, appointments, activities, or retirement). The personal reminders may be used as a source of greeting events, as explained in further detail below.

The user also is prompted to input email addresses 320 (e.g., family, friends, business contact, and relatives, among other important contacts). The user is asked to input their user names/aliases/IDs/account numbers and passwords for any online accounts, such as on-line groups, social networking sites, or online email providers including: Yahoo!, Google, MySpace, kut, Hi5, Facebook, Friendster, Linked In, XING and Twitter. The user also is asked for any other important contact information, such as phone numbers (e.g., work, cell, and home).

Business Information 325 also may be collected by the service provider system 110, such as business zip, business email account(s), business cell phone (if different), business log-in (user name and password) for contacts and calendar.

Once this information is collected, the information is stored in the user profile database 370.

Figure 4:
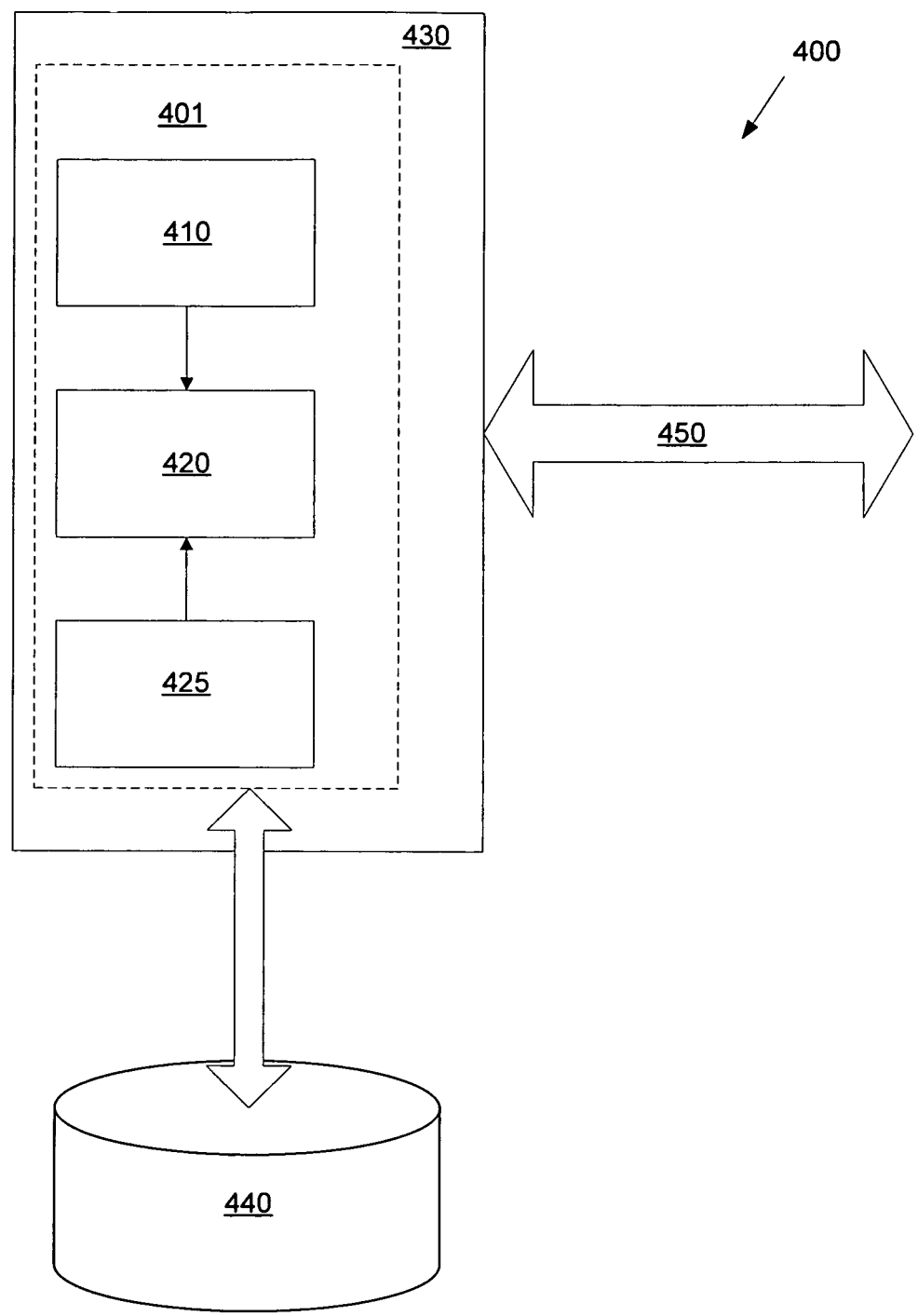
FIG. 4 is an exemplary contact aggregator system.

As shown in FIG. 4, the service provider system 110 works to collect, harvest, organize, and maintain contact information through the use of a contact aggregator system 400. The contact aggregator system includes a content aggregator 401. The content aggregator includes a suite of software/applications including a contact importer 410, a contact harvester 420, and contact maintainer 425 run by one or more servers 430 of the service provider system 110 that runs applications in conjunction with maintaining the client contact DB and a one or more storage devices 440. In one example, the server 430 may be implemented using the applications server 144 and associated hard disk 150 and shadow storage 152. The server 330 communicates with the rest of the service provider system 110 through communications path 450 (e.g., a communications path 130 secure link to the web server 143 and the SQL server 145).

The contact importer 410 imports contacts from various user client devices 101 and any other accounts, software, and systems associated with the user that store user contact information. The contact importer 410 also uses various user accounts information, such as the user names, the IDs, the aliases, and the passwords gathered during the initial account set up to masquerade as the user and download the user's contact information associated with or stored by any portal and/or social networking websites that user might belong to.

Using the passwords provided by the user during account setup, the contact maintainer 410 implements an automated process to login as the user on all supported address book/contact storage accounts, such as Yahoo!, Google mail, and Outlook. Any contacts that are identified from these accounts are imported into a temporary database. All imported contacts are compared against each other, and, the data is merged, the duplicates are deleted, and a final list of contacts and their associated information is created and placed in the user contact DB, which stores all of the user contacts.

For each contact associated with a user's account stored in contact DB, the contact DB may include a number of data-fields to store information regarding the contact. For example, the data fields may include a contact name, one or more email addresses, a fax number, one or more mobile phone numbers, a voice phone number, a business phone number, a home number, a home address, a business address, and various IM ID's. The contact importer 410 also captures any user avatar images when available. During the automated import process, the contact importer 410 merges the data collected from various sources and eliminates any duplicate information. For each contact the importer finds in one the user's existing contact formats, the contact importer attempts to populate as many the fields provided by the contact DB as possible with the information available from the importation process. Any contacts that are missing information may be provided to the contact harvester 420 in an attempt to retrieve the missing information. The contact importer then writes this information stored in a temporary database to the Contact DB.

The contact harvester 420 is an application that is used to retrieve, supplement, and/or update contact information that may be incomplete, out of date, or in error. The service provider system 110 examines the contact DB after initial setup and periodically thereafter. As part of the examination, the service provider system 110 provides the contact harvester 420 with contacts associated with non system users (i.e., user's not serviced by the service provider system 110) that have information fields that are missing information, are incomplete, or may be suspected of being incorrect or out of date. The contact harvester 420 spawns a web page for such contacts to solicit missing or information in need of updating. The web page may be hosted by the web server 143. The web page may be populated with all or a portion of the existing information for the contact stored in the contact DB. In addition, information associated with one or more fields that are blank, incomplete, or missing may be requested or solicited. The web page may include window, boxes, fields, menus that may be used by a contact to provide the missing information in conjunction with a browser. The contact harvester 420 generates an email that is sent to the contact at one or more of the email addresses stored for the contact in the contact DB. The email contains a link to this spawned webpage which may then be filled out by the user. To assure the contact being solicited of the authenticity of the web page and the email with the link to the webpage, a personal message from the user may be included or other information known to the contact may be provided. For example, a photo or avatar of the user and/or a portion of the user's personal information may be included with the message and/or website.

However, if the contact is a system service provider contact, then the information associated with the contact stored in the master database is copied over any fields associated with the contact in the user's database. In addition, the first time a user enters the primary email address associated with a contact, the system generates a message to both parties, such as, for example, "Do you wish to link with Carl?" and "Bob Henderson wishes to link his account with yours. Is this okay?" If both parties agree, then the contact information stored in the master database is permanently linked to each user database. As a result, whenever either user updates or changes their contact information, the information is automatically changes in the linked user's database. In addition, the users may see time marked on each other's calendars as busy and they may make schedule appointments in real-time (e.g., without the use of emails).

The contact harvester 420 also may interface with a telephony based, or web-telephony based device with voice prompts and voice recognition capability. As a result, the contact harvester 420 may get in touch with a contact at a provided phone number and use automated voice recognition technology and/or automated menus to request the missing contact information directly from the contact. This is especially helpful for tracking down contact information for contacts without valid email addresses. The automated voice system translates answers from the contact into digital data that is stored in the contact DB. The contact harvester 420 may then provide a spawned website and email to the contact to verify the information received by the automated voice system. The contact harvester 420 provides a report to the user if the contact harvester 420 is unable to contact a user and/or determine missing information.

When the service provider system 110 spawns a custom website for a contact to fill out their contact information, all known contact information may be filled out in the spawned form. The contact is then asked to fill in any missing info or update and change information that may be incorrect. Certain items or fields having missing or incomplete information that can be looked up with high accuracy may are filled in automatically by contact harvester 420. For example, if the contact information contains an address with the word "Calgary" in the city field, the contact harvester safely fills in the State/Province field with "Alberta" and the country field with "Canada." If the contact includes an address field of "503 Aniston Place, Apt 43," a city field of "Salisbury," and a State/Province field of "WI," the contact harvester safely fills in the Zip Code/Postal Code field with 91234 and the country field with "USA." A sample spawned webpage which may be used by a contact to fill in missing information is shown in FIG. 5.

Figure 5:
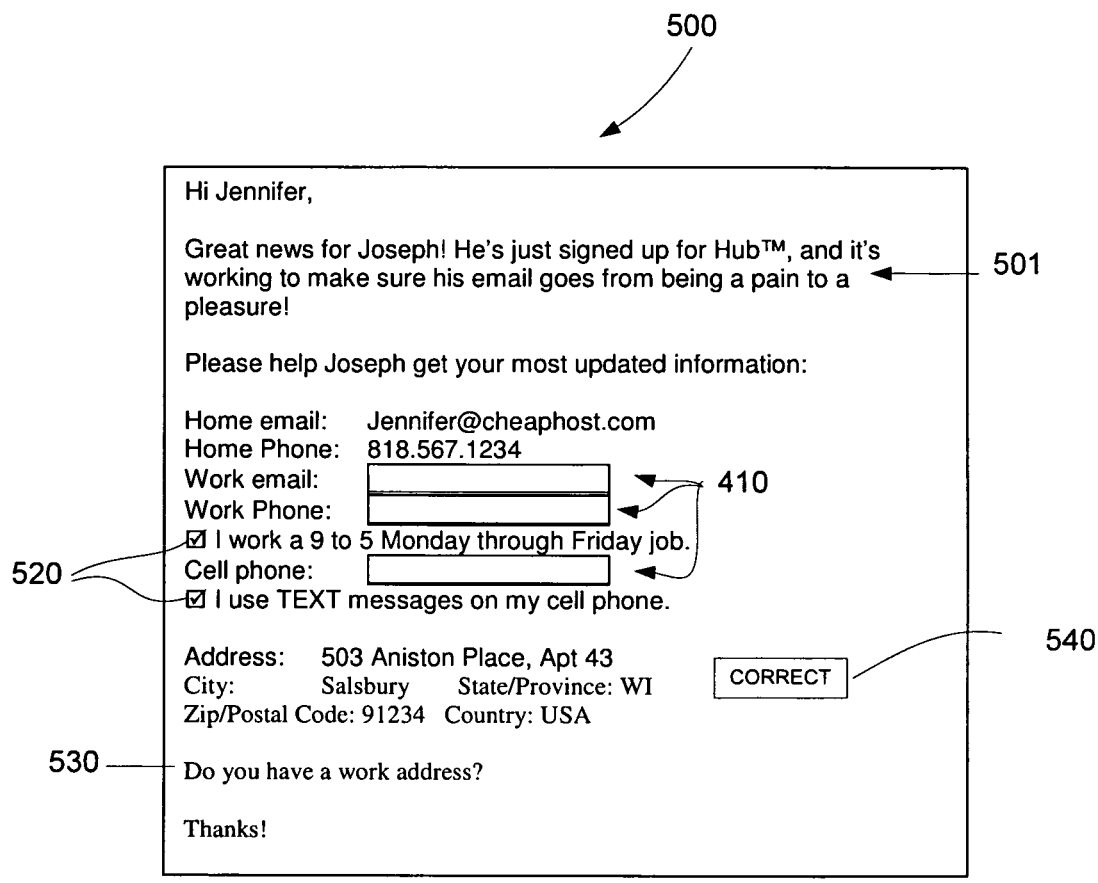
FIG. 5 is an exemplary contact fill-in form.

As shown in FIG. 5, the webpage 500 may include a personal greeting 501 and a listing of the contact data stored in the contact DB for the contact. Missing elements may include an entry field 510 for the contact to supply the missing information through use of a user input device. Check box 520 may be provided to toggle features on and off. In addition, there may be a solicitation for additional information 530 which can spawn additional web pages to supply the requested information. In addition, the webpage may include a verification 540 for the existing information. No response or a yes indication does not trigger any change; however a negative indication may spawn an additional webpage to correct and/or supplement the contact information displayed. Alternatively, the user may be able to change the information directly in the webpage by using a user input device and selecting the user information to change and change the information.

The contact maintainer 525 is an application that helps to maintain the integrity of contact information stored in the contact DB. For example, the contact maintainer 524 keeps track of failed email deliveries associated with the user account. If the contact maintainer 525 suspects that a contact has changed their email address (thereby accounting for the failed email deliveries), the contact maintainer 525 provides the information contact to the contact harvester 520. The contact harvester 520 may then generate a spawned webpage and/or use the automated phone system to determine correct contact information and/or update the contact information in the contact DB.

The contact maintainer 525 also scans or reviews user emails to detect key words and/or phrases, such as "my new phone number is," "we're moving," and "my new address is." If such key words, phrases, or combinations of key words are detected, the contact maintainer 525 parses the text to determine if the email is a change of address/email/phone message or is otherwise updating/change information associated with contact. If the contact maintainer 525 determines with a predetermined level of confidence that the email does contain such information, the contact maintainer prompts the user with a message, for example, like this:

"Hi, we think that Cynthia Alvarez might be changing her phone number from 310.234.1234 to 818.334.4456. Select here to make this change, or select here to read the email."

The user may then select to update the user information or make further inspection of the information to determine if the contact information should be updated. The message may be provided in any number of formats including email, instant messages, or directly through a user interface of the user device 101.

As described above, the service provider system 110 also gathers personal reminder information for users, such as contact birthdays. The contact maintainer 524 uses the personal reminder information as greeting events to automatically send greetings to contacts. Examples of greeting events include birthdays, anniversaries, and holidays, among others. The contact maintainer 525 uses the greeting event as an opportunity to periodically contact all members of the contact list. When the contact maintainer 525 determines the occurrence of a greeting event, the contact maintainer 525 sends a greeting to one or more contacts, such as "Happy New Year!" The greeting may be an email or instant message. The greeting may include a question for the contact, such as "Do you have new contact info?" If the user responds in the affirmative, the contact harvester 520 may spawn a webpage for the contact to review their stored contact information and update/change information as necessary. As a result, the greeting provides an opportunity to the contact to update their contact information and for the service provider system 110 to spread this information. More importantly, the contact maintenance is done without any additional effort or input required by the user.

Figure 6:
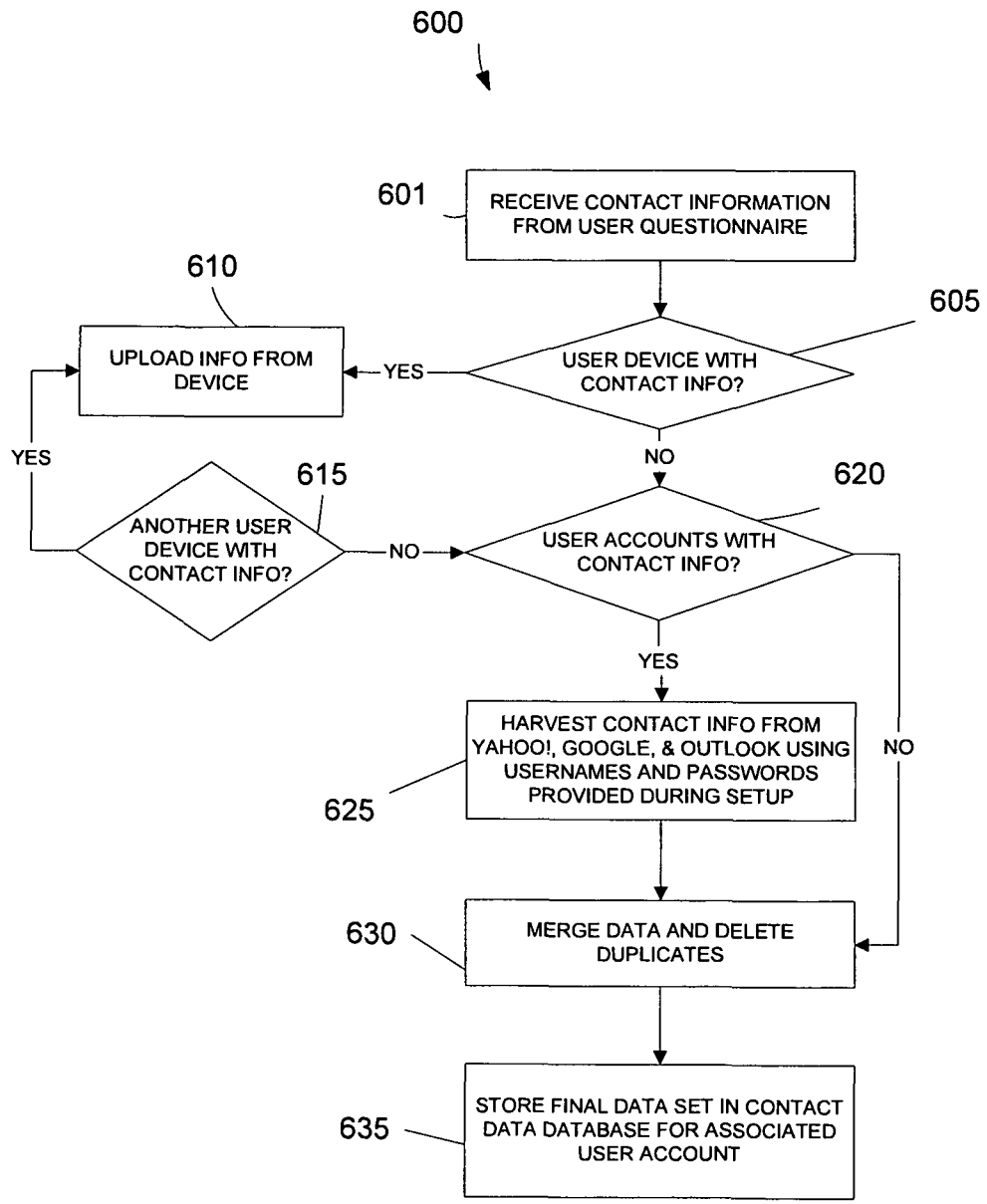
FIG. 6 is an exemplary block diagram for contact importation.

FIG. 6 is an exemplary process 600 for importation of contacts by the contact importer 410. The contact importer 410 receives the contact information from the questionnaire that is temporarily stored during the initial login process 601. The service provider system 110 also determines whether there are any user devices 101 that store contact information 605. If there is a user device 101, the service provider system 110 uploads the contact info from the device and also temporarily stores the information with the contact information from the questionnaire in a temporary database 610. The service provider system 110 determines if there any remaining user devices 101, 515 and if so, uploads information from each user device 101, 610. The contact information may be uploaded using a data importer application. The application may be universal or device specific depending on how the contact data is stored by the user device.

The service provider system 110 also determines whether the user has any other accounts that store contact information (e.g., Yahoo!, Google, Myspace, and Outlook) 620. If so, the contact maintainer 410 implements an automated process to establish a connection with each account by accessing a portal or other point of entry to the account provided by the online service provider, provides the required identification information (e.g., ID, user name, alias, account number, and password) to login to the account, accesses the contact information (e.g., in an address book), and imports the contact information into the temporary database 625. Once all contact information has been imported, the contacts are compared against each other in the temporary database and the data is merged 630. If any contacts or contact information is duplicated, the excess contact information is deleted and a final list of contacts is created and placed in the user contact DB which stores all of the user contacts 635.

Figure 7:
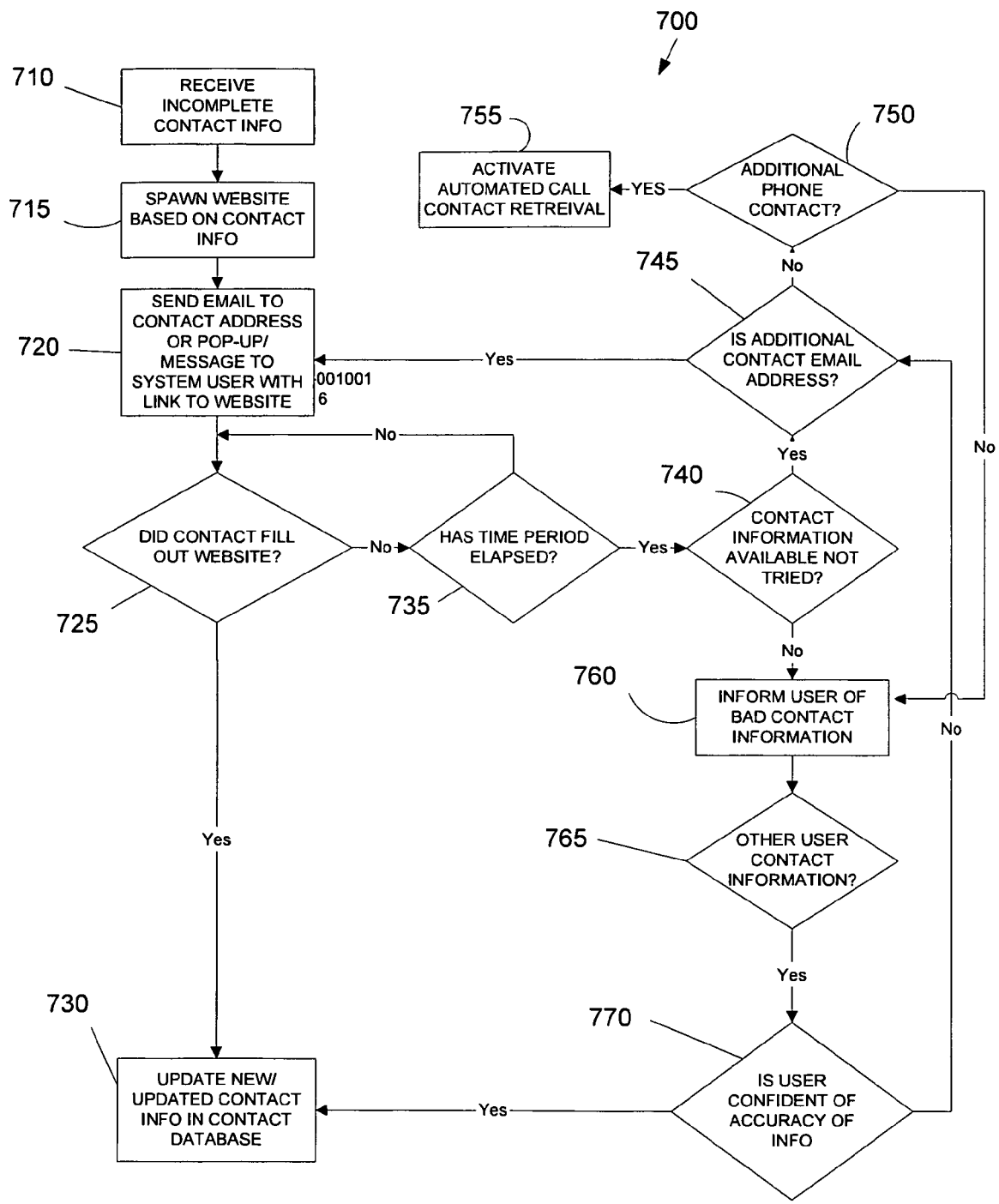
FIG. 7 is an exemplary block diagram for contact harvesting.

FIG. 7 shows an exemplary process 700 for contact harvesting. The contact harvester 420 receives information associated with a contact missing information in the contact DB 710. Using the information, a website is spawned for the contact 715. The website may be a webpage provided by the web server 143. The webpage includes an identifier for the contact, information from one or more of the fields from the contact DB associated with the contact, information that may be missing from the contact DB, or any combination of this information.

An email also is generated and sent to non system users or a popup window is sent to system users 720. The email may include a link (e.g., a hyperlink) that may be selected by the contact using a user input device and browser. Once selected or activated, the link causes the browser to present the spawned webpage to the contact. The browser allows the contact to provide any requested or missing information to the service provider system 110. In addition, the contact can confirm (e.g., implicitly or explicitly) any of the information provided about the contact on the spawned webpage. If the information is incorrect, the contact may change the information.

The website is monitored to determine whether the contact has visited the website to provide any missing or updated information 725. If the contact has provided the requested, missing information and/or updates information, the contact DB is updated with the information provided 730. If the website has not been visited, it may be determined whether a predetermined period of time has elapsed (e.g., 3 days) 735. If not, the system continues to monitor the website 725.

If the predetermined period of time elapses 735, the service provider system 110 determines if there is any other contact information provided by which the service provider system 110 might attempt to contact the user 740. For example, the service provider system 110 may determine if there is an additional email address to try 745. If so, the system may send another email to the determined email address with the link to the spawned website 720. As an alternative, the initial email sent to the contact 720 may be addressed to all of the email addresses that are stored for the contact negating the need to determine or try alternative email addresses.

Once all email addresses have been tried, the service provider system 110 may determine if any phone numbers are provided for the contact 750. If so, the service provider system 110 may engage an automated call service to try each number to request the missing information or to inform the contact that the user has been trying to reach them and that their contact information may not be up to date 755. The automated phone or call service may include a voice-system with voice recognition and voice synthesis (e.g., a simple "say your choice" or "yes/no" menu system) that works with any persons voice, no training needed. If the automated call service receives a voicemail of the contact, a brief message may be left for the contact indicating that the user has been trying to reach them. In addition, the service may provide the voicemail with the link (e.g., a URL) to the website or service provider system 110 to update their information. In addition, the service may leave a contact number for the user. If the contact information is updated using the automated voice system, the user may be presented with an option to overrule or verify the contact information before the contact DB for the user is updated.

If no other contact information is attainable, the system provider system 110 may send a message or email to or otherwise notify the user that contact information associated with the contact may be bad or incomplete 760. Additionally, the user address book or contact directory may include a visual indication (such as a type face, a color, a size, or other marking) to alert the user that the contact information may be bad or incomplete to prevent the user from unknowingly continuing to use the suspect or bad contact information in their communications. As part of this process, the service provider system 110 may inquire if the user has any additional contact information for the contact 765. If the user does have additional contact information, the service provider system 110 may inquire as to the user's confidence level in the information 770. If the user's confidence is above a predetermined level, the contact DB may be updated with the contact information provided by the user 730. If the user's confidence level is below a predetermined level, the service provider system 110 may use the information to verify the contact information by sending an email with a link to the spawned website or by using the automated phone service.

If the user does not have any additional contact information, the service provider system 110 may give the user the option to delete the contact, continue to indicate the contact information as suspect, periodically remind the user of the suspect contact info, and/or inquire if new contact information has been acquired 680.

Figure 8:
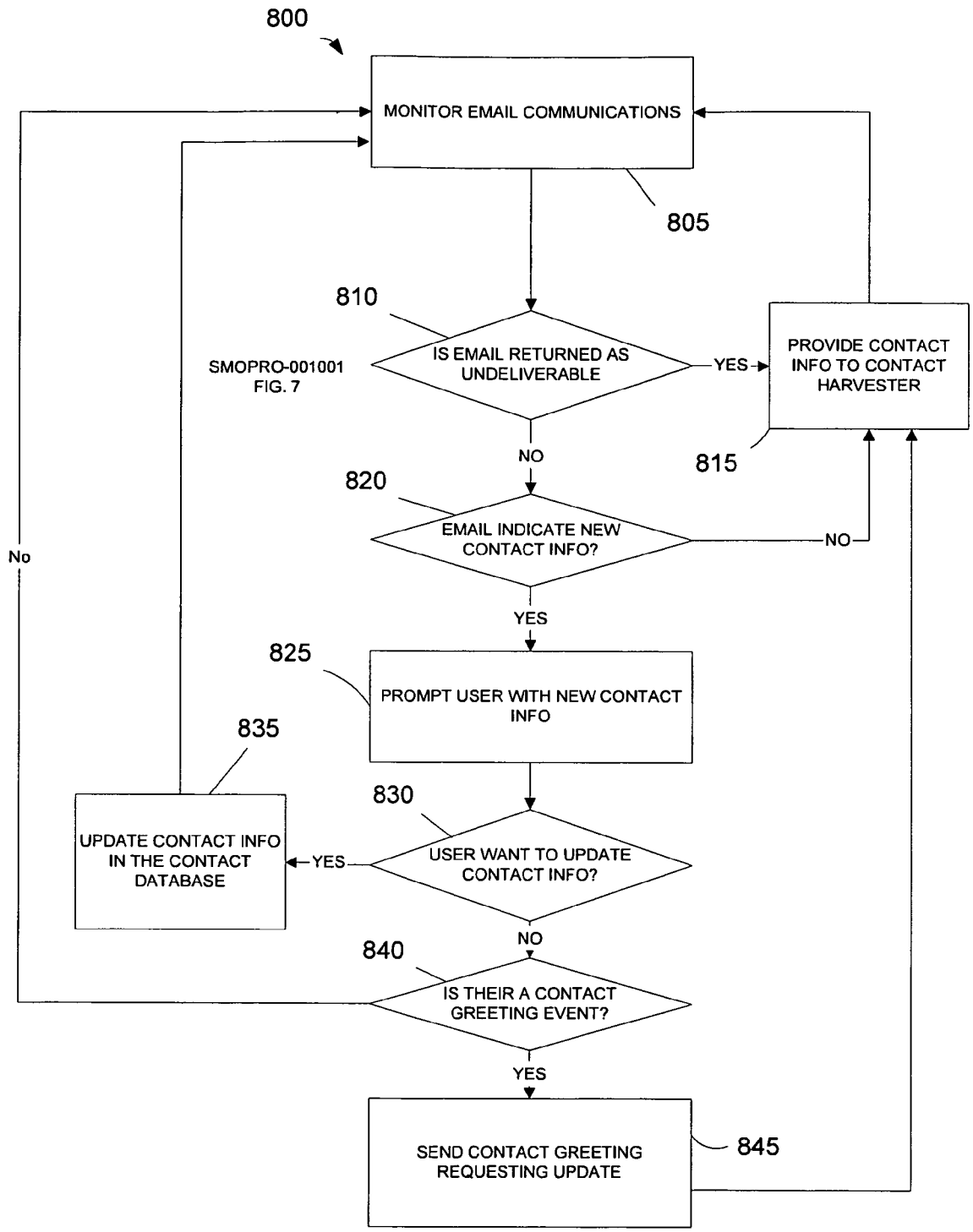
FIG. 8 is an exemplary block diagram for contact maintenance.

FIG. 8 shows an exemplary process 800 for contact maintenance. The contact maintainer 435 may monitor email communications 805. It may be determined if the email is undeliverable 810. If email is returned as undeliverable 815, the contact may be provided to the contact harvester 420 to perform the harvesting process 700. It also may be determined if an email indicates new contact information 720. If the email indicates the contact has new information, the user may be prompted with a message indicating the service provider system 110 believes that one of there contacts has new contact information 825. The message may ask if the user wishes to update the contact with the new contact information 830. If so, the contact database is updated with the new contact information 835.

The service provider system 110 also may determine is there is a contact greeting event 840. If so, the system may generate a greeting event email or message (such as "Happy Birthday Fred") and include a request for updated contact information by invoking the contact harvester 320 to create a spawned website and email with link to the spawned website 845. Alternatively, the website may be spawned, and the link to the website may be included in the greeting event email.

As a result, all of the users contact information may be centrally located, managed, a kept up-to-date, by the content aggregator relieving the user of much of the responsibility and frustration for maintaining contact information that may be spread over many different locations and address books.

Figure 9:
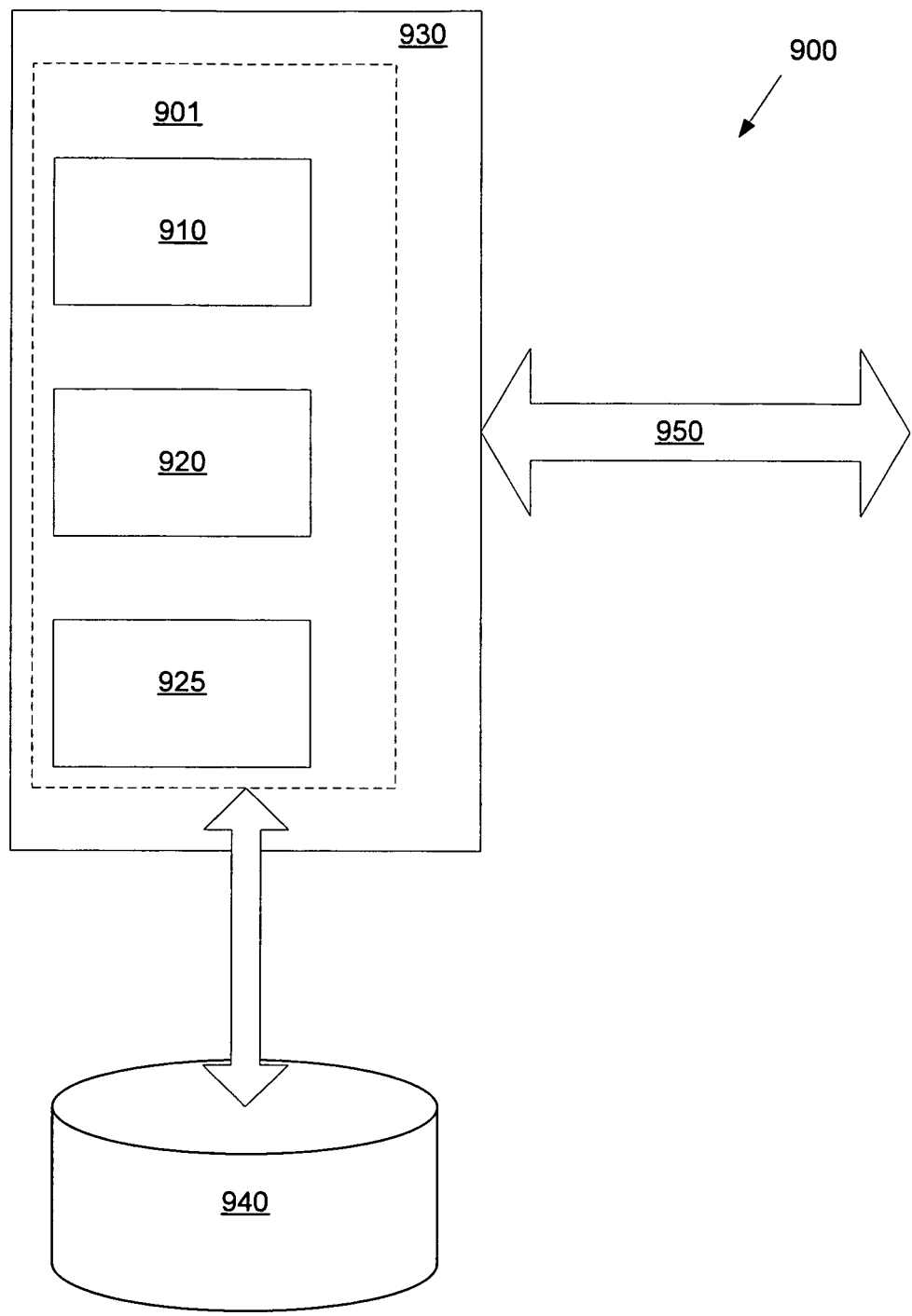
FIG. 9 is an exemplary block diagram for message threading.

As shown in FIG. 9, the service provider system 110 works to collect, harvest, organize, and maintain a user's calendar information through the use of a calendar aggregator system 900. The calendar aggregator system 900 includes a calendar aggregator 901. The calendar aggregator includes a suite 901 of software/applications including a calendar importer 910, a calendar harvester 920, and calendar maintainer 925 run by one or more servers 930 of the service provider system 110 that runs applications in conjunction with maintaining the client calendar DB and a one or more storage devices 940. In one example, the server 930 may be implemented using the applications server 144 and associated hard disk 150 and shadow storage 152. The server 930 communicates with the rest of the service provider system 110 through communications path 950 (e.g., a communications path 130 secure link to the web server 143 and the SQL server 145).

The calendar importer 910 imports calendar data from various user client devices 101 and any other accounts, software, and systems associated with the user that store user calendar data and information. The calendar importer 910 also uses various user accounts information, such as the user names, the IDs, the aliases, and the passwords gathered during the initial account set up to masquerade as the user and download the user's calendar information associated with or stored by any portal and/or social networking websites that the user might belong to.

Using the passwords provided by the user during account setup, the calendar importer 910 implements an automated process to login as the user on all supported calendar storage accounts, such as Yahoo!, Google calendar, and Outlook. Any calendar items or data that are identified from these accounts are imported into a temporary database. All imported calendar items are compared against each other, and, if possible, the data is merged, the duplicates are deleted, and a final set of calendar data calendar is created and placed in the user calendar DB, which stores all of the user calendar information. The calendar importer 910 and its processes may be run in conjunction with the contact importer 910.

The calendar DB may include a number of data-fields to store information regarding the user's calendar. For example, the data fields may include a years, months, weeks, days, a timeline of hours and minutes during a day, and events, reminders, meetings, tasks, to-do items, shopping items, and there associated data and information. During the automated import process, the calendar importer 910 merges the data collected from various sources and eliminates any duplicate information. For each calendar the importer finds in one the user's existing calendar formats, the calendar importer 910 attempts to populate as many the fields provided by the contact DB as possible with the information available from the importation process. The calendar importer 910 then writes this information stored in a temporary database to the calendar DB.

The calendar harvester 920 is an application that is used to retrieve, supplement, and/or update calendar information by periodically logging into the users various calendar accounts to retrieve information and update the user's calendar information. The calendar harvester 920 is an application that is used to retrieve, supplement, and/or update calendar information by periodically checking these other calendar account databases either by accessing their data APIs, or by logging into these accounts utilizing user log on information (user name and password) provided by the user during setup. The calendar harvester has the ability to masquerade as the user, log onto their other calendar accounts, and harvest the data.

Depending on the type of access (API or masquerade) the frequency of the checking varies. With an API checking can happen very often, whereas masquerading may happen only a few times a day.

The calendar harvester reads the information from the user's other accounts, interprets that data thus converting it to a compatible format with the system, and then installs that data into the user's calendar.

The calendar manager 925 receives user input provided through the user interface to manage the user's calendar. The calendar manager provides calendar information and data to the user interface and receives use input to setup, schedule, and maintain user events. The calendar manager also has access to all system user calendars which allow to instantly providing information about a user's other contacts maintained by the system service provider.

In addition, to maintaining a user's contacts and calendar information, the system also manages a user's various dialogs with other users. For example, emails sent to a user account are stored by the service provider system 110 in an archive database that is associated with a user account. The archive database stores the communications in their original form (e.g., STMP). The archive database also store threads of previous user communications. The threads are chronically arranged communications between two or more individuals that have a common subject. The threads contain the actual body copy of the communication with other non-essential information removed, such as, for example, headers, signatures, boiler plate or legal disclaimers, text history, wallpaper, animations, avatars, demarcations, line or extraneous characters.

Figure 10:
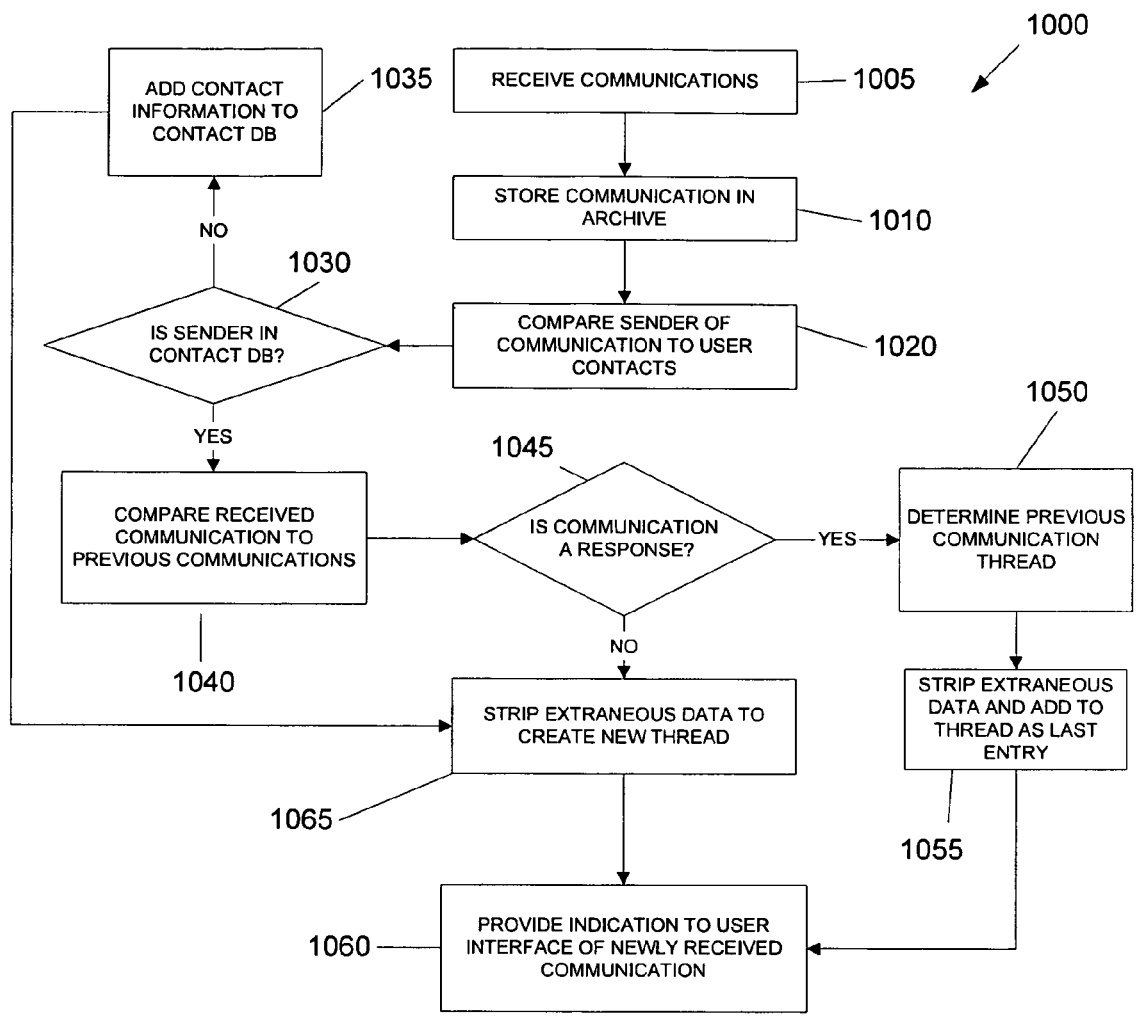
FIG. 10 is an example of a message thread.

FIG. 10 shows one example 1000 the service provider system 110 processing of emails. As emails are received by the system service provider 110 (1005), the emails are stored in the archive database (1010). The address of the email sender is compared to the recipient's contact data to match the identification or name of the contact sending the email with information in the contact DB (1020). For example, the server compares the text string in the FROM or SENDER fields with all of the contacts stored in the contact DB that are associated with a user. The system service provider determines if the user is in the contact DB 1030. The service provider system 110 scans the archive DB of all current and previous communications sent or received by the user. The service provider system 110 identifies those communications between the user and the identified contact. By examining the text history in the email (i.e., the content displayed at the bottom of emails preceded by the ">" characters) and by examining the subject line, the service provider system 110 determines whether or not the email is a response to a previous communication stored in the archive DB 1040.

If the email is a response, the service provider system determines a probability of which communication it is a response to 1045. The service provider system 110 examines the subject, text history, and key words in the list of current conversation threads database, to determine which conversational thread the communication belongs to 1050. Once a thread is determined, the system service provider 110 strips all data from the email except the actual body copy that was last typed by the contact sending the email 1055. When stripping the email, the system removes all header information, all text history, signature boxes, wallpaper, avatars, animations, legal boilerplate, demarcations, lines, and extraneous characters to leave only the body copy or new communications characters sent by the contact. The body copy is then placed as a last entry to the communications thread. The updated thread is stored and an indication is provided by the user interface, as explained in further detail below 1060.

If the communications is not determined to a response a new thread is created 1065. When creating the new thread, the system includes only the actual body copy of the communication stripping all other data, as explained above. The new communication thread is stored in and an indication is provided by the user interface 1060.

User Interface

As the number of technological advances in daily communications grows, many users find themselves overwhelmed by the sheer amount of information and content available to them. In addition, many of the user devices providing this information and content have a substantial number of functions associated with them to view and manipulate this content. As the amount of content and number of functions have grown, a typical user does not use many of the functions provided because it is difficult to access or utilize the information or the functions provided are only useful to a relatively small number of users. Therefore, a new user interface is provided to facilitate user access and manipulation of content and services provided by the service provider system 110.

The user interface provides a primary point of interaction between the user and service provider system 110. The web server 143 provides content and services to the user through a browser operating on the user device 101. The user device 101 establishes a connection to a web server 143 of the service provider system 110 using a communications path 130. After the connection is established, the primary interface is presented as screen rendered by a browser on a display of the user device 101. The screen may be a dynamic webpage provided by the web server 143 that is supplemented by additional programs, applications, and plugins operating on the user device.

The user interface provides electronic content generated by the applications, servers, and databases of the system service provider 110. The once the use device establishes a link with the service provider system 110, the user device and system exchange data. Data is transmitted from the system 110 to the browser in a markup language used by a client application or browser resident on the user device 101 and its operating system to render the page and present the user interface screen. Data also is transmitted from the user device 101 to the system 110 to provide indications of user interaction with the user interface. The data sent to the user device may be in any markup language that may be interpreted by the client application or browser running on the user devices that is presenting the system webpage. In one application, Flash technologies may be used and AJAX technologies may be used to provide the webpage of the user interface using the hypertext markup language (HTML), the JavaScript programming language, Cascading Style Sheets (CSS) and/or the eXtensible Markup Language (XML).

In one example, data may be transferred between the service and the user device using an HTML and/or XML format to render the page. Within the data of the markup language for the page, an instant messaging protocol application may be provided. The markup language is interpreted by the browser to run/assemble the instant messaging protocol application. Once operating in the browser, the instant messaging application may be used to establish an instant message link between the client application or browser and the system server. This may be done by providing the system server with connection information (e.g., an IP address and number of the port assigned to the client user device). In addition, the client device also is provided with the connection information (e.g., an IP address and number of a port on the system server). Because the client device and server both have the IP address and port number of the other, the two devices may be considered "linked." As a result, certain user interactions with the browser while manipulating the user interface are sent directly to, and received directly from the server in real time. The direct "link" may be used to provide certain information directly to and from the server and client. For example, any information for calendar events may be provided directly without, for example, the need for any page refresh between the browser and the server in order to display the associated information. In addition, all online system users have this link established. As a result, when one person updates their calendar to add an event, the calendar of another system user may appear to be updated almost instantly or in real time. Similarly other items inputted by on the interface, such as tick boxes may be updated in this manner.

The user interface may include one or more areas, portions, boxes, windows, scroll/slider bars, tools, menus, buttons, and tabs; however, the numbers and arrangement of these items is selected so as to not overwhelm a user with functionality. The functionality of the user interface may be accessed or activated through use of one or more user inputs of the user device 101. For example, items and content on the screen may be selected and manipulated using one or more screen position indicators or visual effects (e.g., a pointer, a cursor, a highlighting, a transparency, a color, an animation, or an effect) controlled by one or more user input devices (e.g., a key, a keyboard/pad, a touch screen/pad, a mouse, a joystick, a track ball, and a stylus) as is common in graphical user interfaces (e.g., a pointer controlled by a mouse to click and double-click to activate, select, and drag items within a window, browser, or desktop environment).

In most cases, items in lists can be: selected, clicked, or tapped to designate, activate, or expand the item; double-selected, clicked, or tapped to edit an item; dragged within a list to reprioritize the item; dragged from a window, a list, a tab, or a button and dropped to another to convert an item to another type of item or to activate a function; and a special selection process, such as holding down a specific key (e.g., the Ctrl key or shift key) to allow multiple items on a list to be selected and/or dragged.

Characters and text may be entered in specific locations (e.g., a text box or entry field) using a keyboard, a keypad, a number pad, or a virtual keyboard/keypad (e.g., provided through a touch screen).

As the user interacts with items, functions, and content presented by the user interface, the items, functions, and content may be focused based on their interaction. Further examples of the user interface and its functionality are given in greater detail below.

As pointed out above, many users find the number, type, and functionality of the many different user interfaces to be overwhelming or at a minimum burdensome. Accordingly, the user interface described herein presents content in manageable portions for a user. Each portion includes items, data, functions, and content concerning an area of interest to the user. In particular, the data and content of most interest to a user may be distilled into four basic areas of interest which govern their daily communications: who, what, when, and where. In addition, the user interface automatically focuses information provided within these areas to the information that is most likely desired by the user at any given moment. To aid the user and avoid confusion, all contacts, messages, and appointments may be color coded or otherwise visually distinguished to indicate which category they belong to (e.g., Red=Personal, Green=Family, Purple=Friends, and Blue=Business). As a result, items belonging to these groups may be shown in, bordered, highlighted or otherwise visually distinguished with these colors. Finally, because the user interface data, items, content, and functionality are provided by the service provider system 110, they may be accessed by the user using any web accessible device with a browser. As a result, the user has access to their information from virtually anywhere and because the information is presented consistently, the user does not need to re-familiarize themselves with different operations and functionality even when accessing the information from different user devices. Nor does the user have to worry about a lost or stolen device resulting in lost information or having it compromised.

Figure 11:
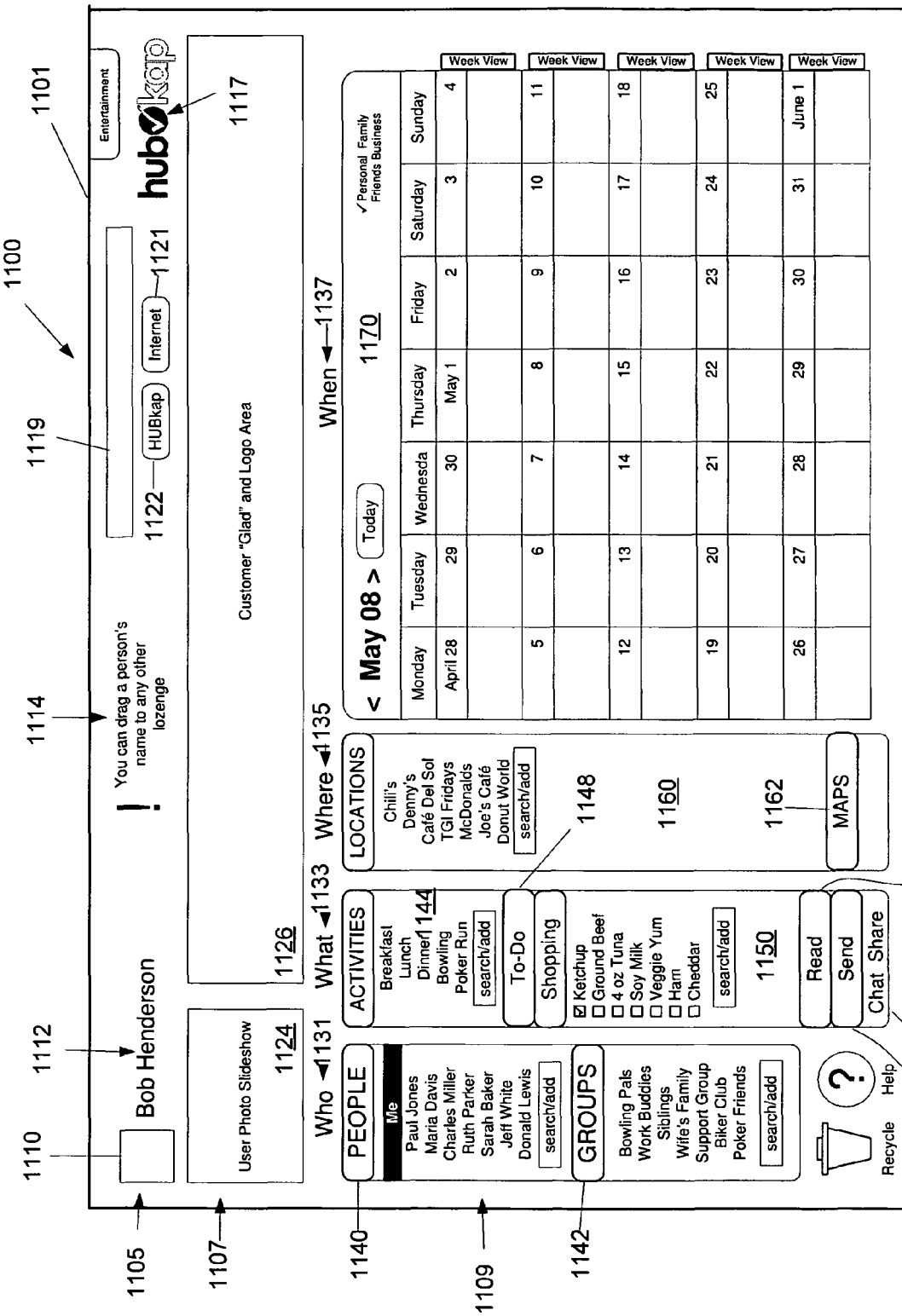
FIG. 11 is an exemplary screen map of a user interface providing dynamic WHO, WHAT, WHERE, and WHEN strips.

FIG. 11 shows a screen map 1100 or layout of a user interface window 1101. The screen map 1100 of the user interface is implemented by the service provider system 110 in conjunction with a browser and other applications and plugins of the user device 101. Screen resolutions may be dimensions that are proportional to screen width and resolution used depending on type of display associated with the client device 110. The display also may be fully scaleable. As such, the screen dimensions and resolution shown in the figures is merely for illustration purposes only.

The user interface window 1101 is divided into three primary areas: an information bar 1105, a graphic bar 1107, and a user organizer 1109. As shown in FIG. 11, the first portion includes an information bar 1105 that may be used to present various information pertaining to a particular user, such as, for example, a user avatar 710, a user name 1112, any high-level alerts 1114 (e.g., tips or message "3 new events"), and a system logo 1117. In addition, a custom web search input field 1119 may be provided to allow a user into input information (e.g., key words) through use of an associated user input device. The input information is supplied to a search engine to perform a query and present a response in a separate browser window. Searches of the web may be performed using Google, Yahoo, AltaVista, or any other web-based search engine. However, the service provider system 110 may automatically narrow or focus the search based on the user's personal profile stored in the user DB. In addition, the system service provider 110 may use its own propriety search engine to perform a search. Two buttons are provided, an Internet search button 1121 and a system search button 1122, to select where the search is to be performed. The search features are described in further detail below.

A second area 1107 includes a graphic bar that provides a space or window 1124 for a user photo gallery to display user photos (e.g., stored in the user database). The graphic bar also may include a products and services branding area 1126 to display advertising (i.e., glads) and logos for business clients 120 (e.g. a system sponsor). This area 1107 also may be customized or used to promote a business for a sponsored user interface. The area may include identification of the business, such as a name, symbol, or logo. Selecting the business logo causes the user interface to open an additional browser to present the user with a website or other online content associated with the business. This area 1107 of the user interface also may provide advertising content including coupons. The advertising display and glads are described in further detail below.

A third portion 1109 of the user interface provides a user organizer that organizes a user's daily communications, contacts, appointments, content and other information in several key contexts to facilitate the user's access to and manipulation of the information. As shown in FIG. 11, the user organizer is divided into four general themes, contexts, or strips: a WHO strip 1131, a WHAT strip 1133, a WHERE strip 1135, and a WHEN strip 1137. Each strip provides data, content, and functionality to a user in manageable portions based on a general aspect, context, or theme. The WHO strip 1131 provides content and functionality regarding a user's contacts including people and groups of people. The WHAT strip 1133 provides content and functionality regarding a user's daily activities, communications, shopping, and to-do items, and other events of a user's daily life. The WHERE strip 1135 provides information about locations and points of interest to a user, such as addresses, points of interest, information related to points of interest, and maps associated with those locations. The WHEN strip 1137 provides access to scheduled activities, events, appointments, and any other time sensitive data associated with the user. Each of the strips also dynamically focuses content and information based on user interaction with the strips. The strips also are automated such that simple manipulation of item between and within the strips causes the system to provide certain functions and service automatically. Each of the strips, their functionality, and focusing are described in further detail below.

Figure 12:
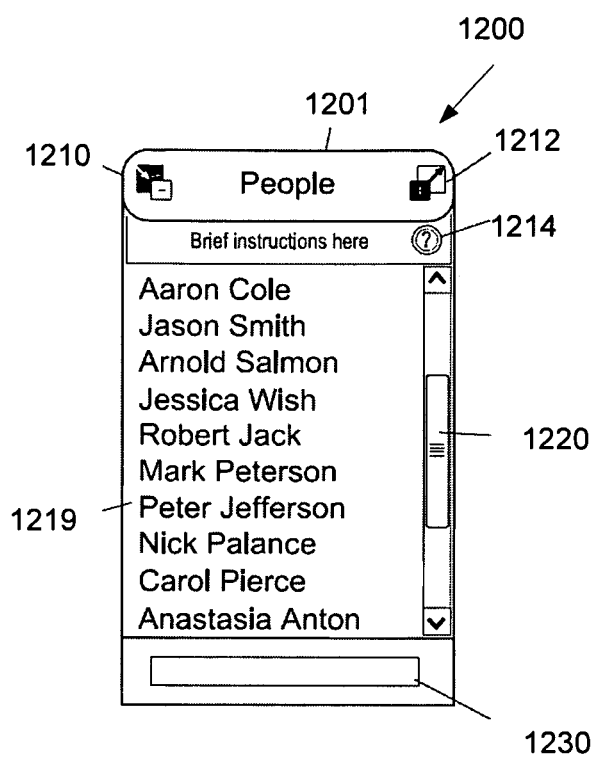
FIG. 12 is an example of a lozenge for use in a strip of the user interface.

The information and functionality provided by each strip are accessed through manipulation of one or more lozenges provided in each of the strips. FIG. 12 shows an example 1200 of a lozenge. The lozenge 1200 is an interactive, dynamic window that provides content and functionality to a user. Each lozenge allows a user to quickly arrange and display information and functionality within the theme or context of the strip. The lozenge may include one or more of the following: a title bar 1201 including an expand icon 1210 and a contract 1212 icon, a information/item area 1219, navigation aids (e.g., a scroll or slider bar) 1220 and a search/add field 1230. The area or window occupied by the lozenge 1200 within a strip expands and/or contracts based on a user request or via automatic processes. Generally the lozenges may be presented as: small, medium, large, and extra large. In addition, the size of one lozenge may automatically and reciprocally affect the size of the one or more other lozenges within a strip based on user interaction with the strips.

A small lozenge generally occupies a minimal area of a strip, for example, less than 15% of the area of a strip and provides minimal information and functionality. For example, a small lozenge may include a title bar and some additional information, such as a minimal alert or counters. A medium lozenge provides a portion of the overall content associated with a lozenge focused generally, for example, on the most used or most needed content or functionality associated with the lozenge, such as alerts and/or counters. In one example, a medium lozenge occupies approximately up to half of a strip. A large lozenge may be considered full size providing multiple ways to view data while providing all the functionality associated with the lozenge. In one example, a large lozenge occupies a majority of the strip. Finally, an extra large lozenge provides additional space with an emphasis on editing data, adding/reordering items, and viewing of additional information provided by the lozenge. In one example, the extra large lozenge occupies a space larger than a strip, for example, the space of up to three large lozenges or additional strips. The individual lozenges are described below within the context of their strips.

At the bottom of a lozenge a data search/add field 1230 (e.g., a text box) may be provided in which a user enters characters using user input device. As a user enters characters into the field, the system performs a character-by-character analysis to determined items featuring the letters the user is typing. The system displays in or next to the field any items that correspond with the characters. At any time the user may select one of the displayed items. If the user types in a character string that is not present in the database, and selects the items using a user input device (e.g., pressing ENTER), then the item is added to the database. The field may be used, for example, to add an item to the list or perform a search within the context of the lozenge.

The WHO strip 1131 includes two lozenges: people 1140 and groups 1142. The WHAT strip 1133 includes six lozenges: activities 1144, to-do 1148, shopping 1150, buy (not shown), read 1152, and send 1153. The WHERE strip 1135 includes two lozenges: locations 1160 and maps 1062. The WHEN strip 1137 includes one lozenge: dynamic calendar 1170. Expanding a lozenge causes a corresponding reduction in the size of one or more other lozenges within a strip, as explained in further detail below. Similarly, expanding a strip to accommodate an extra large lozenge, causes a correspond reduction in the size of one or more other strips. Any strips or lozenges that are shrunk may be done so in order of the oldest to the most recently used.

Figure 13:
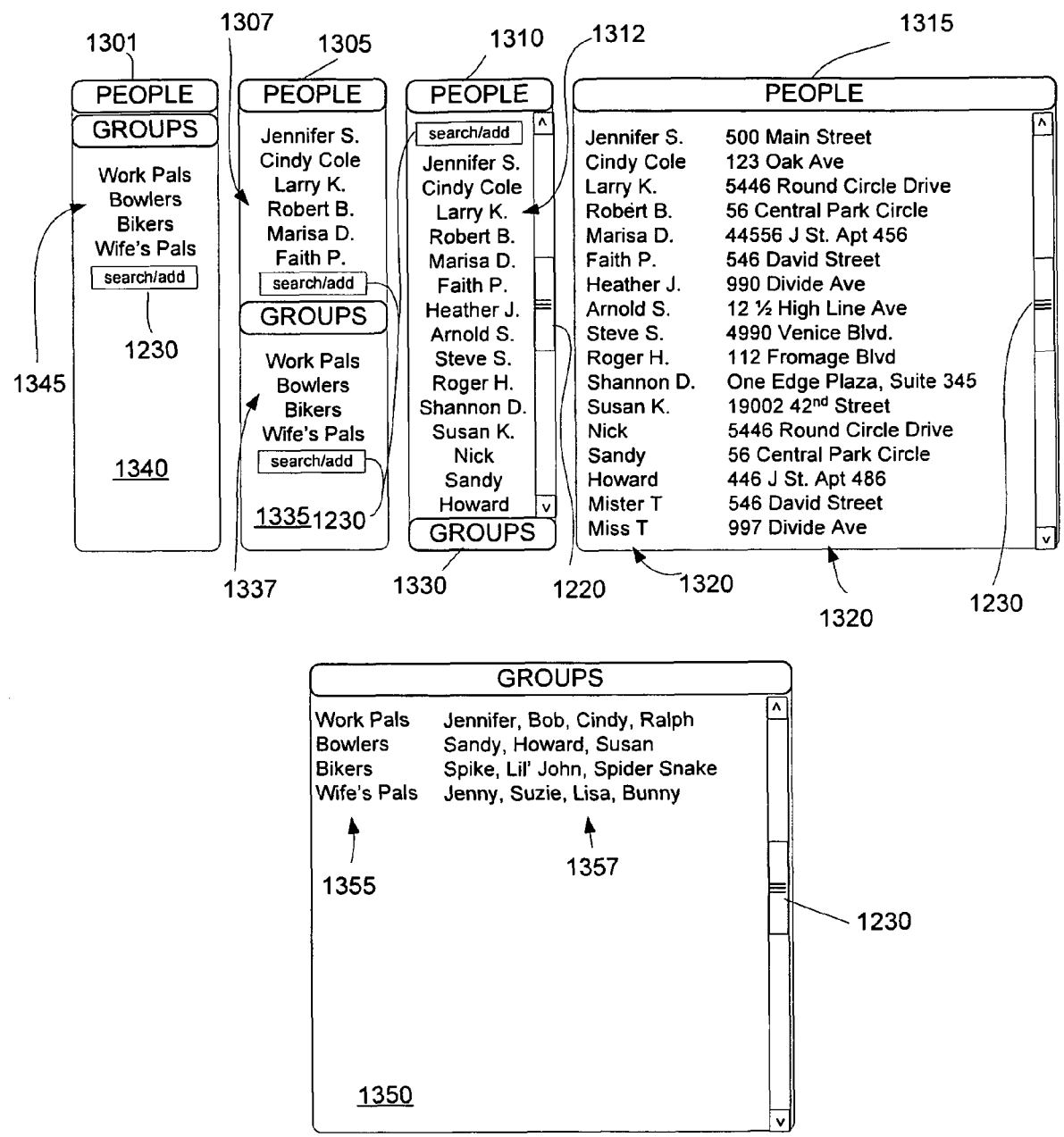
FIG. 13 is an exemplary illustration of the WHO strip of the user interface.

FIG. 13 shows examples of the WHO strip 1131 of the user interface which is used to create, maintain, and access a user's contact information. In FIG. 13 the reciprocal relationship between a small, a medium, and a large people and a small, a medium, and a large groups lozenge is shown.

The small people lozenge 1301 includes a title bar "People."

The medium people lozenge 1305 includes a list 1307 of a subset of a user contacts. In one example, the medium lozenge includes a list of the most popular and/or the contacts most recently communicated with. The list of contacts may include a visual indicator and label, such as stars and the word popular (not shown). The list 1307 may include up to ten contacts; however, other numbers of contacts may be provided. While connected to the service provider system 110, the web server 143 in conjunction with the applications server 144 monitors the user's interaction with the user interface to populate the list with the most relevant contacts of interest to user. The medium people lozenge 1305 also includes a search/add data entry field 1230. The search/add field 1320 may be used to search for a contact within the user's contact database. As a user enters characters within the field, the system automatically provide a list of contacts (not shown) matching those letters typed by the user. The user may select any contact from the list at any time or continue adding characters. If a contact entered in the field is not in the database, the system asks the user if they wish to add the contact to the database.

The large people lozenge 1310 includes a configurable list 1312 of a user's contacts. A navigation aid 1220 (e.g., a scroll bar or slider) may be provided for use in conjunction with a user input device to configure, manipulate, and/or sort the contacts displayed by the list 1312. For example, the configurable contact list 1312 may be sorted by: recently accessed contacts, a first name, a last name, those contacts with whom a user is currently communicating, those contacts with whom a user has planned events, appointments or activities on the calendar, those contacts for whom a user has extended an invitation, those contacts with whom a user owes a response to a message, a specific letter in a contact name, and those contacts in order of proximity to a location selected on or inputted to the "Where" strip. The desired sort option may be selected from a menu or corresponding input (e.g., a button or check box). If there are more names in a list than may be displayed within the area provided by the people lozenge, a navigation aid (e.g., a scroll bar, a slider bar, direction arrow keys, grab and move pointer, or a pointing device) may be used to navigate through or see the remaining portion of the list. Items within the list also may be rearranged by a user selecting a name with a user input device and dragging the name within the list. The large people lozenge 1310 also includes a search/add field 1230.

The extra large people lozenge 1315 includes a full list 1320 of all user contacts with a navigation aid 1220 (e.g., scroll or slider bar) that may be sorted by: a contact first name and a contact last name. In addition, inputs (not shown) may be provided to jump to a specific letter of a contact's name in the list. A number of fields of data for each contact are also displayed. For example, fields for a contact address 1321, a contact phone number, and a contact email address may be provided for each contact. Information in the displayed fields also may be edited. The extra large people lozenge 1315 occupies roughly three times the size of a normal strip.

Four additional inputs (not shown) are provided to interact with the displayed lists of the extra large people lozenge 1315: select, edit, add, and aggro. Using the "select" input or directly selecting a name from a list using a user input device (e.g., using a mouse to single click on any contact name) causes the name to be visually indicated (e.g., highlighted, bolded, outlined, etc.). In addition, selecting a name causes the other strips to focus on or present content associated with the selected contact, as explained in further detail below. Selecting the "edit" input or a name directly from a list using a user input device (e.g., by double-clicking on the name) allows the user to update the contact information. Selecting edit provides a pop-up area (not shown) with information fields populated with a selected contact's information that is stored in the contact DB. The user may edit any of the fields and save the edited contact information. Selecting the "add" input creates a pop-area including a number of blank data fields which may be populated with a new contact's information. Selecting the "aggro" input causes the contact aggregator to verify the contact information stored for the selected contact in the contact DB.

A number of symbols and indicators (not shown) may be used in association with the names listed in the people lozenge to provide additional information to a user. For example, a tiny email envelope next to a contact name may be used to indicate, at a glance, that a new message has been received from the contact. A tiny calendar/clock icon next to a contact name may be used to indicate a new calendar event has been established for the contact. A tiny clock next to a contact name may be used to indicate that the contact aggregator is in the process of aggregating this contact's information. Colors (e.g., red, blue, purple, or green) may be used to display the contact name of the list to indicate the type of contact if the contact has been indicated to be one of personal, work, friend, or family contact.

FIG. 13 also shows examples of a small, a medium, a large, and an extra large "groups" lozenge of the WHO strip 1131. The groups lozenge allows the user to define and select groups in order to organize their communications with multiple contacts. A color (e.g., red, blue, or green) may be associated with each group name to indicate the type of group based on the types of contacts the group is composed of, such as, for example, personal, work, or family. A group name listed in black indicates a group of contacts from multiple groups. If there are more group names than space in the tab a scroll bar or slider may be provided to navigate the list.

The small groups lozenge 1330 includes a title bar "Groups."

The medium lozenge 1335 includes a list 1337 of a subset of a user groups contacts. In one example, the medium groups lozenge 1335 includes a list of the most popular and/or the groups most recently communicated with. The list 1337 may include the names of the top ten groups; however, other numbers of groups may be provided. While connected to the service provider system 110, the web server 143 in conjunction with the applications server 144 monitors the user's interaction with the user interface to populate the list with the most relevant group names of interest to user. The medium groups lozenge 1335 also includes a search/add field 820.

The large groups lozenge 1340 includes a full list 1345 with a navigation aid 1220 (e.g., a scroll bar or slider) that may be sorted by: the most recently selected group, a group name, a groups with whom the user is currently communicating with, a group with items that are on the calendar, a group that has been invited to an event, a group size (e.g., number of members), a group's creation date, and an RSVP or a not RSVP group. Any person, group, or activity may be tagged by the user as an RSVP. This means that any activity that includes the RSVP person or RSVP group must have all contacts or groups of contacts tagged as RSVP agree to attend the activity before the service provider system 110 identifies the activity as booked. If a person, a group, or an activity is not so tagged, then the activity may be booked regardless of how many invitees agree to attend. The large groups lozenge 1340 also includes a search/add field 1230.

The extra large groups lozenge 1350 includes a full list of all groups names 1355 associated with the user and a navigation aid 1220. For each group a list of contacts 1357 in the group is provided. In addition, a number of fields associated with each group may be presented, such as, for example, a first name, a last name, an email address, an address (e.g., house number and street name) 1358, a city, a state/province, a zip code/postal code, a country, a home land line phone number, a mobile phone number, a work land line phone number, a relationship to the user (e.g., friend, family, or business), and a RSVP flag (either yes or no). All fields may be selected and edited by the user. Five additional inputs (not shown) are provided on extra large groups lozenge 1350: select, edit, create a group, add a person, and aggro. Using the "select" input or directly selecting a group name from the list using a user input device (e.g., using a mouse to single click on any group name) displays the names of all contacts within the group (e.g., highlighted, bolded, outlined, etc.). In addition, selecting a group name causes the other strips to focus on or present content associated with the selected group. Focusing is described in further detail below. Selecting the "edit" input or a group name directly from the list using a user input device (e.g., by double-clicking on the name) allows the user to edit the contacts listed in the group. Selecting the "create a group" input allows a user to create or define a group. Selecting the input "add a person" allows the user to add a new contact to an existing group. Selecting the "agro" input causes the contact aggregator to verify the contact information of the contacts listed in the group.

A user also may create a group using the add/search field 1230. The user may type in a new group name in the field 1230 using a user input device. The new group name is then displayed in the list of groups 1337 or 1345. The user may then drag and drop one or more names of contacts from the people lozenge to the group name in the groups lozenge to automatically add those people to their groups. Similarly, a user may automatically add a new contact to any existing group by dragging a name of a contact from the people lozenge to the group name in the groups lozenge.

In addition, the size of the people and groups lozenges have a reciprocal relationship with each other. For example, when the people lozenge is small, the groups lozenge is large. When either the people or groups lozenges are medium the other lozenge also is medium. When the group lozenge is small, the people lozenge is large. When either the people or groups lozenges are extra large, the lozenge occupies the entire WHO strip 1131.

The WHAT strip 1133 provides content and functionality regarding a user's daily communications and activities. The WHAT strip 1133 helps the user manage and organize these communications and activities through use of five lozenges: activities, to-do, shopping, read, and send.

Figure 14:
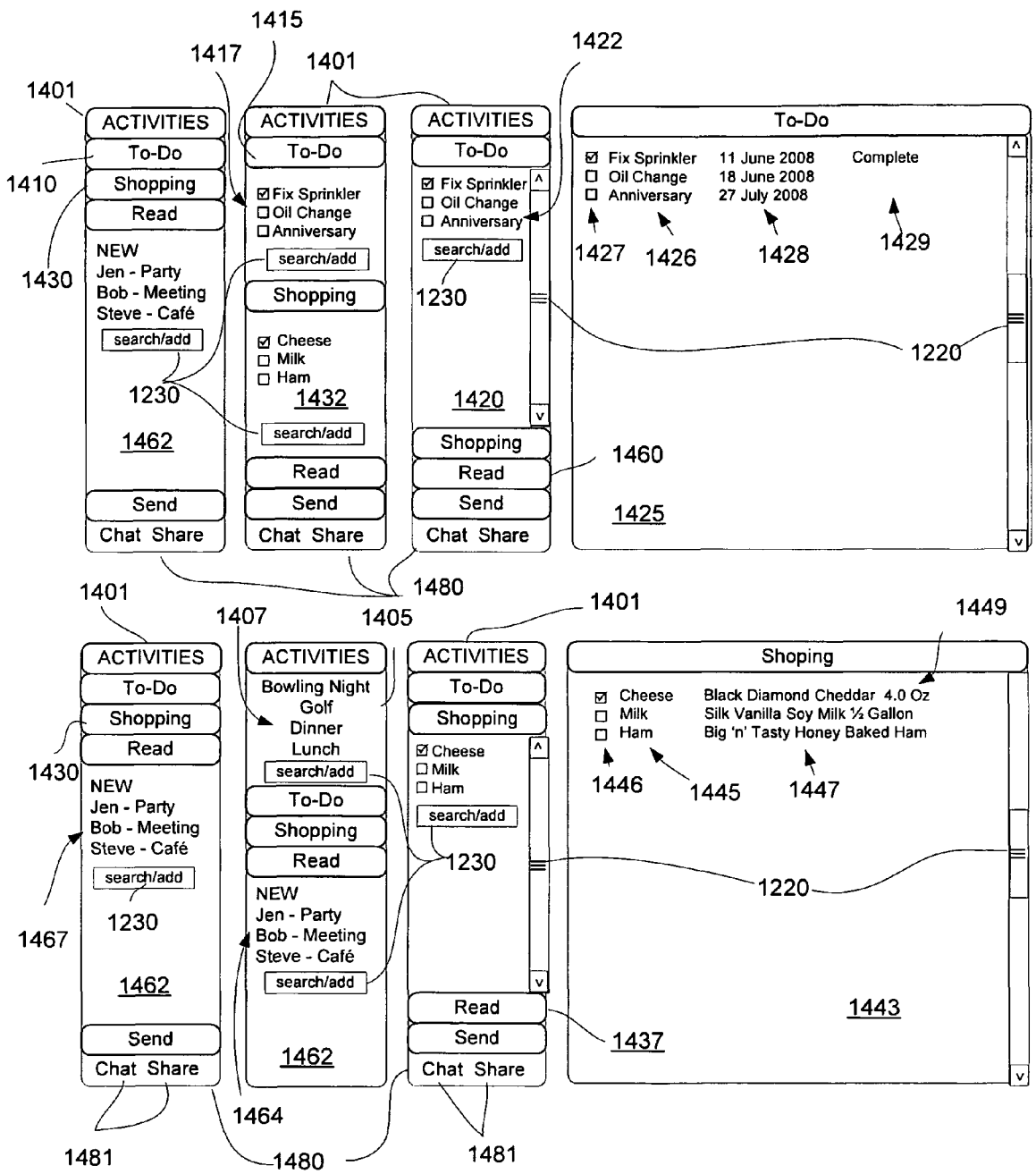
FIG. 14 and FIG. 15 are exemplary illustrations of the WHAT strip of the user interface.

As shown in FIG. 14, the activities lozenge provides a list of activities that a user frequently engages in order to help a user plan events. The activities lozenge may be small or medium. The small activities lozenge 1001 just includes a title "Lozenge." The medium activities lozenge 1005 includes a list of activities 1007, for example, a top-ten list of activities. The top-ten list is automatically populated based on a combination of the most recently used user activities combined with activities that have been most frequently repeated. A search/add data 1230 entry field also is provided. The data entry field 1230 may be used to search through a list of a user's prior activities or add a new activity to the list. Adding a new activity causes a pop-up window to be shown with fields that the user may choose to fill to further define the activity.

In addition, the user interaction with the other lozenges affects the list of activities provided through focusing. For example, when a person or group's name is selected on the people or groups lozenge, the activities lozenge shows the top-ten activities that have been scheduled in the past with that person or group. When a location is selected from the locations lozenge, the activities lozenge is populated with up to ten activities that have most frequently occurred at or in the vicinity of the location. When a calendar date is selected, the activities lozenge is populated by the most common activities that occur on that date. For example, if a user selects Sunday morning, "Go to Church" might appear in the activities list. If the user selects the evening of February 14, then "Valentines Day Dinner" may appear in activities list. If a user selects their own name from the people lozenge, then the activities lozenge is populated with the top ten activities attended by the user. A user may select an activity from the list 1407 with a user input device, and drag the activities onto the calendar lozenge to a particular day and/or time to create a calendar event for that activity, as explained in further detail below.

FIG. 14 also shows an example of a small, a large, and an extra large a To-Do lozenge. The To-Do lozenge helps keep of list of items that a user wants to complete and keep track or be reminded of.

The small To-Do lozenge 1410 just includes the title "To-Do." The medium To-Do lozenge 1415 includes a list of up to the ten oldest To-Do items 1417. Each To-Do item on the list 1417 may include a user selectable input to indicate completion of the item, such as a check or tick box. Using a user input device the user may select the input to cause a visual mark to appear in the box (e.g., a check mark or x) to indicate that an item has been completed. In addition, the marked item may be visually distinguished (e.g., highlighted or low lighted or grayed out) moved to the end of the list and marked as "done." A search/add data field 1230 may be provided to search for a particular To-Do item from the list and to add a new item to the To-Do list.

The large To-Do lozenge 1420 includes a complete list 1422 of all a user's To-Do items. In addition, a navigation aid 1220 is provided to navigate or scroll through the entire list if there are more items on the list than may be displayed in the space provided. A search/add data field 1230 also is provided.

The To-Do items may have associated with them information fields about chores and/or tasks that a user wishes to remember and complete, such as a name field, a description field, a start date/and or time field, a reminder field, and an indication of completion of the item (e.g., "Done" or a completion date and/or time). When open to the large or extra large lozenge, To-Do items may be created by the user directly typing a new item in the list. The To-Do list items may be re-ordered, edited, checked off by the user. Items may be reordered simply by selecting an item and dragging it to another position on the list. Each item may include a user selectable input to indicate completion of the item, such as a check box. Using a user input device the user may select the input to cause an indication to appear in the box (e.g., a check mark or x) to indicate that an items has be completed. In addition, the checked item may be visually distinguished (e.g., highlighted or low lighted or grayed out), moved to the end of the list and marked as "done."

The extra large To-Do lozenge 1425 also includes a complete list 1426 of all To-Do items and the various information fields, such as, a completion indicator 1427, a date added 1428, a date completed 1429, and a reminder date (not shown). The items may be re-ordered, edited, checked off. The list may be sorted by: due date, reminder date, when added, letter or alphabetically, and done and/or completion date.

FIG. 14 also shows examples of the shopping lozenge. The shopping lozenge may be used to keep track of all items to be purchased by a user. FIG. 14 shows a small, a medium, a large, and an extra large shopping lozenge. The small shopping lozenge 1430 just includes the title "Shopping." The medium shopping lozenge 1432 includes a list 1434 of up to ten oldest shopping or highest priority shopping items. Each shopping item on the list 1434 may include a user selectable input (e.g., a check or tick box) to indicate the item has been purchased. Using a user input device the user may select the input to cause a visual mark to appear in the box (e.g., a check mark or x) to indicate that an item has been purchased. In addition, the marked item may be visually distinguished (e.g., highlighted or low lighted or grayed out) moved to the end of the list and/or removed. A search/add data field 1230 may be provided to search for a particular shopping item from the list and to add a new item to the list.

The large shopping lozenge 1440 includes a complete list 1442 of all a user's shopping items. The complete shopping list 1442 may be re-ordered, edited, checked off. Items may be reordered simply by selecting an item and dragging it to another position on the list. Each item may include a user selectable input to indicate purchase of an item, such as a check box. Using a user input device the user may select the input to cause an indication to appear in the box (e.g., a check mark or x) to indicate that an items has been purchased. Alternatively, purchased items may be removed from the list. In addition, a navigation aid 1230 is provided to navigate or scroll through the entire list if there are more items on the list than may be displayed in the space provided. A search/add data field 1230 also is provided to add items or items may be added by directly typing them in the list.

The extra large shopping lozenge 1443 also includes a complete list 1445 of all shopping items in addition to various information fields, such as, a user selectable input to indicate purchase of an item 1446, a description 1447, a date added, a date purchased, and an amount 1449. Shopping items may be created and added to the shopping list by the user directly typing a new item in the list. The items may be re-ordered, edited, checked off. The list may be sorted by: description, date purchased, amount, date added, and by letter or alphabetically.

FIG. 14 also shows an example of a small, a medium, a large, and an extra large read lozenge. The read lozenge also a user to receive and manipulate various communications directed to the user.

The small read lozenge 1460 just includes the title "Read."

The medium read lozenge 1462 includes a list of identifiers 1464 for the most recent, unopened, new messages and/or threads that have been received by the service provider system 110 directed to the user. The list may include an indicator of the contact from whom the message was sent and a subject indication.

The large read lozenge 1465 includes a complete list 1467 of identifiers for all new messages and/or threads stored by the service provider system 110 which have not yet been responded to by the user. The identifiers may include a name of the contact sending the message and a topic of the thread. In addition, an indication (not shown) of the number of new messages associated with the thread or topic may be provided. If there are more message indicators than may be displayed in area of the lozenge a navigation aid 1220 (e.g., a scroll bar, a slider bar, direction arrow keys, grab and move pointer, or a pointing device) may be used to navigate through or see the remaining portion of the list. In addition, search/add field 1230 may be provided to search for a message.

Figure 15:
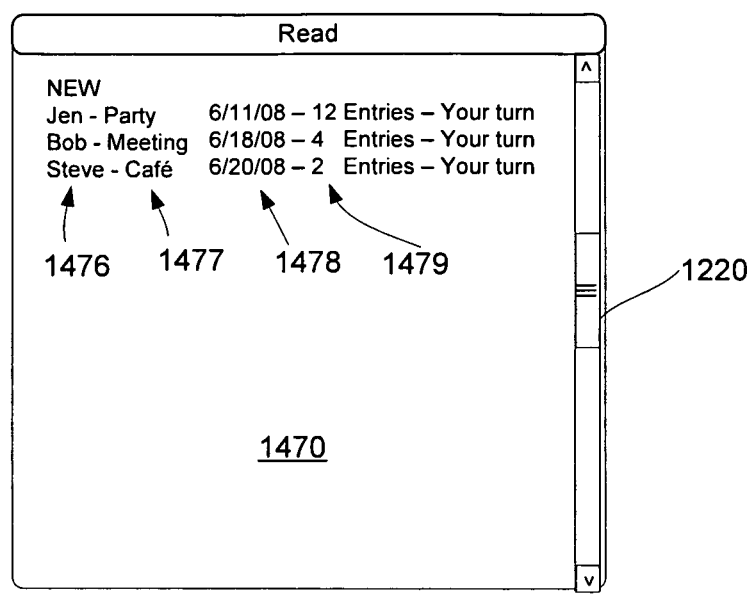

FIG. 15 shows and example of the extra large read lozenge 1470. The extra large read lozenge 1470 includes a complete list 1475 of identifiers messages and/or threads stored by the service provider system 110 in addition to various information fields, such as, a contact sending the message 1476, a topic of the message 1477, a date the message was received 1478, a number of entries in the message thread 1479, and who is to respond to the message 1480. Next to each identifier (not shown) an indication of how long (e.g., minutes, hours, days) the sender of a message has been waiting for a response. The user may select any identifier of any thread to read, edit responses, add responses, and perform other actions. Five input filtering options selections are provided for these threads: current subjects, by person, by date, by lateness, and archived. The current subjects input may be selected to display indicators of threads that are current. Current may be defined as a period of time set by the user's preferences and/or may include indicators of threads that have not been responded too. The by person input sorts the list of thread indicators alphabetically by contact name. The by date input sorts the list of threads indicators by date listing the newest threads first. The by lateness input sorts the list of thread indicators by respondent lateness. The archived input opens a complete list of indicators of archived threads that have previously been closed by the user.

Figure 16:
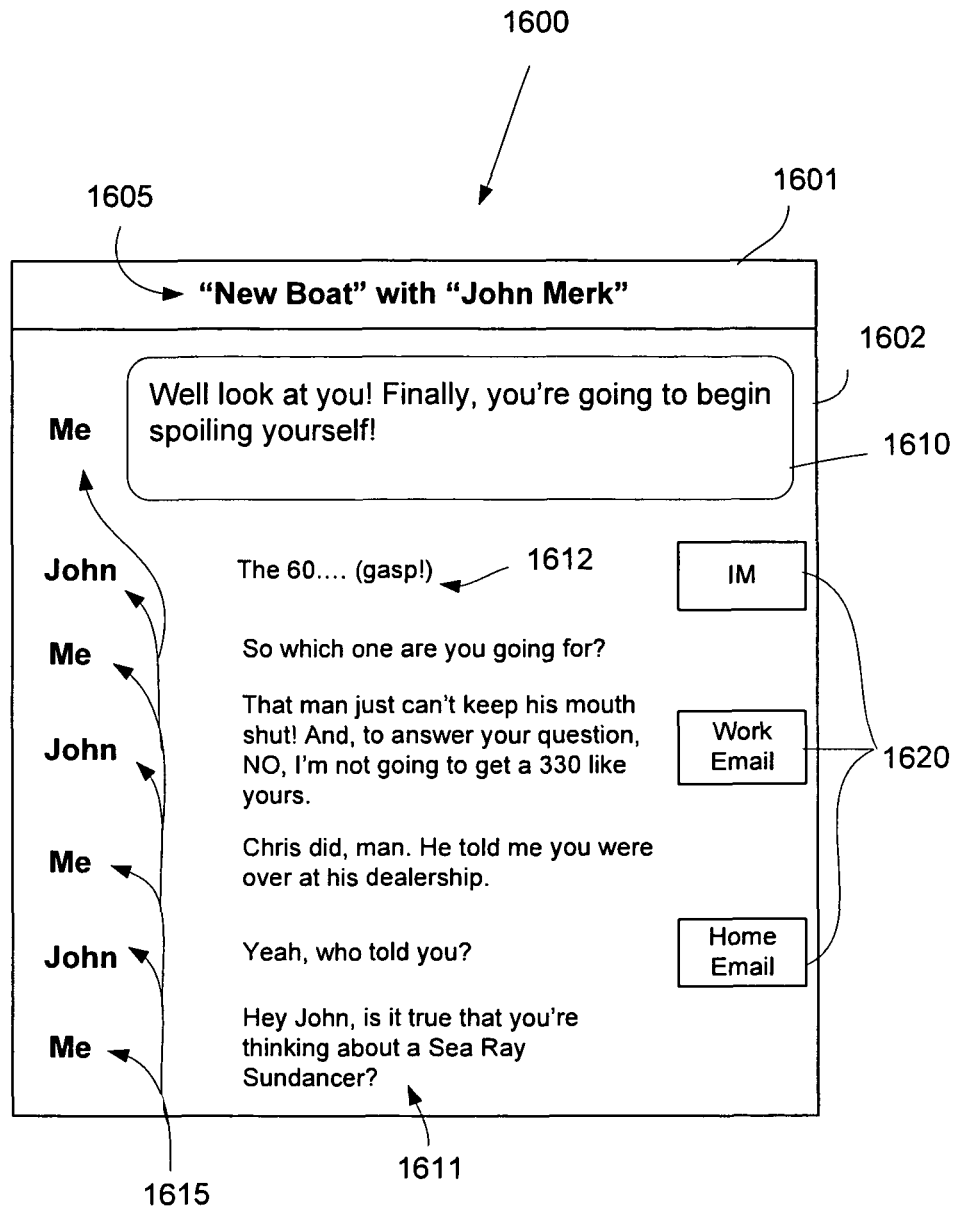
FIG. 16 is an exemplary illustration of a message pop-up window.

As shown in FIG. 16, selecting any thread or message indicator from either the list with a user input device (e.g., using a cursor or pointer or highlighted area controlled by a mouse, keypad/board, pointing device, touch-screen/pad to select the thread indicator) opens the thread in a popup window 1600 for viewing by the user. The window 1600 may include an informational area 1601 and a message area 1602. The informational area 1601 includes the type of message (e.g., personal, business, group) (not shown), the message thread identifier 1605, a start time of the message thread (not shown), and a time of last response (not shown). The message area 1602 includes an area 1610 (e.g., a rounded box) at the top of the message thread 1611 where the user may enter or type their response to the latest received message 1612. Below the box is the text of each piece of the message thread 1611 and an indicator 1615 of whom the piece text of the thread was generated by. A message type/link icon 1620 may be provided in the window next to each received text which notifies the user which account or media type (e.g., POP3 work, POP3 home, virtual fax, IM, SMS, site specific email, etc.) that was used to send the text associated with the message. Selecting the icon 1620 with a user input device opens another window (not shown) to display the original message in its full original format.

FIG. 14 also shows an example of the send lozenge. The send lozenge is used to send messages to contacts. The send lozenge may be locked at the end of the WHAT strip 1133 and is provided in only as a small send lozenge 1480. In one example, the small send lozenge 1480 may be slightly larger than other small lozenges to accommodate one or more inputs 1481. In one example, the inputs are share, chat, and organize (not shown).

To send a message the user simply selects a name of a contact from the people lozenge, or the name of a group from the group lozenge of the WHO strip 1131 using a user input device. After selecting the name, the user drags the name from the list of the WHO strip 1131 onto any one of the buttons: share, chat, and organize. Alternatively, the user may select one of the inputs 1481 with a user input device. Selecting one of the send inputs 1481 causes the service provider system 110 to create a pop-up window for display as a screen on the user device. The screen (not shown) includes the message "Who shall I send the message to?" The screen also includes a window in which the user may type the contact or group name or select a name from a drop down menu.

The share button may be used to share pictures, videos, web sites, computer documents (e.g., PDF, MS Word, etc.), FYI, change of address, newsletter, and a vacation notification) and other content with contacts and groups. The chat button may be used for personal talk, group talk, polls, and event creation. The organize button may be used to create an event (one-time or repeating), such as, an appointment, a meeting, a party/group event; an RSVP party (e.g., a wedding or a birthday), a potluck or any other gathering of contacts. Each input causes a popup window to request information typically specific to that type of communication. If the name of the group or contact is dragged to the button, the popup window is automatically populated with the contact information for the type of message. Once the user enters the requested information, the message is sent by the service provider system 110 using the selected format and/or protocol for the type of message. In addition, the threader adds the message to the message archive.

Figure 17:
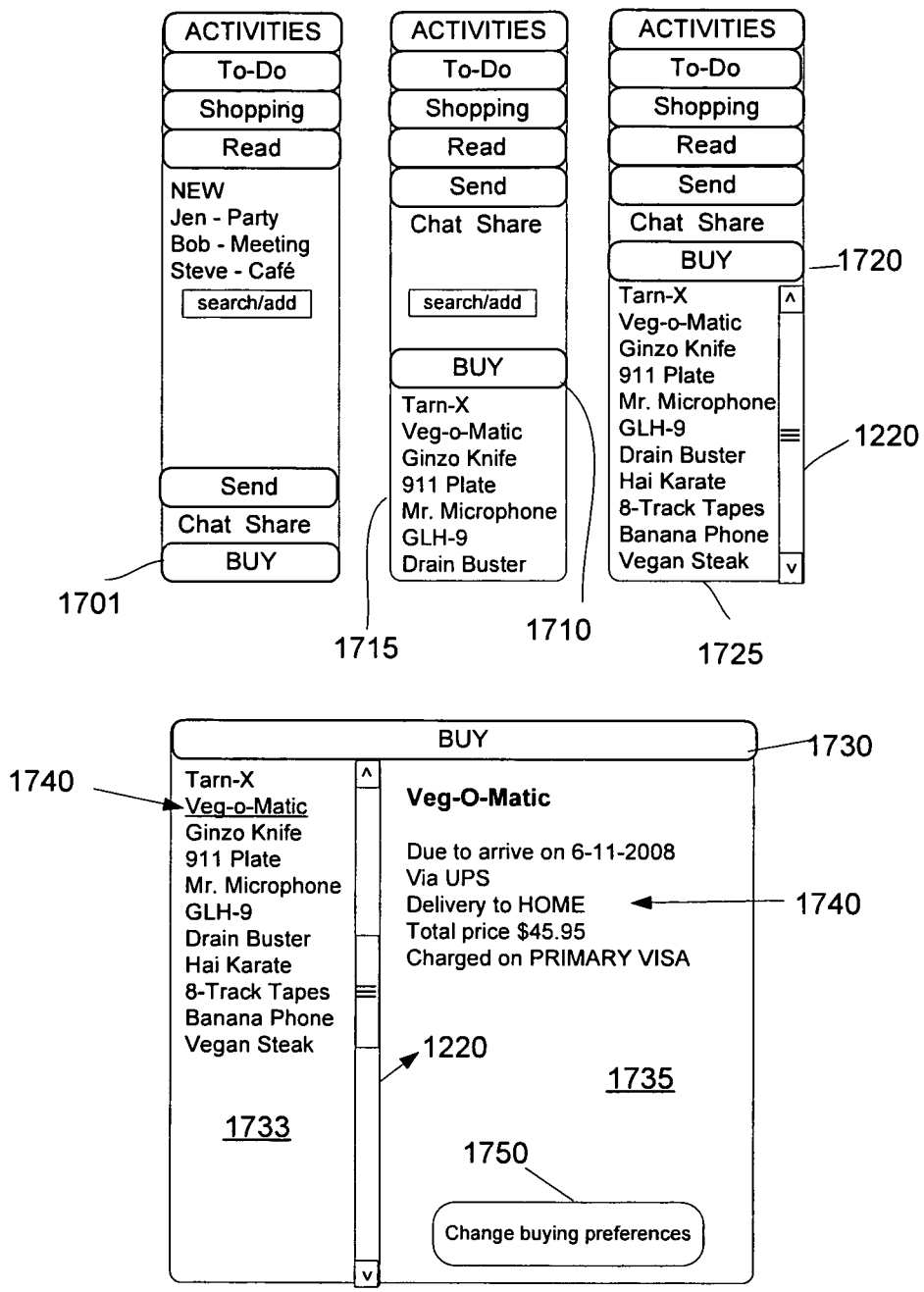
FIG. 17 is an exemplary illustration of the WHAT strip of the user interface.

The WHAT strip 1133 also may include a buy lozenge as shown in FIG. 17. The buy lozenge may be small, medium, large or extra large. The WHAT strip 1133 also may include a buy lozenge. FIG. 17 shows examples of the small, medium, large or extra large buy lozenge. The small buy lozenge 1701 just includes the title "buy." The user can drag any item to the buy lozenge to instruct the service provider system 110 to purchase the item. In most instances the item dragged is a shopping list item or glad. The medium buy lozenge 1710 includes a list 1715 of the top five items that the system is currently trying to buy for a user. The large buy lozenge 1720 includes a complete list 1725 of all items being purchased by the system. The extra large buy lozenge 1730 provides a complete list 1733 of all items being purchased by the system. If there are more items that can be displayed, a navigation aid 1220 is provided. A description area 1735 provides information 1740 about a selected item 1745 from the list. The information may include a name, delivery date, delivery location, total price, account payment was made by. In addition, a change buying preferences button 1750 is provided to access various fields that store user preferences allowing a user to specify price ranges for products, payment information, delivery addresses and other instructions pertinent to making a purchase.

The personal profile allows a user to specify specific items and types of items the system service provider 110 may automatically buy for the user. The user may specify what price ranges (e.g., a maximum, a minimum or both) that are okay for the system service provider to user in determining whether to make a purchase. The user profile buy information may include payment information, such as credit card, debit card, paypal, online banking information, a single purchase spending limit, a monthly purchase spending limit, and a card balance limit. The user also may specify shipping preferences, such as carrier preference (e.g., UPS, Fed-X, USPS, etc.), transit preference (e.g., overnight, 2 day, "slow and cheap"), shipping address, special shipping instructions (e.g., doorbell inoperative), and instant delivery preferences.

The buy lozenge may be withheld or not appear on the WHAT strip 1133 until a user provides their user buy information. Once set up, the user can drag any item to the buy lozenge to instruct the system service provider to purchase item. For example, a user has a To-Do item that identifies "Replace flapper valve." The user drags the item to the BUY button. The service provider system 110 determines the best price available online for a toilet flapper valve, orders it using the provided customer buy information, and places an item or event on the user's calendar with the expected arrival date.

In another example, the user has an item, or items on the shopping list that they are unable to find time to buy, or would prefer not go shopping for the item at this time. The user drags the entire shopping list, or individual items to the BUY button, and the service provider system then buys those items for the user. In another example, a user has a calendar appointment, such as BBQ. In this example the user drags that item to BUY causing the service provider system 110 to look up a user profile and determine a user's identified foods associated with an event, such as a BBQ. The service provider system 110 then purchases the user's identified BBQ foods. Similarly, a calendar appointment "ski trip" causes the service provider system 110 to book transportation (flight from local air port to destination), lodging (e.g., hotel for nights specified by trip event in calendar), and activities (e.g., advance purchase of lift tickets for closest ski resort). In yet another example, the user drags a contact name onto the BUY button. The service provider system 110 identifies any dates, events, or activities associated with the contact (e.g., birthday, Christmas, retirement party). The service provider system 110 may purchase a gift for the specified contact. If the contact is a user of the service provider system 110, the system may use receiver's profile in determining a suitable gift.

Figure 18:
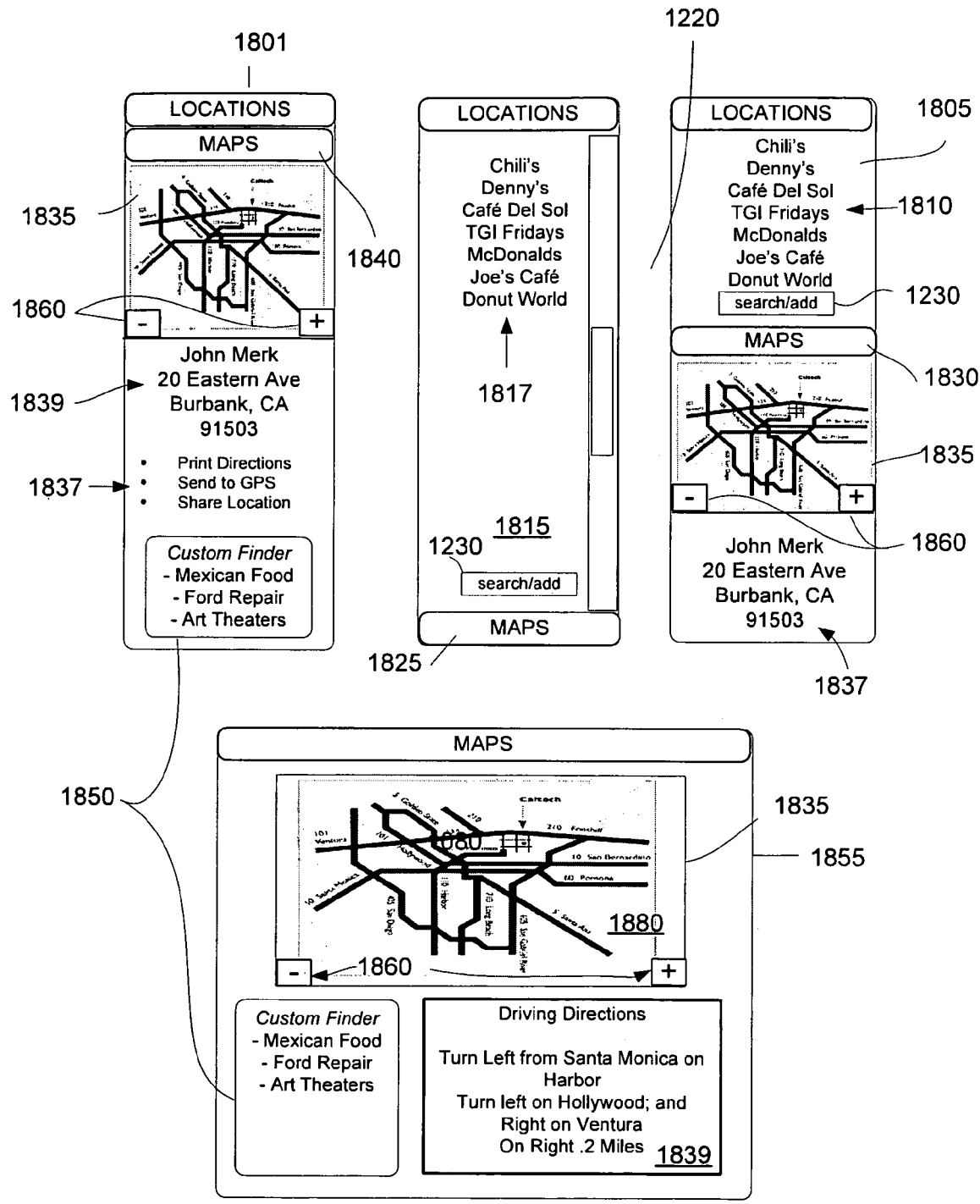
FIG. 18 is an exemplary illustration of the WHERE strip of the user interface.

The WHERE strip 1135 provides information above a user's favorite places (e.g., restaurants), locations, destinations, addresses, and other information such as maps and navigation aids. The user may look at or create instant maps to link any locations together and/or receive point-to-point directions. The WHERE strip 1135 includes two lozenges: maps and location. FIG. 18 shows examples of small, medium, large and extra large maps and locations lozenges.

The locations lozenge includes locations of interest to a user. The small locations lozenge 1801 just includes a title "locations." The medium locations lozenge 14805 includes a short locations list 1810 of up to ten locations that may be interest to a user at any particular moment. Examples of locations: may be restaurants, businesses the user frequents (stores, malls, markets), contact's address, institutions frequented by the user (schools, DMV, church, parks). In particular, the system service provider 110 focus the locations provided in the list 1810 based on the user's interaction with the other lozenges of the user interface. For example, when the user selects a contact from the people lozenge, the list 1810 is populated with the "Top Ten" locations associated with that person. When a user selects a group from the group lozenge, the list is populated with the "Top Ten" locations associated with that group. When an activity from the activities lozenge is selected, the list 1810 is populated with the "Top Ten" locations associated with that activity. When any time and date in the calendar is selected, the list 1810 is populated with the "Top Ten" locations associated with that day at that time. The medium locations lozenge 1801 also includes a search/add data entry field 1230. The search/add field 1230 may be used to search for a location within the user's database of locations associated with the user. As a user enters characters within the field, the system automatically provide a list of locations (not shown) matching those letters typed by the user. The user may select any location from the list at any time or continue adding characters. If a location entered in the field 1230 is not in the database, the service provider system 110 asks the user if they wish to add the location to the database. If so, the system saves the location in a database of locations associated with the user.

The large location lozenge 1815 includes a complete list of user locations 1817. If there are more locations than may be displayed in area provided by the lozenge, a navigation aid 1220 (e.g., a scroll bar, a slider bar, direction arrow keys, grab and move pointer, or a pointing device) may be used to navigate through or see the remaining portion of the list. In addition, search/add field 1230 may be provided to search for or add a location.

FIG. 18 also shows the maps lozenge. The maps lozenge provides an easy to use interface to allow a user to search for and find information about a location.

The small maps lozenge 1825 just includes a title "locations." The medium maps lozenge 1830 includes small map window 1835 for a selected location. An address 1837 for the location also may be displayed along with several inputs (not shown), such as print directions, send to mobile device, and share location.

The large maps lozenge 1840 also includes a map window 1835, a location address area 1837, user inputs 1839, and a custom finder 1850. The extra large maps lozenge 1855 has the same functionality as the large map lozenge but includes a larger map window 1835 and a driving directions window.

The map window 1835 shows a map of a location. The maps lozenge location is focused based on a person selected from the people lozenge or an activity selected from the activities lozenge, or as a result of selection a location or using the input field 1230 to look up an address on the locations lozenge. The map displayed by the map window 1835 may be scalable to zoom in and out from a birds-eye-view using a user input device. For example, user inputs (not shown) neighborhood, city, county, state, and region may be provided to adjust the area displayed by the map, a slider bar may be selected to zoom in and out, or buttons 1860 may be selected to increase or decrease the scale of the map. In addition, the user input device may be used to control the zoom feature (e.g., a scroll wheel provided on a mouse). The map may include an indicator of the location within the context of the map.

Using a screen position indicator (e.g., a cursor or a pointer) in conjunction with a user input device (e.g., a key pad/board/buttons or a mouse) or using input directly from a user input device (e.g., a stylus or finger touching a touch screen) the user may select a point on the map. Maintaining selection on the map, the user may manipulate the position indicator or stylus in along one or two axis to draw a box or rectangle on the map. After drawing the box, the system automatically populates the area outlined by the box with information and/or indicators of all contacts and/or events that have addresses stored by the system databases that correspond to the location on the map within the user drawn box. Position of a cursor or pointer on the indicators causes a pop address (not shown) to appear associated with the indicator.

The maps lozenge includes several user selectable inputs 1937: directions to this location, find near this location, and transfer data to GPS/Smartphone. Selecting directions to this location provides directions to the selected location from a current location of the user (as determined from the user database or GPS data provided by the user device 101). Additionally, the user may provide a start location to manually configure a desired route.

The find near this location inputs include a dynamic list of a number of inputs that are most likely to be desired by a user viewing the location information. The service provider system may determine the dynamic list based on data stored in the user profile (e.g., favorites and dislikes provided by the user) and/or empirical information of data found most useful by users. For example, the inputs fuel stations, restaurants, and WIFI hotspots may be selected. Selecting any one of the inputs causes a visual indicator to appear on the map of the locations associated with the selected input. Placing a cursor, a pointer, or other user controllable selection mark over the indicator causes a small popup to display in association with the indicator giving more details and a dynamic hyperlink to a webpage for the entity represented by the indicator. In addition, selecting the indicator allows the user to obtain directions to the address associated with the displayed entity.

The transfer data to GPS/SMART phone input allows a user to transfer information, such as directions or files stored by the system service provider 110 to a user's mobile device. As a result, the user may access the directions or files using the mobile device.

The custom map finder 1850 provides a window that includes a number of inputs 1866 that may be selected by the user to populate the map with information. The service provider system 110 automatically populates the list with inputs based on the user's profile and interaction with the system. The list shown in the example of FIG. 18 includes inputs for Mexican food, pizza, Ford parts, and Art Theatres. Selection of in input, for example, fuel stations, causes the map to display indicators for fuel stations within the displayed area of the map window. The list of inputs is dynamic and is automatically populated at any particular time by the system to display those inputs to be of most use to a user. For example, the system may use time of day (e.g., lunch time or diner time) to display inputs for food choices based on the user profile stored in the system DB. Other inputs may be chosen based on information provided by the user questionnaire and user profile stored in the database, for example, indicated interests and hobbies of the user. The system may also search a user's upcoming events to populate the list with inputs. For example, if a task on the To-Do list includes "Get oil changed for Car" the dynamic list may be populated with the input service stations. If the user has an event scheduled, the list may provide an input "hotels" to suggest places to stay based on the event location.

The search/add window 1230 may be provided to allow a user to manually enter in a location, name, contact, or business using a user input device. The input is provided to the system (e.g., by selecting an enter button or selecting and icon such as a magnifying glass). The system performs a search based on the input information and displays a result. The user selects an item from the list. The address is then displayed as the location and the map is automatically adjusted to display the location based on the selection.

The WHEN strip 1137 keeps track of time sensitive or related information for the user. The WHEN strip 1137 includes a single lozenge: a calendar lozenge. The calendar lozenge displays information for a user including indicators, identifiers, and data for all activities, to-do items, appointments, and other data items having a time based element that the system 110 tracks for the user to allow a user to manage and organize their daily events. The size of the days and weeks dynamical adjust based on user interaction with the calendar lozenge, as explained in further detail below. The calendar lozenge may be large and extra large. FIG. 19 shows an example of the large calendar lozenge 1901. The large calendar lozenge 1901 provides an agenda area 1910 and a mini calendar 1915. The agenda area 1910 shows a list of the user's next ten events. The mini calendar is a smaller calendar that shows busy and free times but no details. The large calendar is two columns wide.

Figure 20:
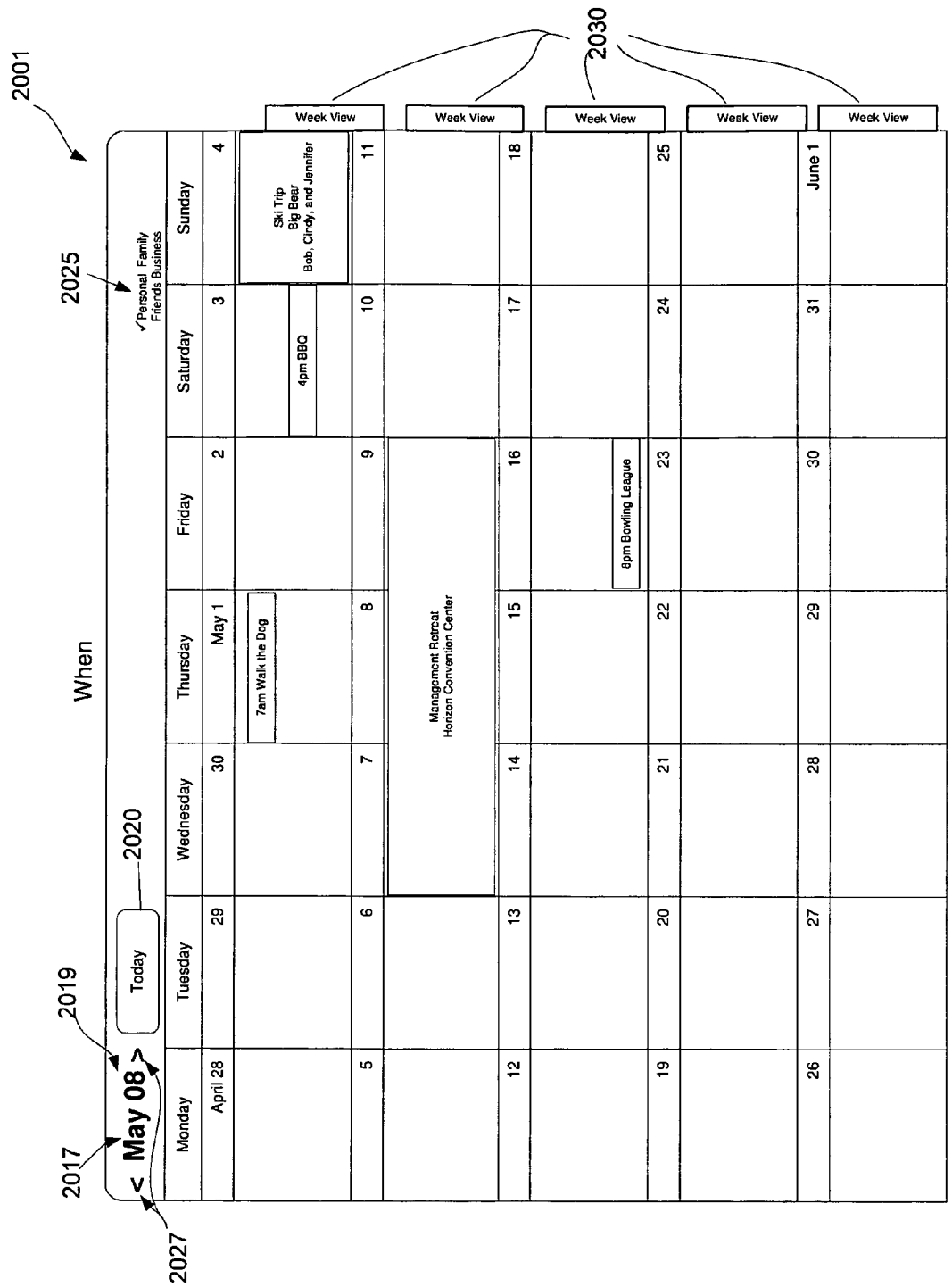
FIG. 20 is an exemplary illustration of the WHEN strip of the user interface.

FIG. 20 shows the extra large calendar lozenge 2001. The extra large calendar lozenge 1901 is approximately three columns wide. The extra large calendar lozenge 2001 includes a calendar indication days of the week (e.g., Sunday-Saturday) and days of the month (e.g., 1-28, 1-29, 1-30, and 1-31). The calendar also includes an information bar 2015. The information bar 2015 includes an indicator of the month 2017, the year 2019, a today button 2020, and inputs 2025 personal, family, friends, and business to control display of items within the calendar to present events associated with a selected input. The month indicator 2017 displays the month (e.g., May) currently displayed by the calendar. The month may be changed by selecting the arrow inputs 2027 to either side of the month indicator 2017 to move to the next or previous month from the month displayed. The year indicator may be selected to change the year displayed. Additional inputs week view 2030 may be used to adjust the size of any week displayed, as described below. One or more the inputs 2025 may be selected at anytime to toggle the display of events associated with the selected event category (e.g., personal, family, friends, and business). For example, selecting personal and family causes the calendar to display user events of type personal and family. Unselecting an input removes those corresponding events. In this example, unselecting family causes all events of family type to be removed leaving only personal events displayed.

Within each day displayed on the calendar are indicators for any calendar events stored by the system associated with that date for a user. As shown in FIG. 20, the calendar is focused on personal calendar events of the user. The calendar events may include To-do items or reminders (e.g., 7 am May 1 "walk the dog"), shopping items (not shown), activities (e.g., 8 pm May 16 "Bowling League" and "Ski Trip"), and appointments, seminars, engagement, and meetings (e.g., 4 PM May 3 "BBQ" and "Management Retreat"), and coupons and/or advertisements from the glad bar (not shown).

The user may create an event by selecting an item from any lozenge with a user input device and dragging the item from the originating lozenge to a date and/or time within the calendar lozenge. For example, a user can drag a name from the people or the group lozenge, an activity from the activities lozenge, a to-do item form the to-do lozenge, an email from the read lozenge, a shopping item from the shopping lozenge, and address from the maps lozenge, a location from the locations lozenge, to a calendar date to create an event. For example, the user may select contacts "Bob", "Cindy", and "Jennifer" from the people lozenge, "Ski Trip" from the activities lozenge, and "Big Bear" from the locations lozenge, and drags them all to the Sunday May 4 to create a ski trip calendar event 2035. A calendar event popup window with data fields is then presented to the user, as shown in FIG. 21.

Figure 21:
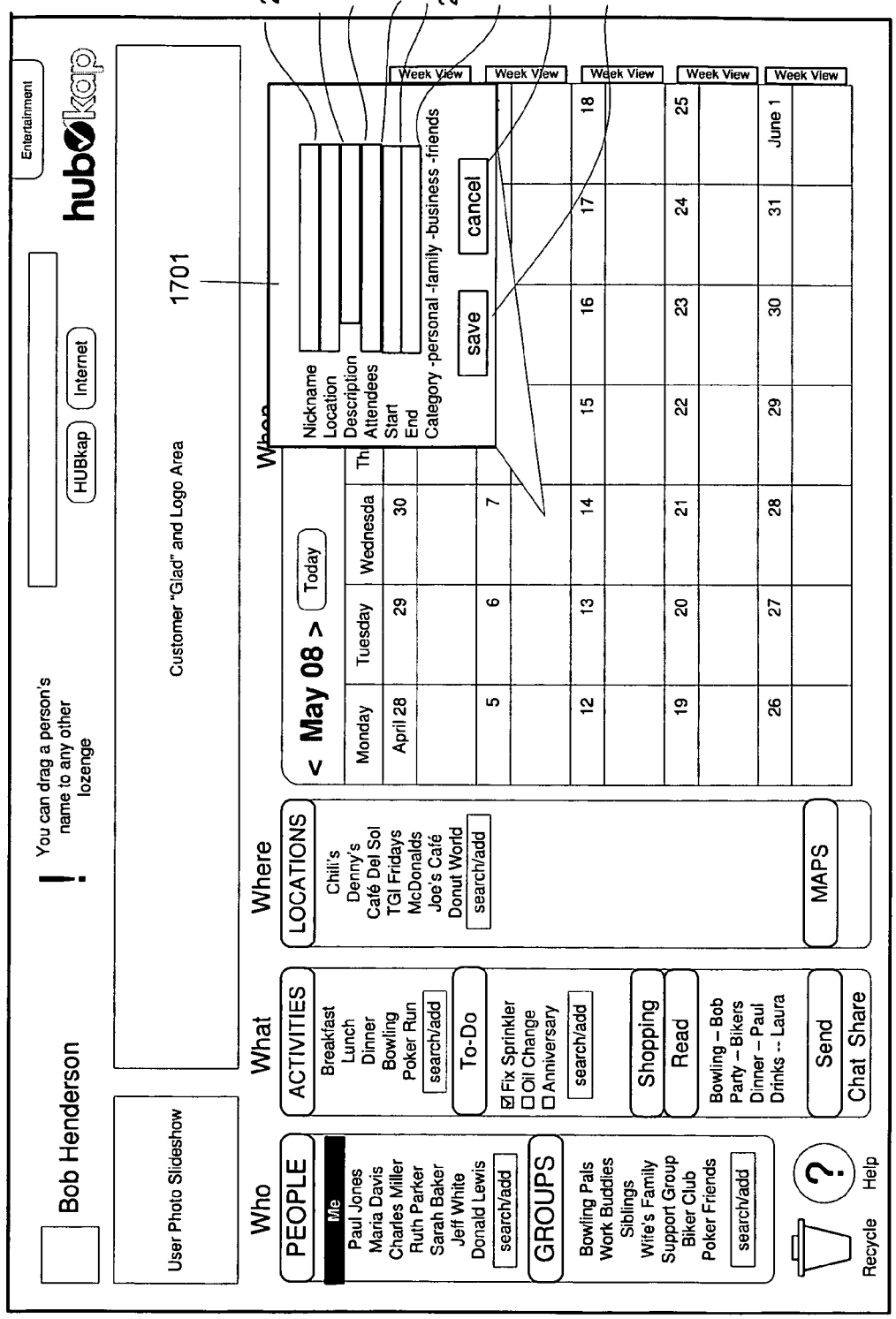
FIG. 21 is an exemplary illustration of the user interface including an event popup window of the user interface.

FIG. 21 shows a user interface with the event popup window 2101. The window 2001 includes a number of data entry fields that are automatically populated with information corresponding to the items dragged onto the date (e.g., the people, the activity, and the location in this example). For example, the window 2101 may include the data entry fields nickname 2110, location 2120, description 2130, attendees 2133, start 2135, end 2137, and category 2140 (e.g., personal, family, friends, and business). Information missing from the data entry fields may then be supplied by the user. Once the information is supplied, the user may select the save button 2145 to stored information in the user database for the event and close the popup window. A cancel button 2150 may be used close the window and cancel the event. A calendar event also may be created by selecting a date and/or time directly from the calendar using a user input device causing the event popup window 2101 to be presented in which the user may enter information in any pertinent field and/or drag items from other lozenges onto the popup window.

A calendar event may be given a nickname (e.g., "Ski Trip") as the identifier displayed in the calendar for easy reading and/or identification by a user. The item name field may be used to automatically build a nickname. For example, if the nickname is left blank the system automatically picks the name of a lozenge item dragged to create the event. For example, if ski trip is dragged for the activity lozenge then the event nickname may default to ski trip. The nickname may be edited by the user to override any automatically generated nickname.

In another example, items directly dragged to a calendar date may automatically create an event. If a lozenge item is dragged to any date on the calendar in the month view, an event is automatically created at for noon on the that date with whatever content is associated with the lozenge. For example, if Bill is dragged to June 1, an event nickname Bill is provided for a 1 hour meeting with Bill at noon on June 1. A message is sent to invite Bill. The user may select the item on the calendar to access the event and to edit or provide further details. If a lozenge item is dragged to the expanded week view or day view, then the event is scheduled for the hour time slot the item is dragged to on the calendar as a default. The hour slot is also visual highlighted or shaded to indicate the planed time of the meeting. The user may then adjust the timing of the event using a pointing user input device to select the a border or portion of the highlighted region to expand or contract the highlighted area to increase or decrease, respectively, the time scheduled for the event.

The service provider system stores the calendar event information in the user database. The database has a number of associated fields, such as a general type (e.g., appointment, activity, entertainment, travel, and meeting). In addition, the fields also provide for time and date, start and end, attendees, invitees, a location, items needed, event category type (e.g., personal, friends, family, and business), among others. Any information associated with a lozenge that is dragged to create the event is populated in the fields. This information may be changed, deleted or supplemented by the user. In addition, the fields also may be customized for information solicited based on the type of event (e.g., a particular activity, such as "BBQ" may include additional information like catering, potluck, bring an item). The information requested by the fields may be filled in by entering information in the field using a user input device. In addition, further items may be dragged from lozenges to the popup window to continue to fill out the event information. For example, additional names may be dragged from the people lozenge, a location from the location lozenge, a shopping list from the shopping lozenge. In addition to the nickname, a descriptor, a description/notes, and an advertisement or coupon from the graphic/advertising bar may be provided.

All items shown in the calendar are color coded based on an event type, such as personal, family, business, and friends. In addition, inputs 2025 are provided to filter information displayed in the calendar. For example, inputs 2025 personal, business, family, friends may be provided to filter or overlay display of calendar items of the type selected or a combination thereof. One, several, or all of the inputs 2025 may be selected at any time. Color coded identifiers for each calendar event are shown on their respective days. If there are more identifiers than may be shown in the space provided, the identifiers shown may be filtered. For example, a priority (such as importance, time of day, next occurring, events requiring user action or providing updated information or alerts) or the types of events shown (e.g., family, friends, business, personal), or a combination thereof may be used to filter the information presented. In addition, if sufficient space is unavailable the events displayed may be periodically rotated.

Figure 22:
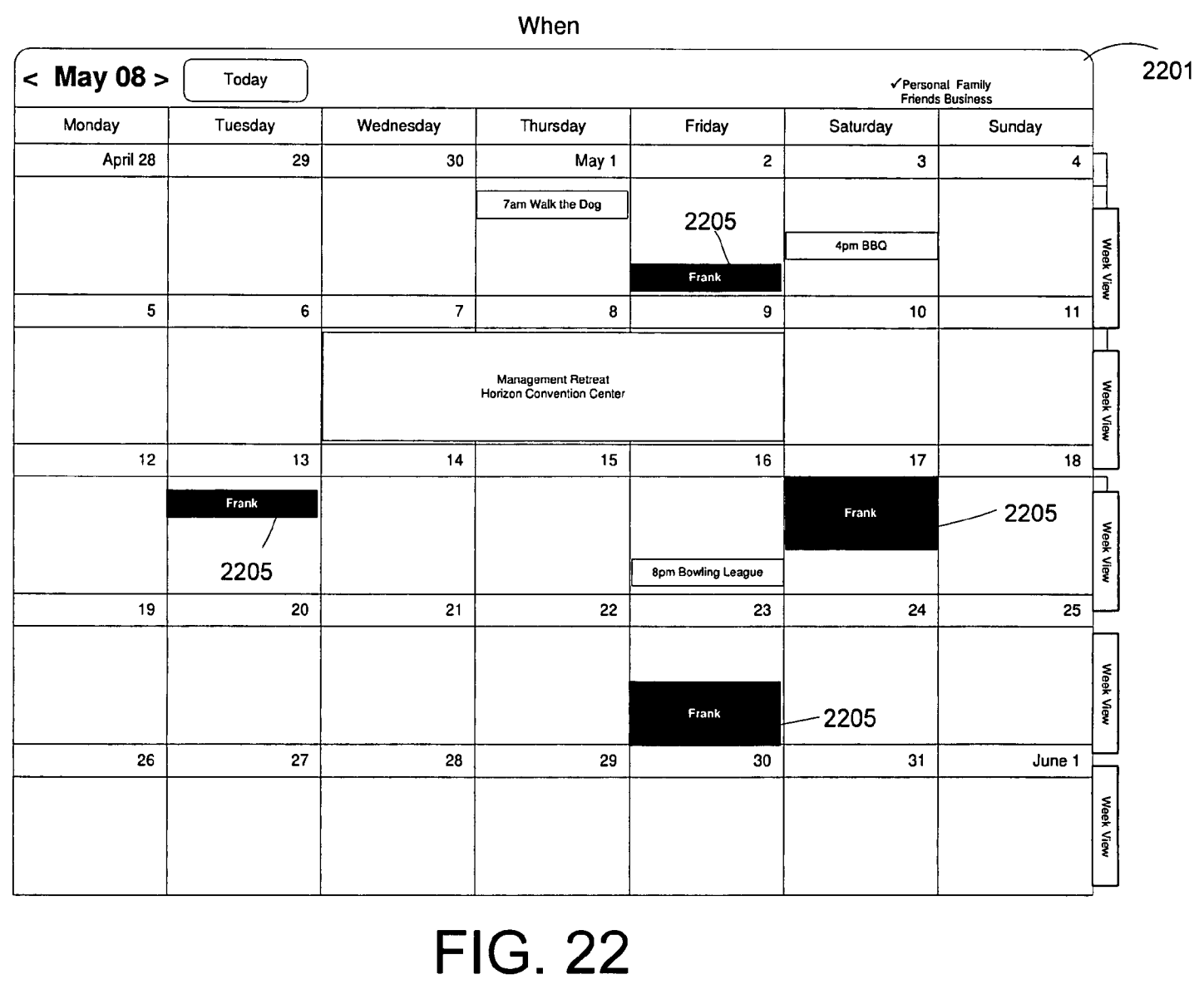

The system service provider 110 maintains calendar data for each system user. As a result, the calendar may be used to show data from other calendars which may be useful in planning events, such as meetings. For example, selecting the identifier for a system user "Frank" from a user's people lozenge causes the calendar 2001 to change to the calendar shown in FIG. 22. As shown in FIG. 22, the calendar 2201 now includes indications 2205 of periods of occupied time for which Frank has events scheduled. This is very useful for user's trying to schedule meeting. For example, looking at the calendar 2201, the user may determine the morning of May 17, Frank is unavailable to have a meeting. Holding a cursor/pointer over the indications 2105 causes a popup indication of the exact time period when in the month view shown in FIG. 22.

Figure 23:
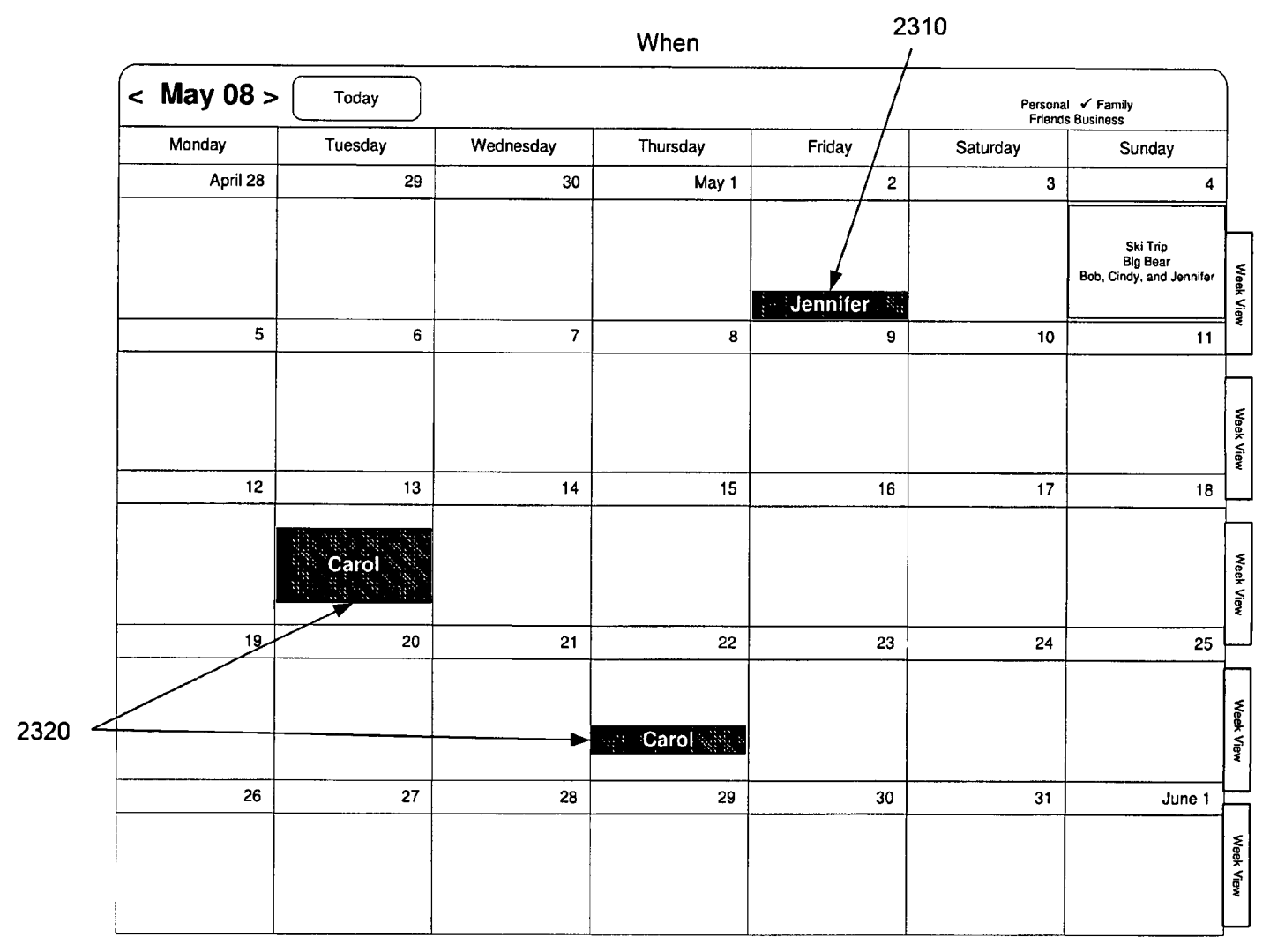

In addition, event categories also may be used to filter/display information. For example, FIG. 23 shows the user has selected the input 2025 family to display calendar 2101. As shown, the events walk the dog, management retreat, and bowling league have been removed, family event "ski trip" is shown. In addition, family members events for Jennifer 2310 and Carol 2320 are shown.

Figure 25:
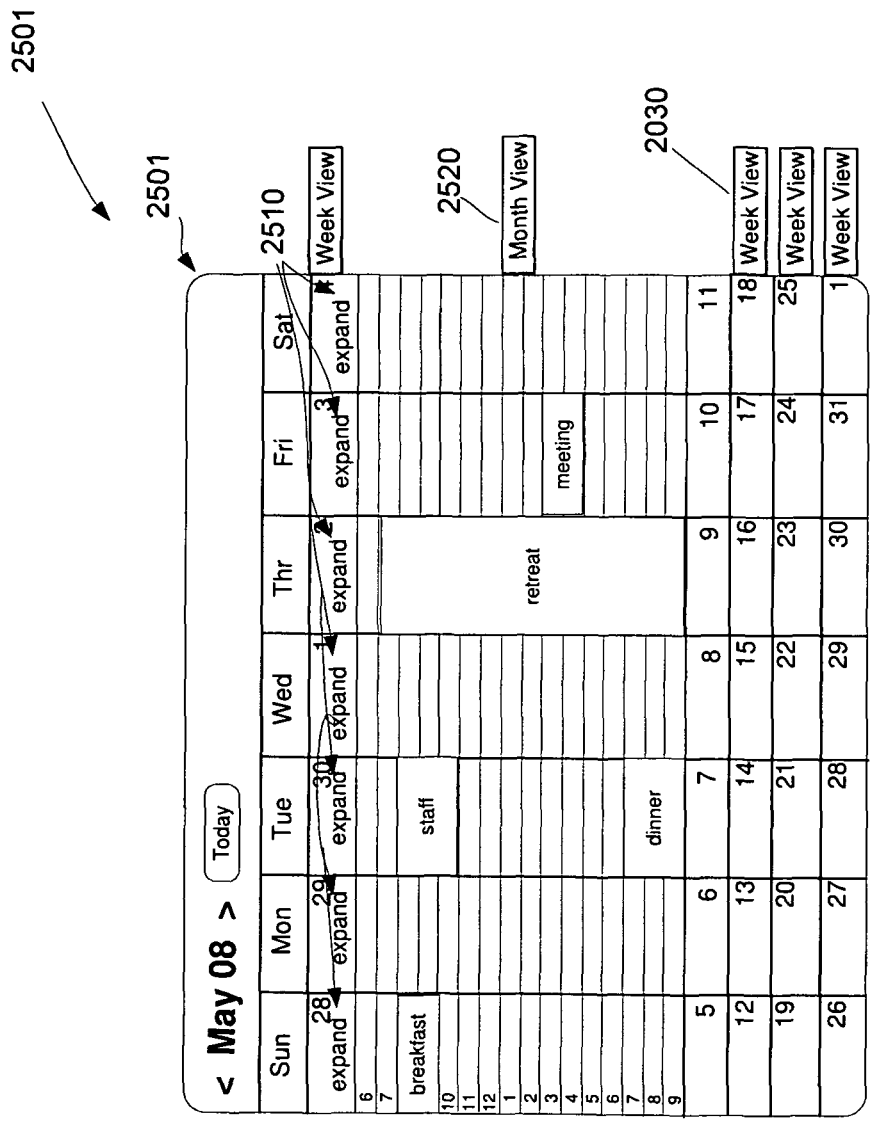
FIG. 25 is an exemplary illustration of the WHO strip with the calendar lozenge in the Expanded Week view.
Figure 26:
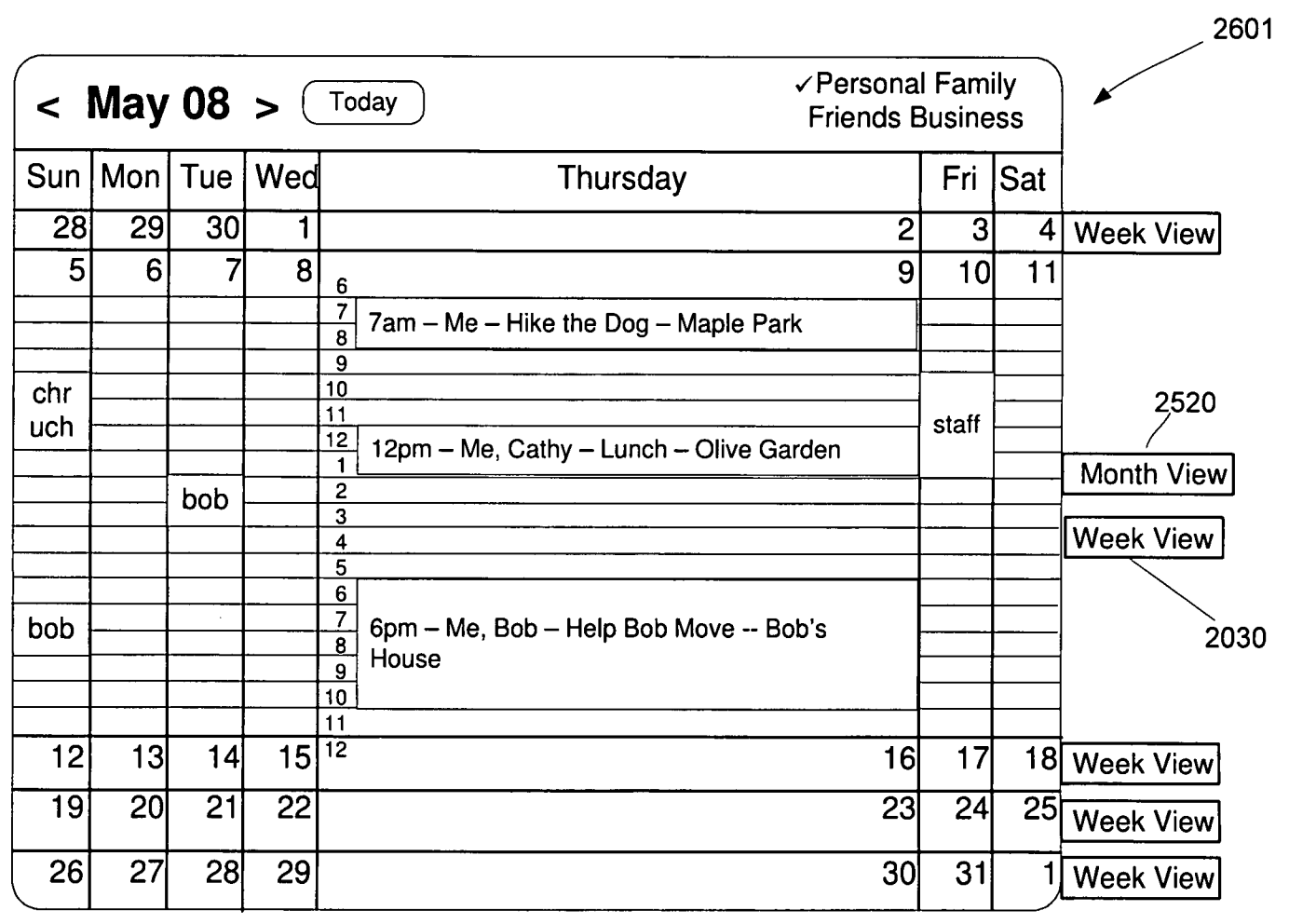
Figure 27:
FIGS. 27, 28, and 29 illustrate an exemplary sequence of selecting and dragging to add a contact to an existing group.

A unique feature of the calendar that it dynamically adjusts the space needed to display portions of the calendar while maintaining presentation of every day in the month displayed, as shown in FIGS. 24, 25, and 26. FIG. 24 shows a calendar lozenge with the calendar in the month view 2001. As shown, a week view input 1930 is provided for each week displayed in the month view 2001.

Selecting the week view input 2030 for the week of May 5 though the 11 expands the area used to display the selected week on the screen while reducing the other weeks presented by a corresponding amount, in the expanded week view as shown in FIG. 25. In the expanded week view 2501, more event identifiers may be displayed concurrently and other event details and information in addition to the event identifier (e.g., a time of event) may be presented. Additionally, segments for the hours during each expanded day or a timeline may be presented. At the same time, all other days outside the expanded week shrink to a smaller size. In this mode, the small days use color codes in combination with a number indicate events for that day. The color indicates the type of event that day and the number indicated the number of events of this type on that date.

Two additional inputs are also provided. An expand input 2510 is provided for each day in the expanded week and a month view input 2520 is provided for the expended week. Selection of the month view input 2520 causes the screen to return to the month view 12001 shown in FIG. 25.

Selection of the expand input 2610 for any day in the week causes the area for the selected day to expand with a corresponding reduction in the area of the remaining days in the expanded week as shown in FIG. 26. The expanded day view 2601 may include a time line, larger fonts, and addition information provided for each event (such as identifier, time, location, attendees, and notes). In addition, a today button 2020 is provided on all of the views (2401, 2501, and 2601) to automatically expand the calendar to the expanded day view 2601 open to the current date. The expanded day view 2601 also may include a week view input 2030 to return the week to the expanded week view 2501, and a month view input 2520 also is provided to cause the screen to return to the month view 2001 shown in FIG. 25.

Item Dragging

Figure 28:
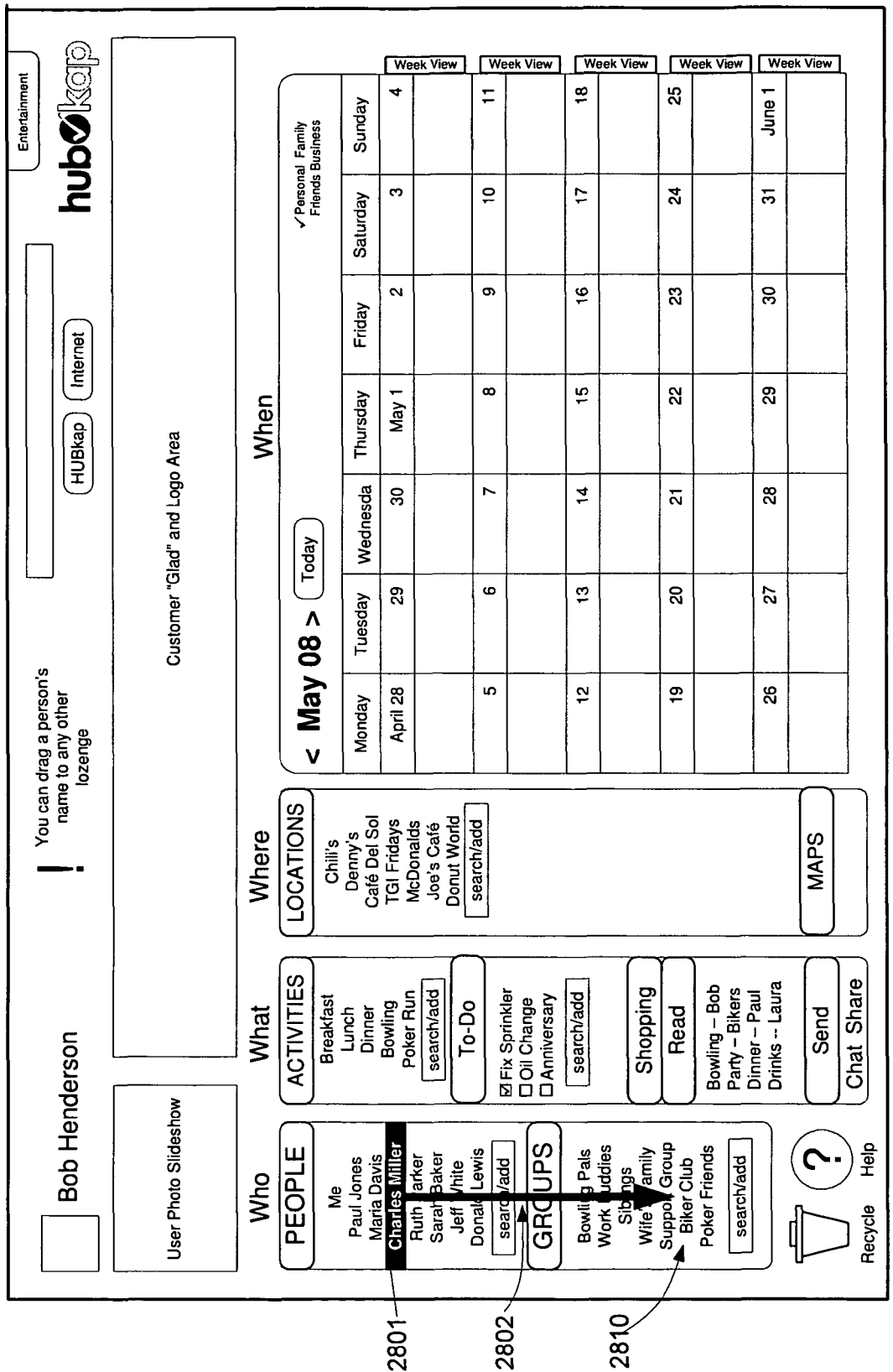
Figure 29:

Because the service provider system 110 dynamically maintains all system user data, any item from a lozenge may be selected by a user input device and moved to another lozenge (e.g., dragging a selected item in one lozenge to the area of the user interface defining or occupied by a second lozenge) to cause the system to automatically perform an actions and services. This allows a user to harness the information stored by and the automation provided by the system to perform tasks for the user in a straight forward and easy manner. For example, a user may select and drag a person or a group from the people or groups lozenge to: the calendar to create an appointment or to the send lozenge to send a message to the person or group FIGS. 28 and 29 show an example of adding a user to a group. FIG. 28 shows the user has selected "me" 2801 from the people lozenge. The selection 2801 causes the groups lozenge to focus on groups the user belongs to. FIG. 29 shows that Contact "Charles Miller" 2901 is selected from the people lozenge and dragged 2902 to the group "Biker Club" 2910. In response, the service provider system 110 automatically accesses the user database and adds an indication for "Charles Miller" to group "Biker Club." FIG. 25 shows the "Biker Club" 2910 is selected causing the people, activities, read, and locations lozenges to focus on the biker club related items. For example, people is focused to contact in the Bike Club (e.g., Me, Charles Miller, Jeff White, and Donald Lewis), activities is focused to bike activities (e.g., biker night, charity run, poker run), the read lozenge includes message sent by Bike Club members (e.g., Next Ride, Good Mechanic, and My New Bike), and locations to bike related locations (e.g., Route 66, Piston Club, Harley Dealership, Bike world).

In another example, items directly dragged to a calendar date may automatically create an event. If a lozenge item is dragged to any date on the calendar in the month view, an event is automatically created for noon on that date with whatever content is associated with the lozenge. For example, if Bill is dragged to June 1, an event nickname Bill is provided for a 1 hour meeting with Bill at noon on June 1. A message is sent to invite Bill. The user may select the item on the calendar to access the event and to edit or provide further details. If a lozenge item is dragged to the expanded week view or day view, then the event is scheduled for the hour time slot the item is dragged to on the calendar as a default. The hour slot is also visual highlighted or shaded to indicate the planed time of the meeting. The user may then adjust the timing of the event using a pointing user input device to select a border or portion of the highlighted region to expand or contract the highlighted area to increase or decrease, respectively, the time scheduled for the event.

Figure 30:
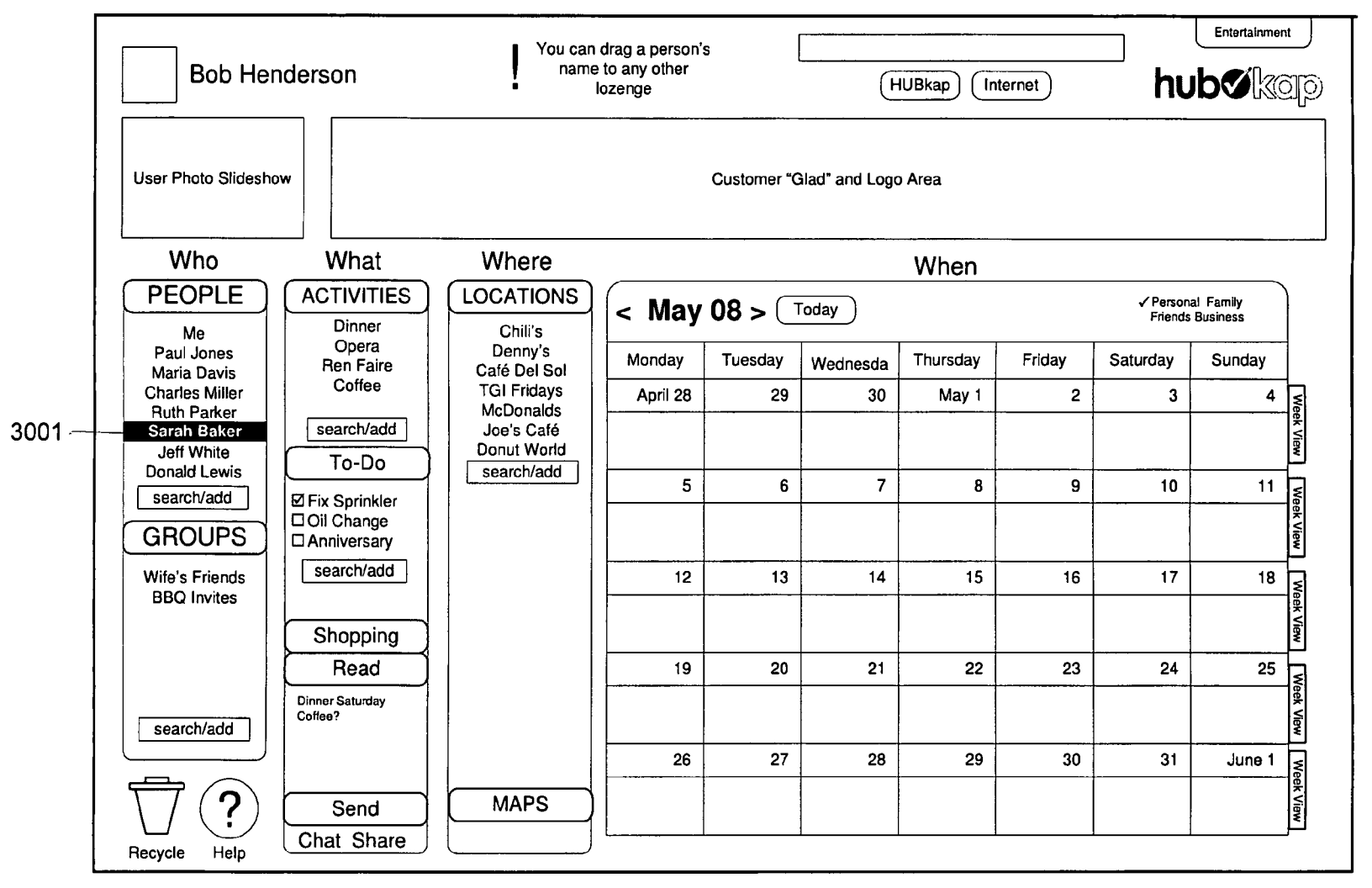
Figure 31:
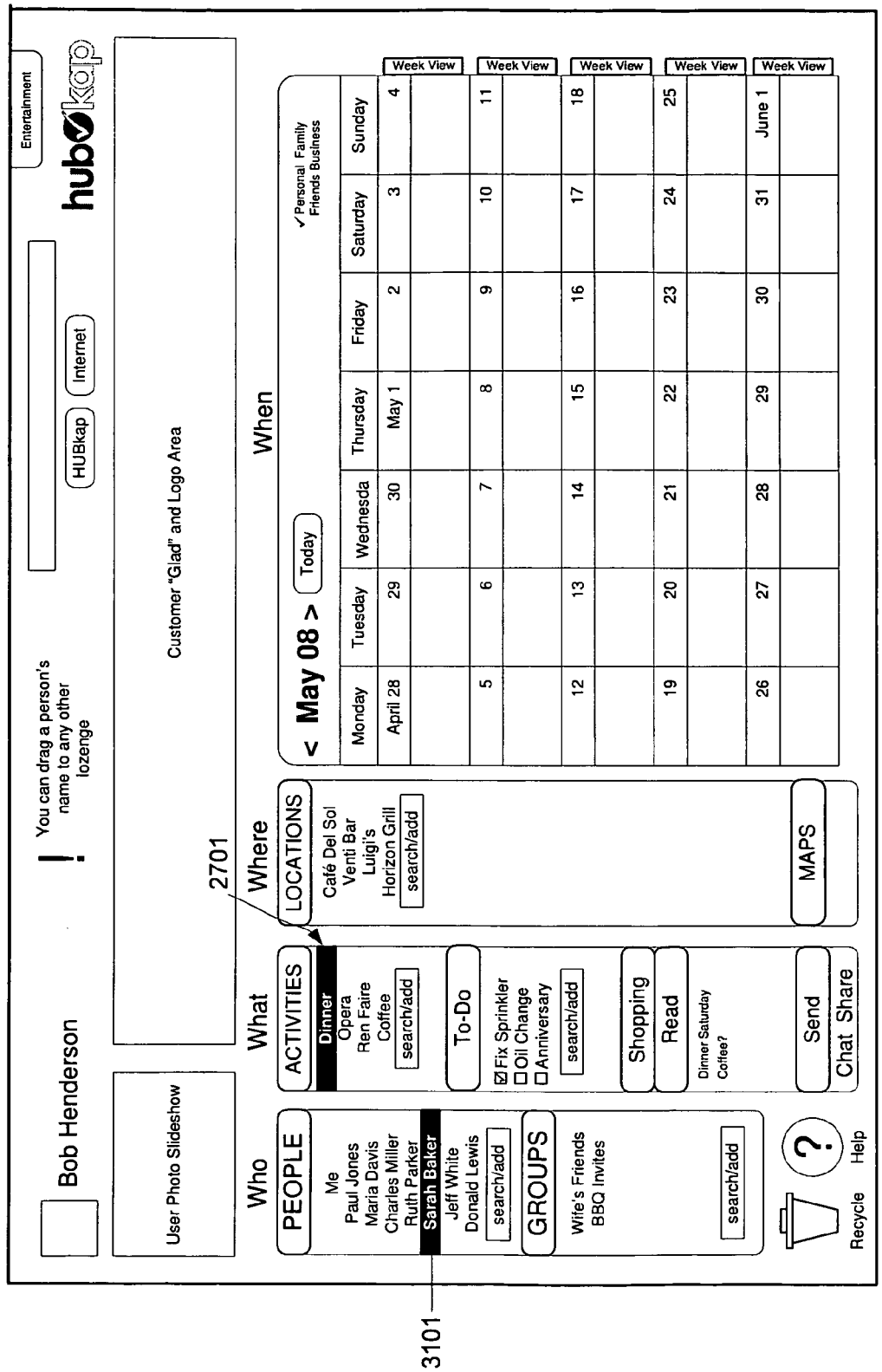
Figure 32:
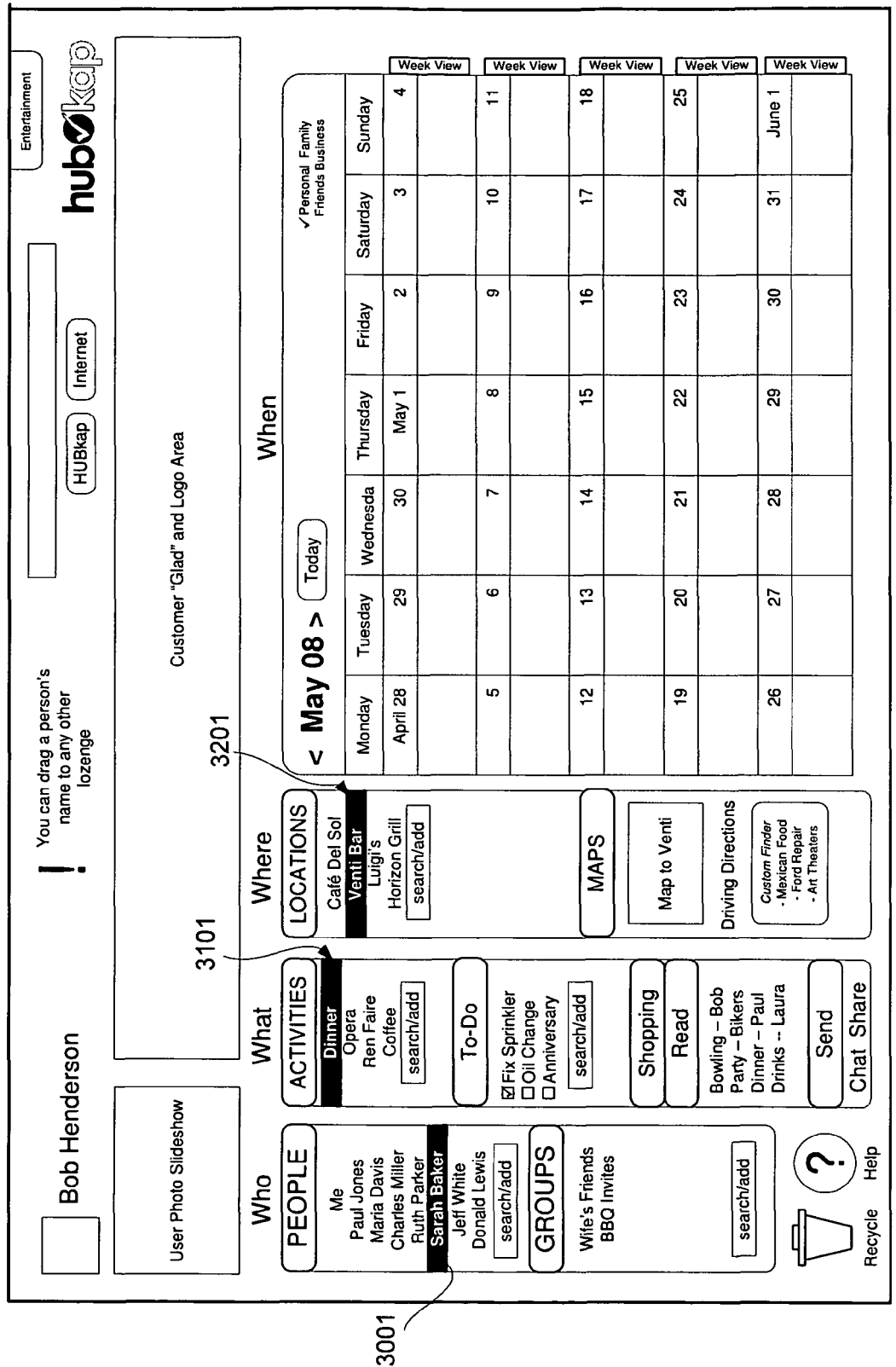
Figure 33:
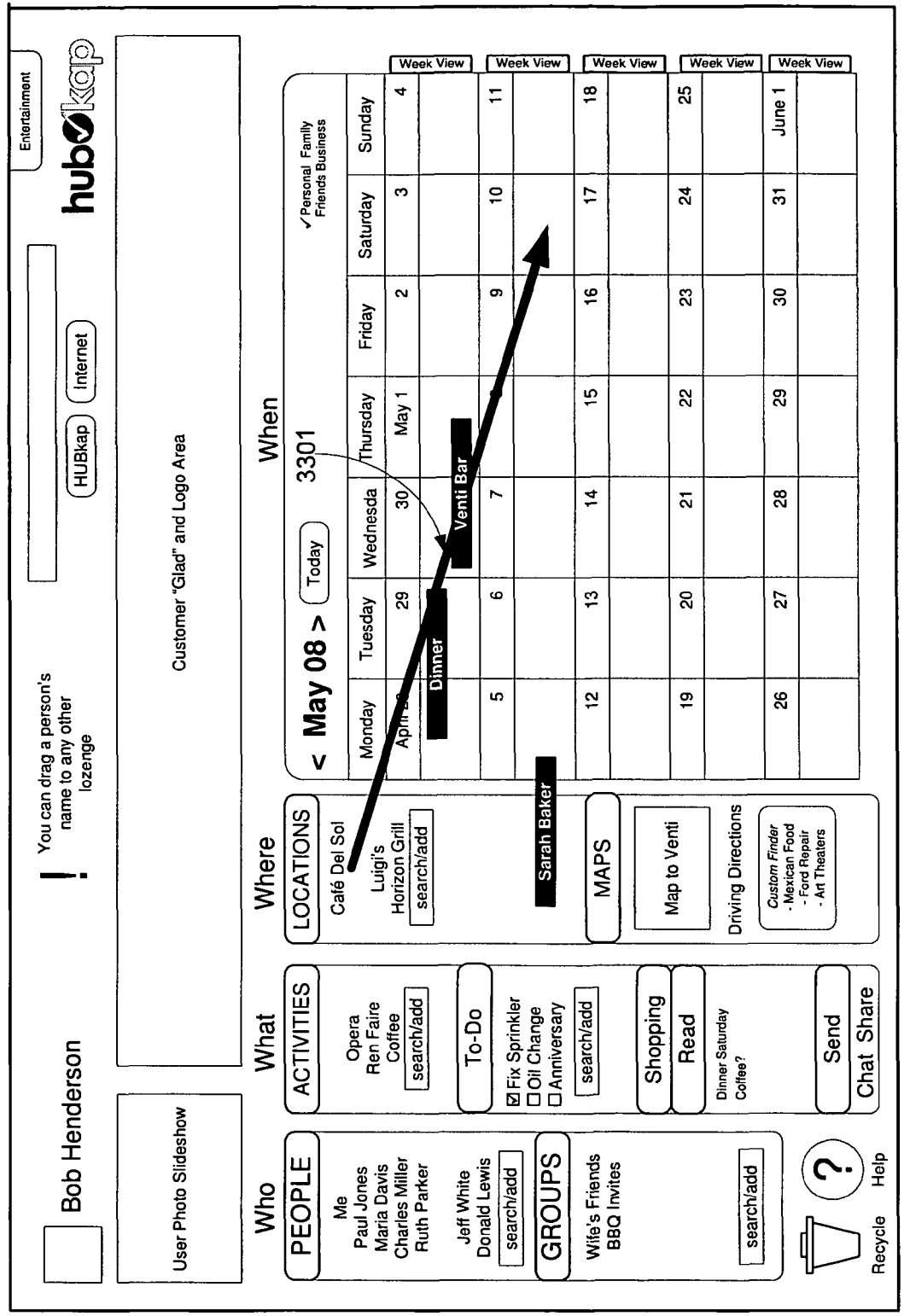
Figure 34:
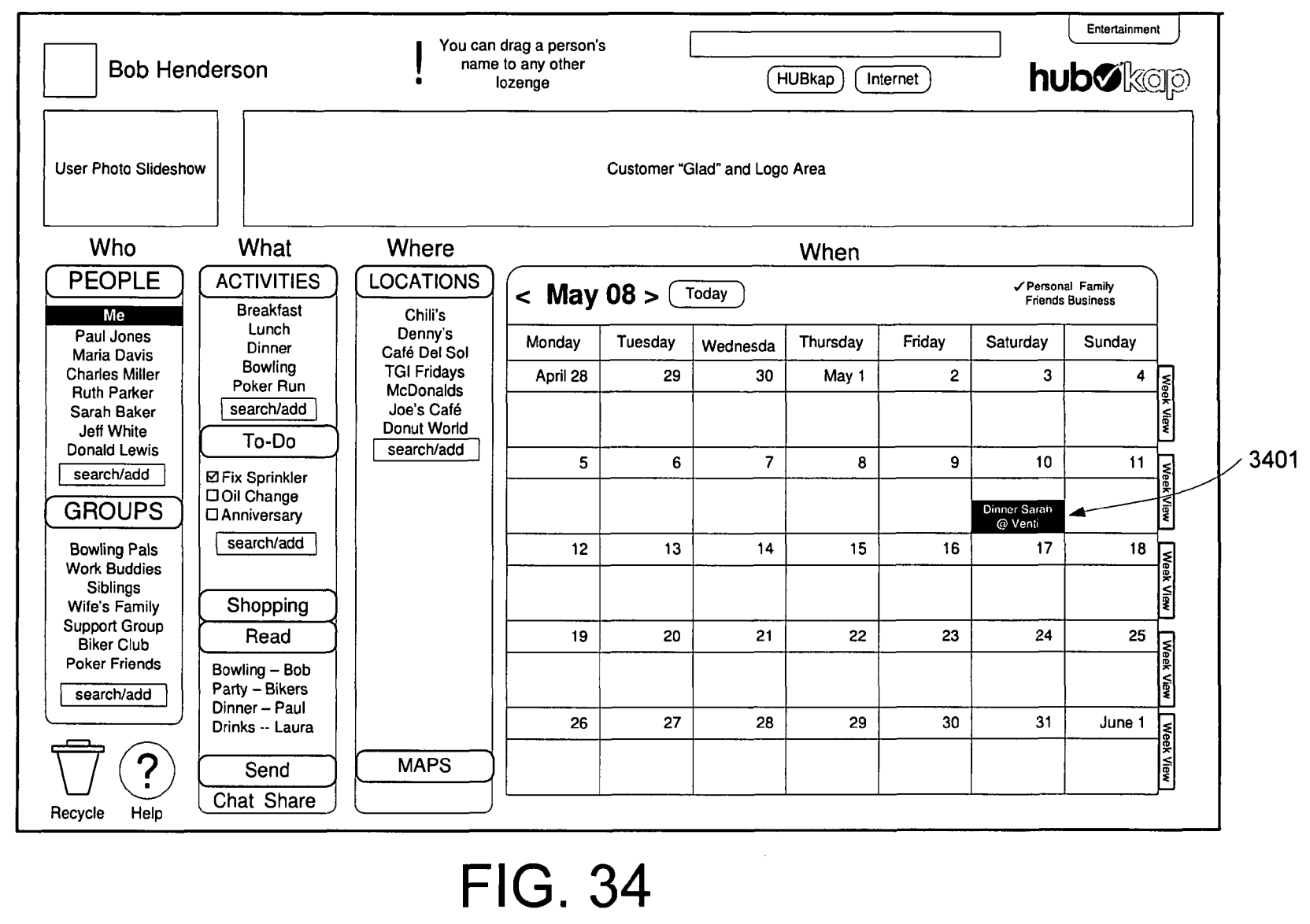

Combinations of items also may be dragged and dropped as shown in FIGS. 30 and 31. For example, FIG. 30 shows a contact "Sarah Baker" 3001 is selected from the people lozenge causing the other lozenges to focus based on Sarah Baker. FIG. 31 shows the user has selected "dinner" 3101 from the activities lozenge causing the locations lozenge to focus on dinner locations. FIG. 32 shows the selection of a location "Venti Bar" 3201 from the locations lozenge. FIG. 32 show the user drags 3201 the selected items to Saturday May 10 on the calendar lozenge. The system then automatically creates an event in the calendar for dinner at the Venti Bar with Sarah on May 10 and displays a corresponding indicator 3401 as shown in FIG. 34. Of course, many other combinations are possible.

Figure 35:
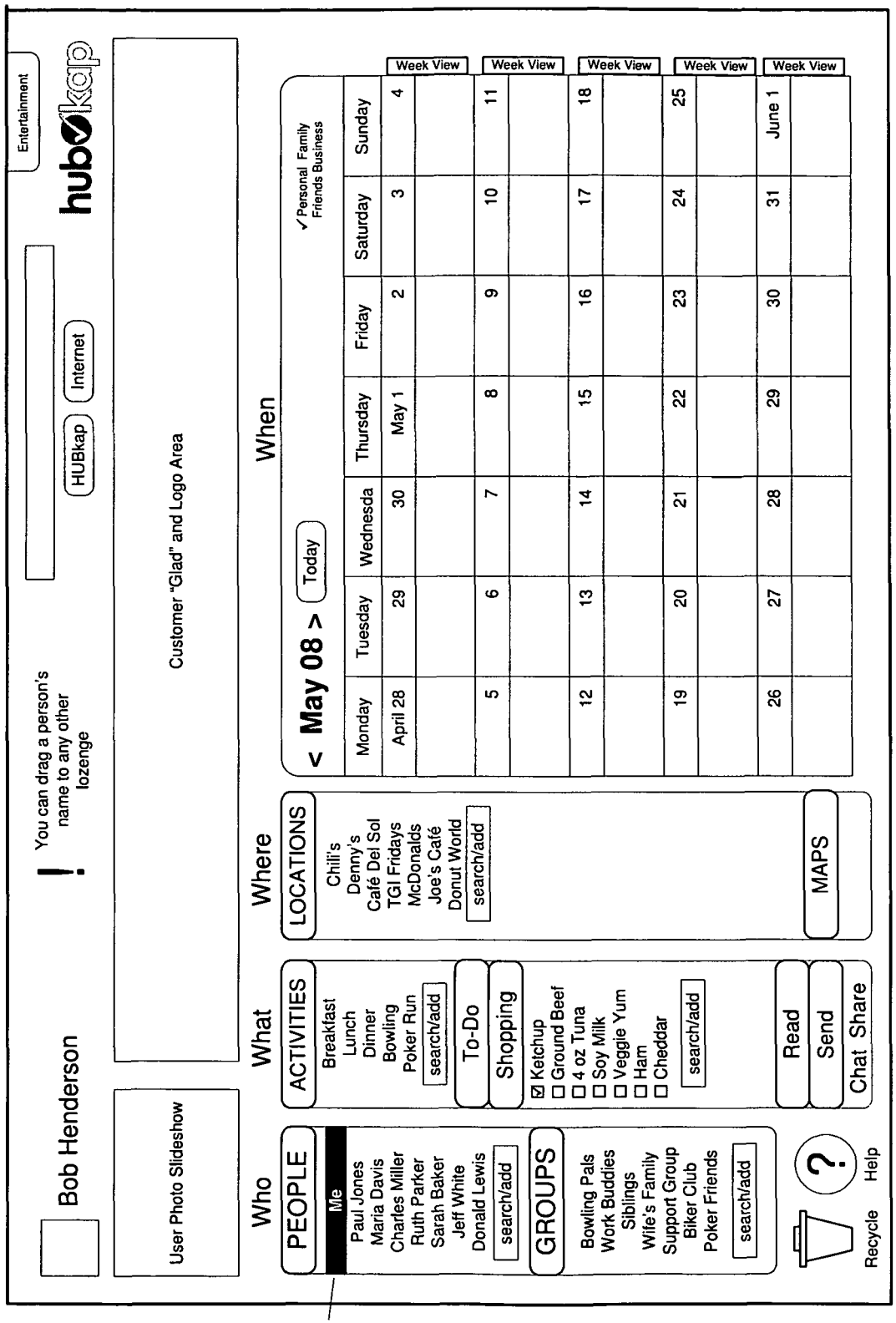
Figure 36:
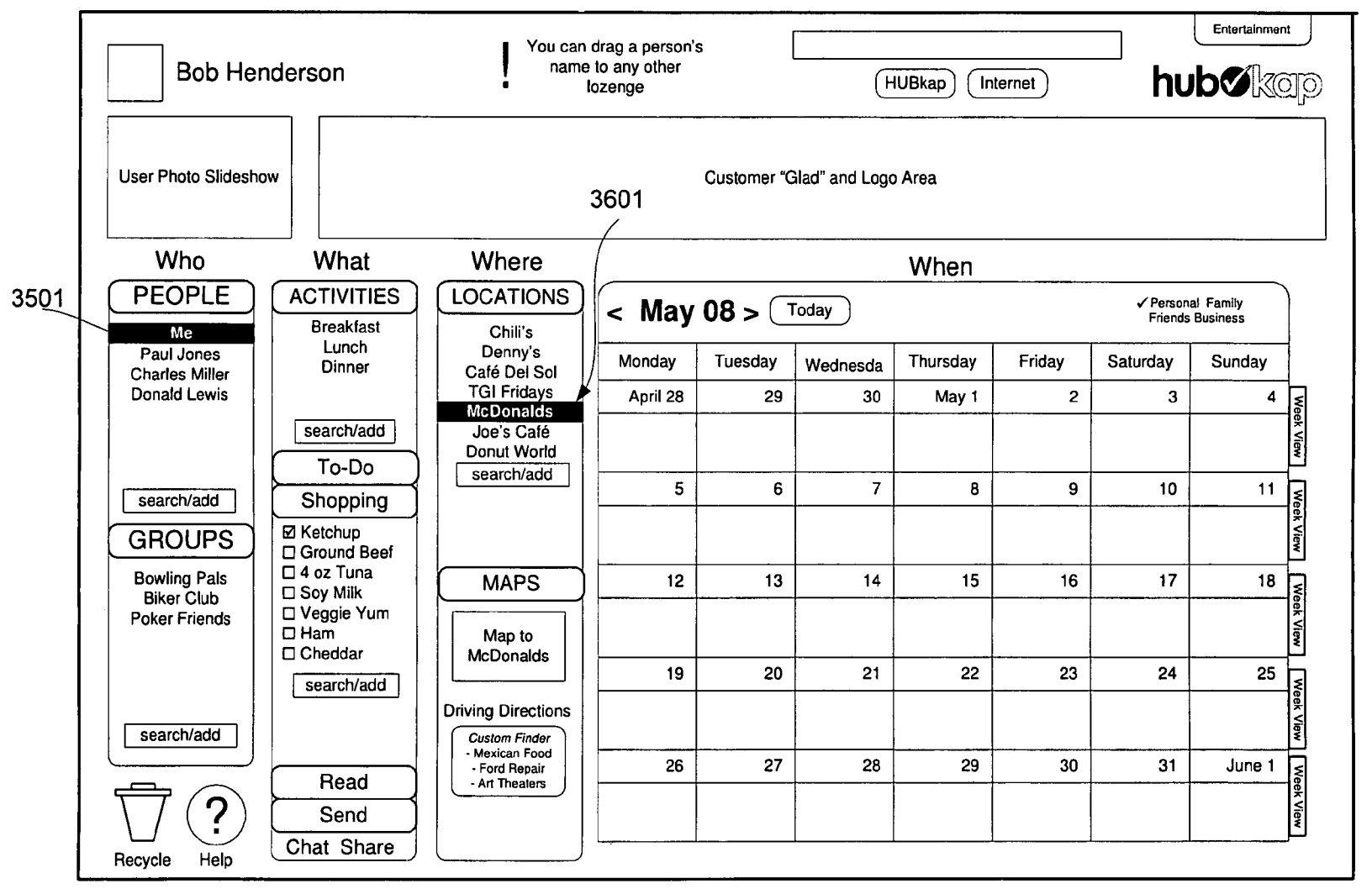
Figure 37:
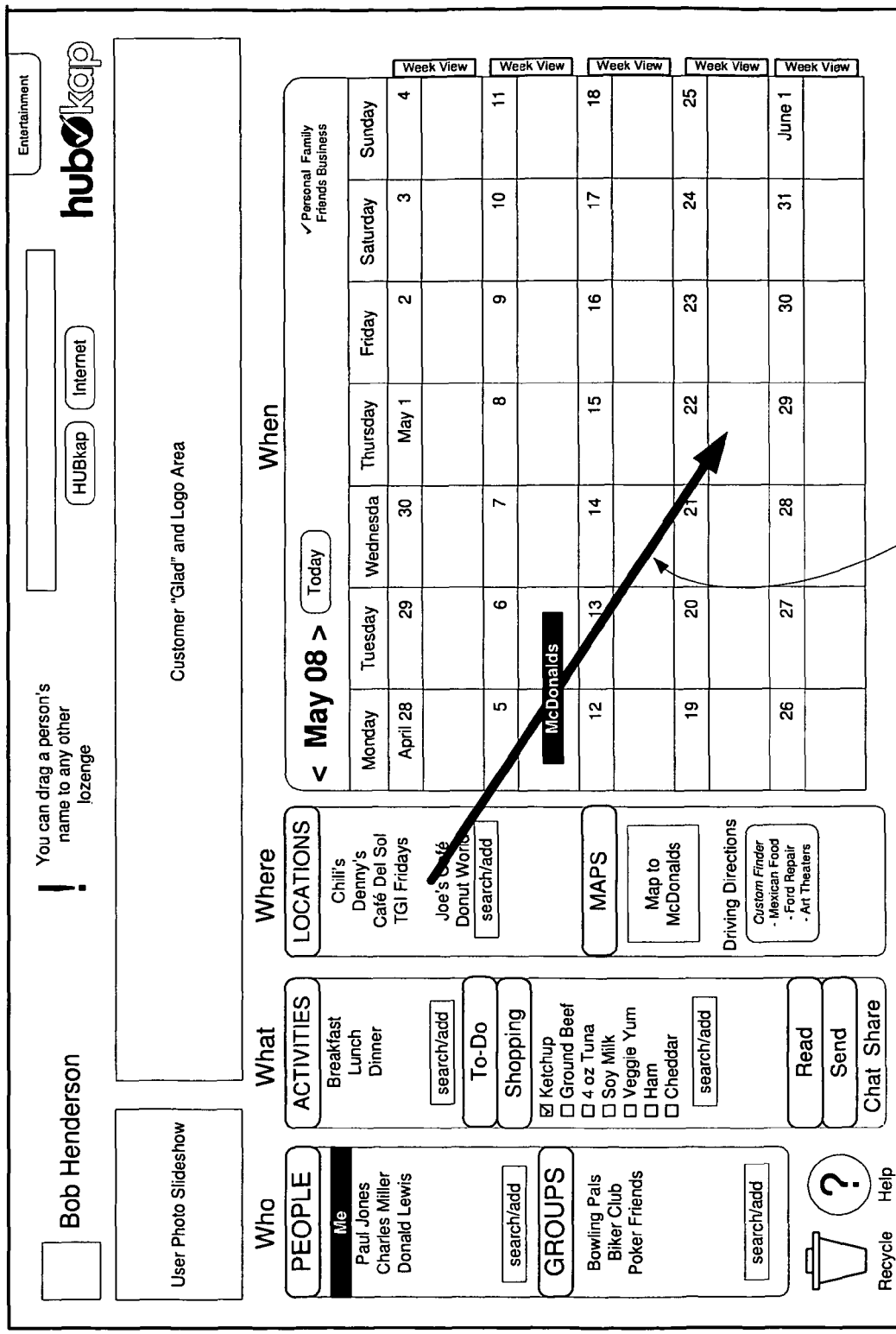
Figure 38:
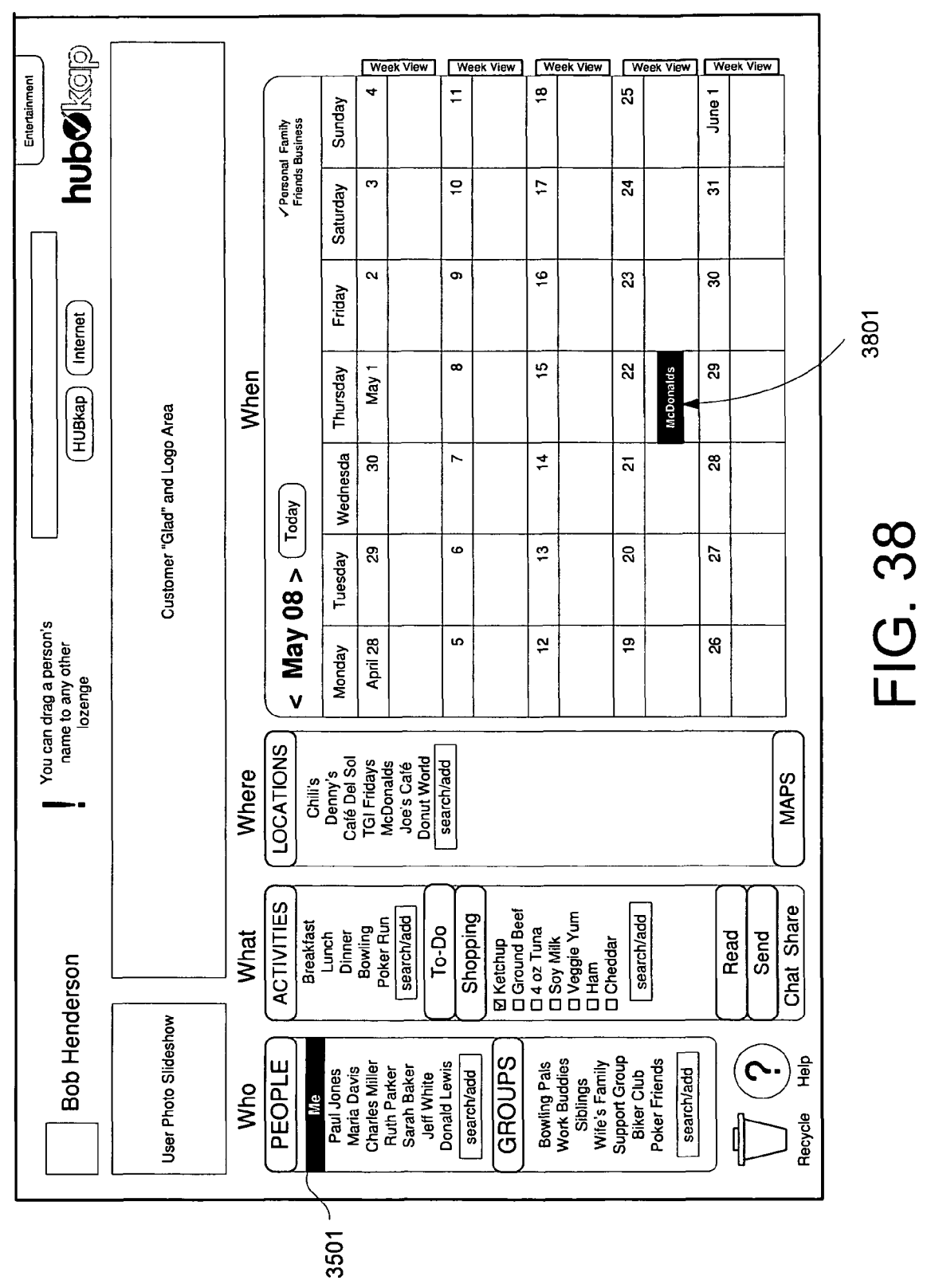

In another example shown in FIGS. 35-38 a user creates an event using a location. As shown in FIG. 35, the user selects themselves 3501 in the people lozenge to focus on the user. As shown in FIG. 36 the user then selects a location "McDonalds" 3601 from the locations lozenge causing the people lozenge to focus on people the user goes typically invites to McDonalds, groups which go to McDonalds, activities that take place at McDonalds, a map to a McDonalds. FIG. 37 shows the user drags 3701 the location to a date on the calendar lozenge (e.g., May 22). FIG. 38 shows the service provider system 110 then creates an event in the user's database for the user at McDonalds on the Thursday May 22, 2008 and displays an identifier 3801 for the event on the calendar.

Table 1 table gives some examples of other actions that may be performed by selecting items displayed in the lozenges and dragging them to other lozenges.

TABLE 1

| Lozenge | Action Lozenge | Action |
|---|---|---|
| Help | any | any item dragged to help? or ? dragged to any item opens context sensitive help |
| Combos (after click to highlight) | | |
| who + what | when | creates cal event with those item fields populated |
| who + where | when | creates cal event with those item fields populated - prompts for event name |
| who + what + where | when | creates cal event with those item fields populated - prompts for event name |
| where + what | when | creates cal event with those item fields populated |
| Single Items | | |
| People | Groups | adds person to group |
| People | Blank Group | adds person to group, prompts for new group name |
| People | To Do | creates empty to do with text "with FN LN" |
| People | Shopping | creates empty shopping item with text "for FN LN" |
| People | Read | Same as select/highlight - shows all messages from the dragged/selected person's name |
| People | Send - Share | Open a "new share" box, user may drag files (using the computer's OS) or select them with a BROWSE button, then click SHARE |
| People | Send - Discuss | Open a "new message" box, user may type a message then click SEND |
| People | Calendar (blank area) | creates event that includes that person (prompts for event name, etc.) |
| People | Calendar Appointment | adds person to event attendee list |
| People | User Picture | adds contact image to slideshow |
| People | Family | changes relationship of contact to family |
| People | Business | changes relationship of contact to business |
| People | Friends | changes relationship of contact to friends |
| People | A Glad | Sends that Glad to that person via email |
| People | | |
| Groups | People | adds person to group |
| Groups | To Do | creates empty to do with text "with <group name>" |
| Groups | Shopping | creates empty shopping item with text "for <group name>" |
| Groups | Read | Same as select/highlight - shows all messages from the dragged/selected group name |
| Groups | Send - Share | Open a "new share" box, user may drag files (using the computer's OS) or select them with a BROWSE button, then click SHARE to share them with that entire group |
| Groups | Send - Discuss | Open a "new message" box, user may type a message then click SEND to send that message to that entire group |
| Groups | Calendar (blank area) | creates event that includes that group (prompts for event name, etc.) |

TABLE 1-continued

| Lozenge | Action Lozenge | Action |
| --- | --- | --- |
| Groups | Calendar | adds group to event attendee list |
| Groups | A Glad | Sends that Glad to that group via email |
| Activities | To Do | creates to do item with activity name |
| Activities | Read | Same as select/highlight - shows all messages associated with the dragged activity |
| Activities | Send - Discuss | Opens a requester "Who would you like to discuss this activity with?" |
| Activities | Calendar (blank area) | creates event (cal event name = activity) |
| Activities | Calendar Appointment | changes name of event to new activity (cal event name = activity) |
| To Do | People | appends to do item with text "with <FN LN>" |
| To Do | Groups | appends to do item with text "with <group name>" |
| To Do | Shopping | To-Do list is moved to Shopping List |
| To Do | Send - Discuss | Opens a requester "Who would you like to discuss this To-Do List item with?" |
| To Do | Calendar (blank area) | creates cal event (to do item = cal event name) |
| To Do | Calendar Appointment | changes name of event to new activity (cal event name = to do item) |
| To Do | Locations | Creates to do item "go to <location name>" |
| To Do | | |
| Shopping | People | Opens an email to that person, subject is "Shopping for <item>", then the user may continue to type a message and click the SEND button. |
| Shopping | Groups | Opens an email to that group, subject is "Shopping for <item>", then the user may continue to type a message and click the SEND button. |
| Shopping | To Do | creates to do "go shopping for <shopping list item>" |
| Shopping | Send - Discuss | Opens a requester "Who would you like to discuss this Shopping List item with?" |
| Shopping | Calendar (blank area) | create cal event "go shopping for <shopping list item>" |
| Shopping | Calendar Appointment | Changes name of event to "go shopping for <shopping list item>" |
| Read | People | Open a "new message" box, user may type a message then click SEND to send that message to that person |
| Read | Groups | Open a "new message" box, user may type a message then click SEND to send that message to that entire group |
| Read | To Do | Adds message title to To-Do list |
| Read | Shopping | Adds message title to Shopping list |
| Read | Send - Share | Open a "new share" box, user may drag files (using the computer's OS) or select them with a BROWSE button, then click SHARE to share them with that the addressee list found in that message |
| Read | Calendar (blank area) | Opens an event with the activity set to the message title, with the attendee list set to the addressee values. Missing will be a location. |
| Read | Calendar Appointment | Adds message title to "comments" section of the existing appointment |

Focusing

The user interface also provides a unique feature called "focusing." Focusing intuitively connects all of the interface's basic functionality and content to provide the features and the content that are generally the most useful to a user at any particular moment in time. For example, whenever a user selects an item provided by one of the four strips WHO 1131, WHAT 1133, WHERE 1135, and WHEN 1137, the other strips and lozenges automatically react by providing the user with the content and features within the context of each strip that the user may most likely desire based on the user's selection.

Whenever a user selects a contact name for a person or a group the other strips automatically adjust the information displayed based on the selection. For example, if the user selects "John Merk" in the People lozenge of the WHO strip 1131, then the Read lozenge of the WHAT strip 1133 also displays all current message threads between the user and John Merk. Similarly, the Calendar lozenge of the WHEN strip 1137 displays all upcoming appointments with John Merk and all events that the user is coordinating with him; and the maps lozenge of the WHERE strip 1135 displays an address and associated map for John Merk.

Focusing may be initiated by selection of content, inputs, or features from any of the strips of the user interface. For example, if the user selects a new message "John Erikson about Fishing Trip," the People lozenge displays a list of the contacts associated with the Fishing Trip, and the Calendar tab displays the event on the calendar which is being referred to, and the locations lozenge of the WHERE strip 1135 displays the boat company chartered for the trip and a map of the area surrounding the boat launch. In another example, if the user selects an event "Weekend Away" from the activities lozenge, the conversational thread regarding this event opens automatically in the Read lozenge of the WHAT strip 1133, and the People lozenge opens to show Sharon's contact information.

Figure 39:
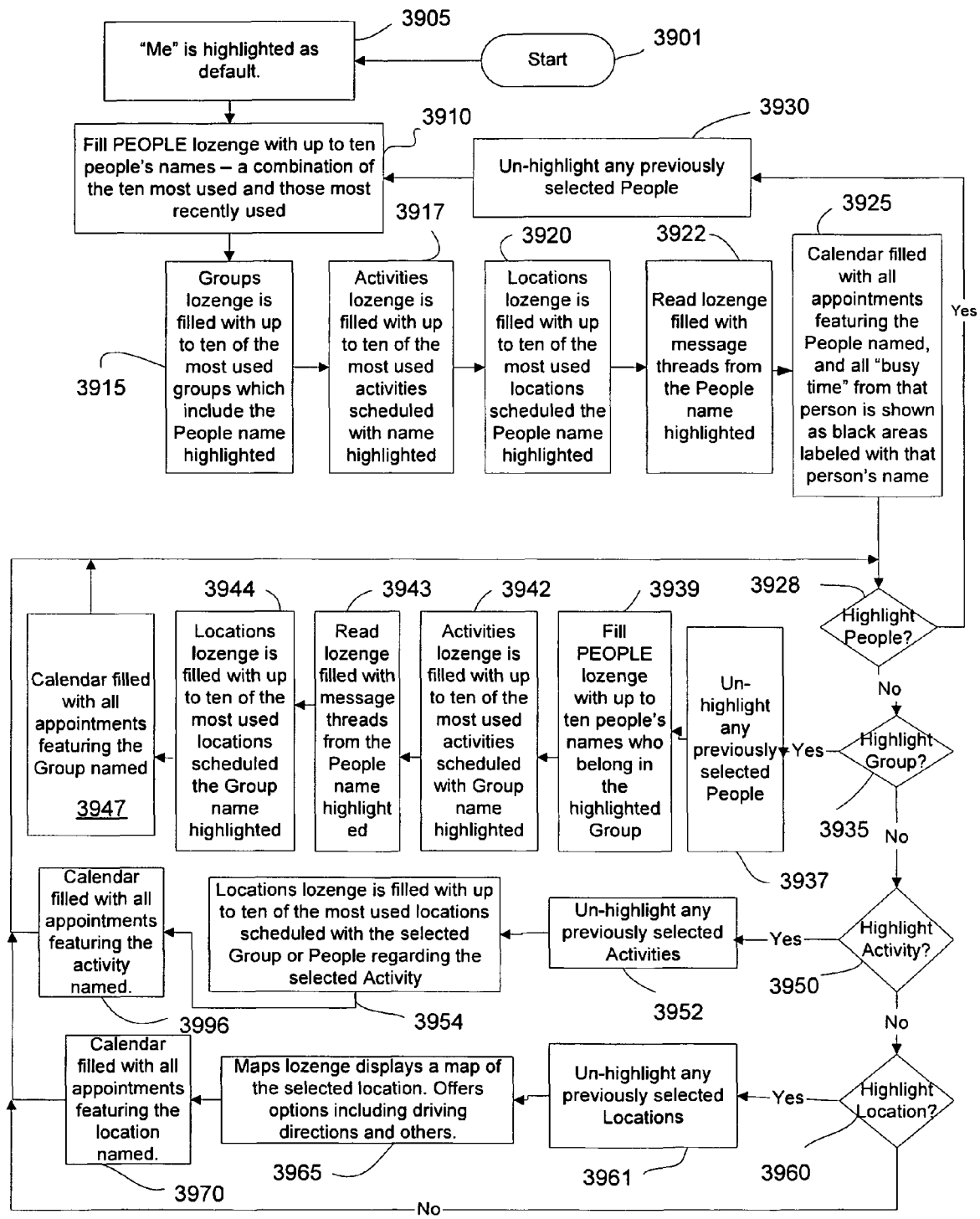
FIG. 39 shows an exemplary focusing block for items displayed in the lozenges of the WHO, WHAT, WHERE, and WHEN strips.

FIG. 39 shows an example of a process 3900 for focusing of the lozenges. The process starts 3901 when a user accesses the user interface. The server initially populates the people lozenge with "Me" which is automatically highlighted as default in the initial startup of the user interface 3905.

The applications server determines up to ten contacts from the user contact database for the highlighted name in the peoples lozenge. The server selects the contacts based on the ten most frequently used contact, the ten most recently used contacts, or a combination of both. The server uses the determined contacts to fill the contact list of the people lozenge 3910.

The applications server determines up to ten of the most used groups which include the name of the contact highlighted in the people lozenge (in the first instance it is the default "me"). The determined groups are then used to fill the group contact list of groups lozenge 3915.

The applications server determines up to ten of the most frequently used activities scheduled with name highlighted in the people lozenge. During an initial period of use, or if there are few activities the user has actually participated in, the system may select activities from a default list of activities based on the user profile in conjunction with the time of day, the weather, any nearby holidays, the user's location, and the time of year. The server uses the determined activities to populate the list of activities display in the activities lozenge 3917.

The applications server determines up to ten of the most used locations scheduled for the contact name highlighted in the people lozenge. The server uses the determined locations to populate the list of locations provided by the locations lozenge 3920.

The applications server determines message threads involving the contact highlighted in the people lozenge. The server selects up to ten message threads and populates the read lozenge with the thread identifiers of the selected message threads 3922. The server selects the newest threads over older or unanswered threads.

The applications server determines all events including the contact highlighted in the people lozenge. The server populates the calendar with the determined events including the highlighted contact and the user 3925. If the highlighted contact is not the user (i.e., "me" is not highlighted) and the contact is a user of the service provider system 110, the calendar displays any "busy time" from that person within the calendar lozenge (e.g., black areas labeled with that person's name).

The system monitors the user interaction with the user interface and determines whether any people are highlighted 3928. If a user selects a new contact from the people lozenge, the previously selected contact is un-highlighted and the processes 3910, 3915, 3917, 3920, and 3922 are repeated for the newly highlighted contact. The system also monitors the user interaction with the user interface to determine whether a group is selected from the groups lozenge 3935.

If a group is selected, any contact previously selected in the people lozenge is un-highlighted 3937. The applications server determines up to ten contacts in the group. The determined contact then use to populate the contact list of people lozenge 3939.

The applications server determines up to ten of the most frequently used activities scheduled with group highlighted in the group lozenge. The server uses the determined activities to populate the list of activities display in the activities lozenge 3942.

The applications server determines message threads involving the contact highlighted in the people lozenge. The server selects up to ten message threads and populates the read lozenge with the thread identifiers of the selected message threads 3943. The server selects the newest threads over older or unanswered threads.

The applications server also determines up to ten of the most used locations scheduled for the group name highlighted in the groups lozenge. The server uses the determined locations to populate the list of locations provided by the locations lozenge 3944.

The applications server determines all events including the group highlighted in the groups lozenge. The server populates the calendar with any of the determined group events. 3947

If no group is selected, the server monitors whether any activity is selected 3950. If so, any previously selected activities are un-highlighted 3952. The server also determines up to ten of the most used locations previously scheduled with the selected group or contact regarding the selected activity 3954. In addition, the calendar is filled with all events featuring the activity named 3996.

If no activity is selected, the server determines if a location is selected by the user 3960. If so, any previous locations are un-highlighted 3961. The server determines a map of the selected location, and the server populates the maps lozenge with the determined map 3965. The server also determines options including driving directions and others appropriate for the location and provides them on the maps lozenge 3965. In addition, all events featuring the location are highlighted on the calendar 3970.

The server monitors to see if any people are selected 3928. If a user selects a new contact from the people lozenge, the processes 3930, 3910, 3915, 3917, 3920, and 3922 are repeated. If not, the server determines if any group is selected 3935. If the user selects a new group from the groups lozenge, the processes 3937, 3939, 3942, 3943, and 3944 are repeated for the newly highlighted group. If not, the server determines if any activity is selected 3950. If the user selects a new activity, the processes 3952, 3954, and 3956 are repeated for the newly highlighted activity. If not, the server determines if a location is selected 3960. If so, the processes 3961, 3965, and 3970 are performed. The server continuously monitors the user's interaction (e.g., processes 3928, 3935, 3950, and 3960) to focus the lozenges accordingly.

Mobile User Interface

A modified user interface may be supplied for mobile platforms, such as mobile phones, smart phones, and PDA that have limited processing power and/or screens. For example, WAP cell phones may be provided with an "Agenda" that allows them to see the upcoming four hours of appointments as a default screen. The interface may be provided with a number of inputs that are most useful to a user in this environment. For example, for appointments in the agenda the user may select an appointment and be provided with user inputs for specific actions with regard to those appointment. For example, the user may selection the options: running late, can't make it, and cancel meeting (with verification). Selection of any of these options causes an automatic message to be sent all contacts associated with the appointment indicating the user is running late, can't make it, or needs to cancel. The automated message is created by the system service provider and sent to the contacts associated with the appointment. The message may be an instant message, email, automated phone message, or an alert or popup window of a system user's user interface. The user interface also may display the user's shopping list listing the user's items. A check box or other indicator may be provided to allow the user to check items off the list. In addition, the To-Do list may be provided allowing a user to see items on the list, add items to the list, and check items off the list. Conflict resolution "alerts" and resolution System wide—12 hr email and SMS notification on event change.

In addition to the features provided for WAP cell phones, smart phones may provide the additional functionality. For example, the user's agenda may also provide action notices. The smart phone also may allow a user to reorder their To-Do List. The smart phone PDA includes the dynamic calendar. The dynamic calendar also the user to filter information via persona/family/business categories. In addition, the user may be presented with day/week views. The user may add an appointment, delete Appointment, and re-order appointments in a list.

Search Tool

Figure 40:
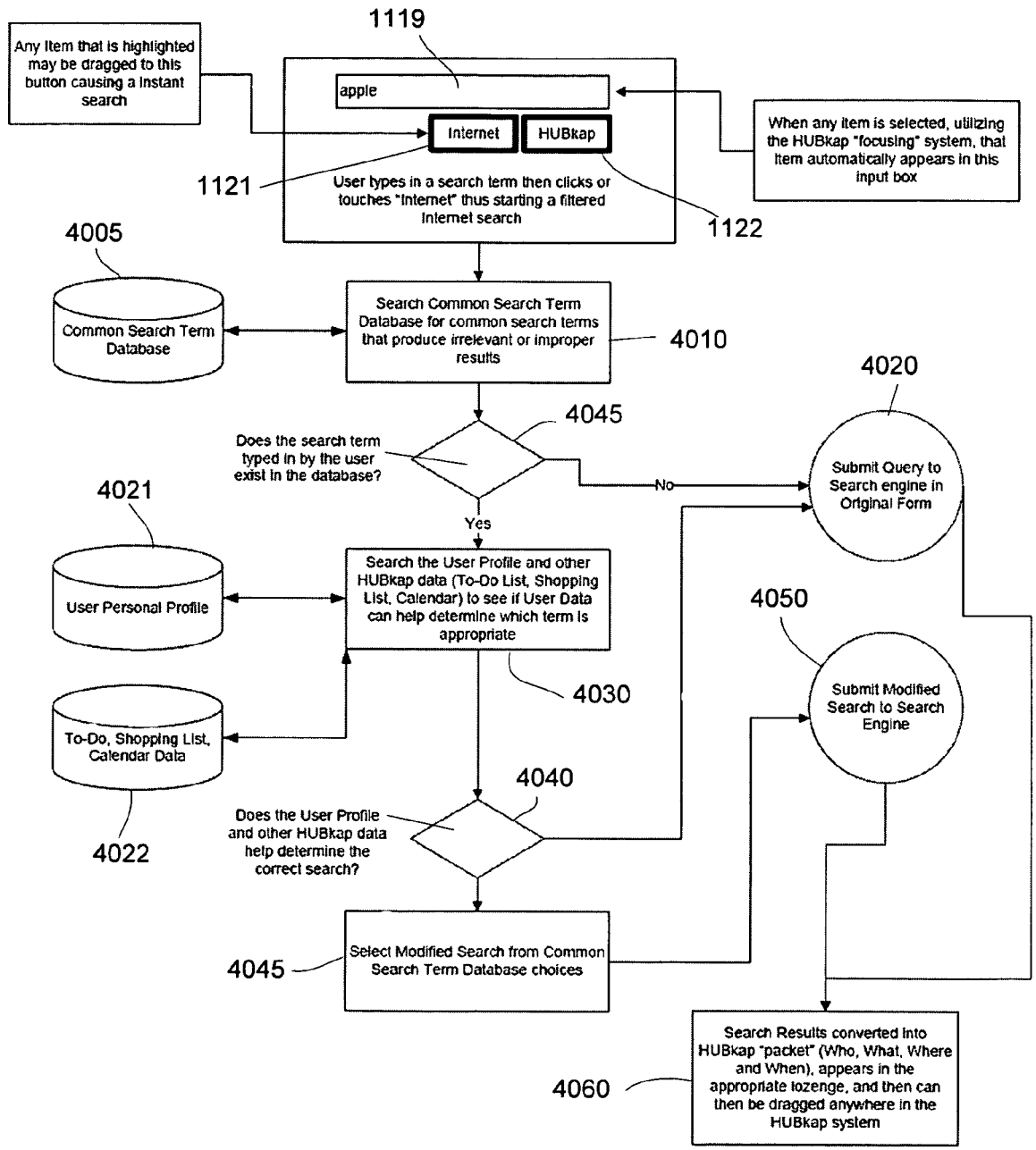
FIG. 40 shows an exemplary focused search block diagram.

FIG. 40 shows an example of an improved search tool for use with the system. The system service provider includes a lot of information that may be harnessed to facilitate user searches. As pointed out above, items within lozenges may be focused for users depending on the actions with the user interface. Similarly, user search of the web and system data may be focused. The user interface may provide a search tool. The search tool includes a word entry field 1119 to enter key words. Two inputs are provided to search the key words on the Internet 1121 and within the system 1122. In addition, any item may be dragged to the entry field 1119 to create a search term.

The user enters a search term 4001 and selects the Internet input 1121 to start a filtered Internet search. The service provider system accesses a common search term database 4005 to search 4010 for common search terms that may produce irrelevant or unwanted search results. The common term database 4005 includes a database of terms that may have common different meanings which may lead to ambiguity. For example, the term apple may be related to a fruit, a computer, a tree, bowling term, slang for drug, and a mollusk. The system determines whether the search term appears in the database 4015. If the term does not appear, the system submits the term to a search engine in its original form 4020. If the term is found in the common term database, the system searches the user profile 4021 and other db items 4022 associated with the user (e.g., the to-do list, shopping list, calendar) to see if user data provides additional information that indicates what context of the search the user actually intended 4030.

The system determines whether the user data indicates a particular meaning from among the common terms determined 4040. If the system determines a particular meaning, the system selects the modified search term 4045 and submits the modify search to the search engine 4050. For example, if user profile indicates a user is 60 year woman, shopping list includes pie crust, and has visit from arborist, terms computer company, mollusk, slang and bowling may be eliminated and a refined search of apple fruit and apple tree is provided to the search engine. Regardless of which search is performed (i.e., 4020 or 4060), the search results are converted to a system packet that appears in the appropriate lozenge which may be dragged anywhere in the system 4060.

Glads

The system service provider is able to promote marketing/advertising/sales of products and services through electronic delivery of digital media, information, and content including coupons, incentives, discounts, promotions, product information, product descriptions, product comparisons, and new product/service introductions. The marketing/advertising/sales of products and services is promoted based on user data, including user profile, history, and demographic information; timing, location, and/or activity (or any combination of these among others) about the user; and the association of the user with other system users, to provide the marketing/advertising/sales information to the user when the presentation of the digital media has a higher chance or probability of impacting a user's behavior. In addition, dynamic filters associated with the marketing/advertising/sales information may be specifically tailor by system partners to target a desired user with a degree of granularity never before possible with any online marketing system.

The digital media, information, and content used by the system service provider to promote goods and services are graphical "ads" or Glads. Glads are stored in a system Glad database and include Glad art, for presentation in the graphics bar of the user interface, and Glad filters for targeting specific users. The Glad art may include one or more of a message, an advertisement, a commercial, a description, a price, a discount, a coupon, a voucher, a ticket, a rebate, a redemption, a promotion, an offer, a slogan, a trademark, a service mark, a tag line, a company, business, or organization logo, brand, or other identification. Glad filters also include various parameters and conditions that filter the who, what, when, where of how to trigger the serving of the Glads for presentation in the products and services branding area 1126 of the user interface. As a result, Glads are provided to the system users having the most likelihood of being interested in the Glad. Glads may be created by the system service provider 110 and by system partners 125 and stored in a Glad database.

Figure 41:
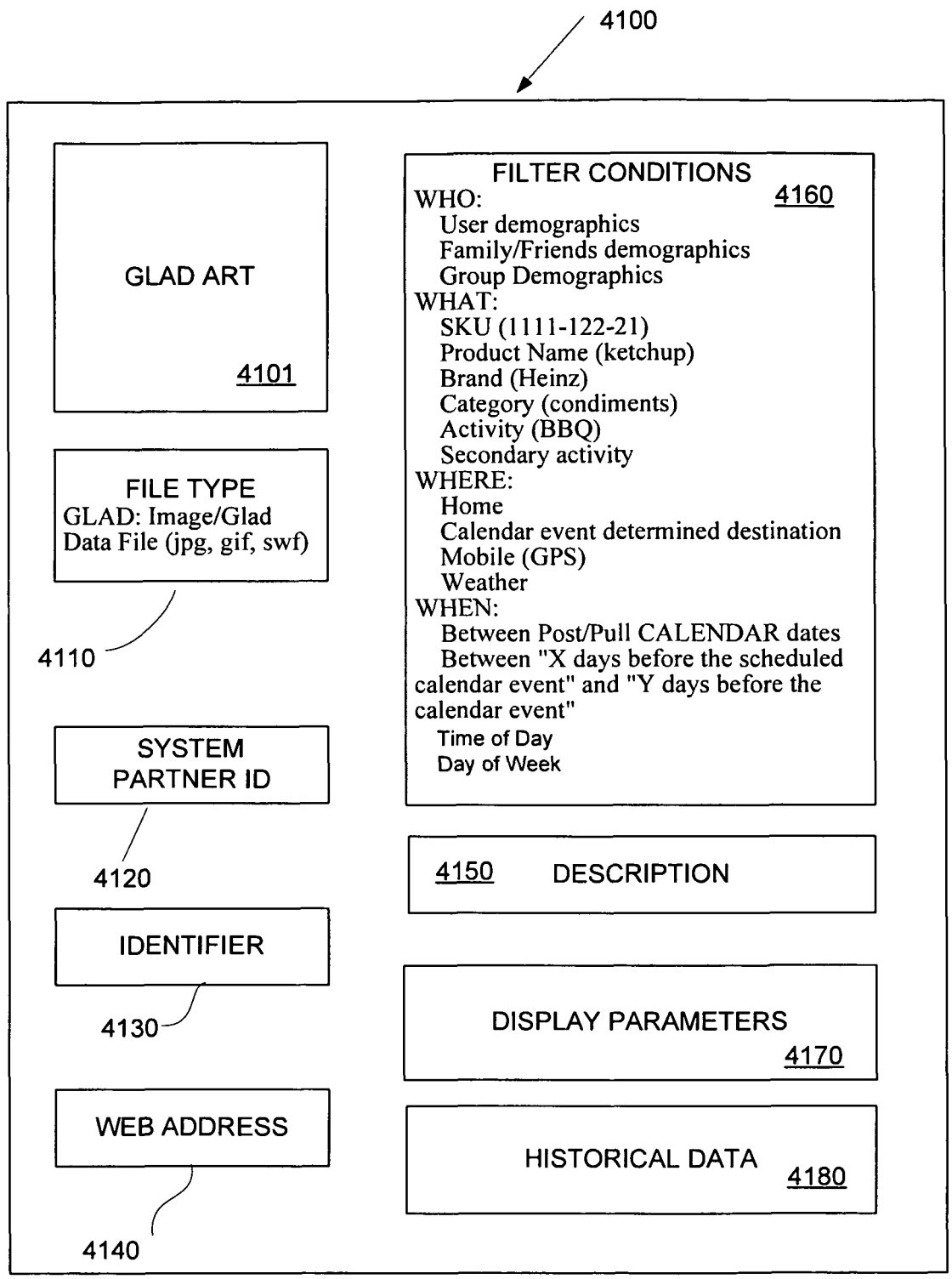
FIG. 41 show a schematic representation of information associated with a Glad.

FIG. 41 illustrates an example of the information and data 4100 that may be stored in connection with a Glad in the Glad DB. Typically, a Glad many include Glad art 4101, a file type 4110, a system partner identifier 4120, an identifier 4130, a web address 4140, filter conditions 3760, display parameters 4170, and historical data 4180.

A Glad includes digital content or Glad art 4101 that is presented to users in the graphics bar 1107 of the user interface. The digital content may include one or more of a graphic, an image, a picture, a video, and an audio component stored as a digital file. Some examples of the file types of digital formats that may be used include .gif, .jpeg, and .swf; however, any digital media that may be presented by a web browser and/or plugin may be used. The digital content also may include any number of characters, colors, shapes, logos, images, animations, visual and sound effects that covey a message to promote a product, a goods, and/or a service. In addition, a trademark, a service mark, a tag line, a company, business, or organization logo, and brand may be provided. It should be noted that FIG. 41 is representational and shows information associated with a Glad, but does not necessarily correspond with the actual database structure. For example, the same Glad art may be associated with multiple and different campaigns and filter conditions. As a result, instead of storing a separate copy of Glad art for each Glad, a reference or pointer to the file location of the Glad art may stored and used to access the Glad art associated with the Glad when serving the Glad art to the user interface.

An indicator 4110 of the file type (e.g., .gif, .jpeg, and .swf) may be stored in association with the Glad to direct the system to use appropriate applications to serve the Glad to the user interface. The system partner identification 4120 (e.g., a code, a name, a number) allows the system to identify any Glads with campaigns, monitor system partner operations, and to generate reports. The Glad identifier 4130 may be used by the system to identify a Glad. A web address 4130 may be used to provide a link to a specific a website or webpage associated with the Glad. For example, the web address may be used by the user's browser to display the website based on a certain user interaction with the Glad displayed in the user interface. For example, if a user selects the Glad art displayed (e.g., double selecting, such as double clicking on the Glad art 4101 on the user graphics bar), the web address may be used to navigate a popup browser to display a webpage or other online content associated with the Glad.

The description 4150 may include information about the Glad. The description 4150 may include information about a product or a service associated with the glad, such as a name, a category, a type, a SKU, and a brand. The description also may include the type of Glad, such as an advertisement, a commercial, a promotion, a coupon, a voucher, a ticket, a rebate, or an offer. The description 4150 may include an amount, a discount, or a value associated with the glad.

A number of filter conditions 4160 are associated with the Glad for use by the system logic to identify and/or trigger Glads that a user may interested in. The filters conditions include who, what, where, and when conditions and criteria that are used for comparison to user data stored in association with the WHO, the WHAT, the WHERE, and the WHEN strips of user interface and the user profile information in addition to other data associated with the user (e.g., the weather at a user's location). The who conditions filter for groups, family and friends, and the user. The most general filter is the group filter. The group filter targets contacts based on demographics of a user group. Family and friends is more specific filter targeting individuals based on demographic for individuals having a personal relation to the user, such as family members, friends, and business associates. The most specific filter is who which targets the individual user based on individual demographics, such as information stored in the user's personal profile. For example, user personal profile information that may be used to target individuals includes age, gender, income, hobbies/interests, previous shopping data, and other demographic information about individuals stored in the user profile.

The what conditions filter for a secondary activity/event, a primary activity/event, a category, a brand, a product name, and a SKU. The most general of the filters is the secondary activity/event in which a particular product/service type is specified based on the activity associated with a calendar event to which a user is invited to. The primary activity/event filter specifies a particular product type based on the activity found in a calendar event generated by the user. The category filter specifies a particular product/service category or type of product (e.g., food, grocery, meat, dairy, produce, office supply, furniture, sporting equipment, clothing, electronics, books) much like the areas in a department store that are found in association with a user's to-do or shopping list. The brand filter specifies a particular brand of product. The product name filter specifies a particular product name. The most specific filter is a SKU number or code that specifies a particular product Stock Keeping Unit (SKU) (e.g., found on a user's shopping list).

The where conditions filter for location, such as weather, a mobile location, a destination, and a home location. The most general filter is the weather in which an advertiser specifies a particular product/service type based on the weather conditions at the location of a user. The mobile location filter is used to specify a particular product/service type based on the GPS location of a user's mobile phone or web-enabled mobile phone. The destination filters are used to specify a particular product/service type based on the user's scheduled destination locations (e.g., a location of an event). The most specific where filter is the user's home location which specifies a particular product/service type based on the user's device's actual physical location.

The when conditions filter for a current time and a scheduled time. The current time filter allows a particular product/ service type to be specified based on the current (e.g., post Glad between June 1 and June 16 for a Father's Day sale). In addition, the current time may filter for days of the week (e.g., Mon-Sun) and time of day (e.g., morning, afternoon, evening, late night). The scheduled time filter allows a particular product/service type to be specified based on the time of a future or past scheduled event in the user's calendar (e.g., post Glad between x days before a calendar event and y days before a calendar event or post Glad between x days after a calendar event and y days after a calendar event), such as, a discount for an airplane ticket provided two weeks before a user's scheduled trip indicated on their calendar.

One or more of the conditions filters 4160 may be specified for each Glad to tailor who the Glad is served to wherein the more filters specified the more specific the individual user targeted becomes.

Display parameters 4170 also may be provided for the Glad. For example, if there are more Glads than may be displayed in the products and services branding area 1126 of the user interface, a rotation of Glads may begin so Glads are not excluded from presentation to the user. As a result, the a duration may be provided such as "present Glad for minimum of minimum x seconds or minutes per presentation." A system partner also may customize the presentation of Glads as part of an overall marketing campaign or to prevent saturation of presentation of a particular Glad. Therefore, the Glad may include additional criteria for Glad presentation and display, such as "do not rotate this Glad" and present this Glad for "x minutes/hours/days." In addition, an parameter indicating the Glad may be automatically customize by including message that inserts the customer name may be provided.

Glad Placement Logic

The system service provider 110 uses a Glad placement application to match the appropriate Glad content with a user based on specific information stored about the user in the user database. The service provider system provides powerful Glad placement because of the detail of information that the system has available at any given time for any system user. In order to match content, the system searches the individual events, and the daily to-do and shopping lists stored in association with a user account to determine if any there are any Glads that match items a user may be looking for at that moment. While searching the system also looks at all user information and compares the information against the triggers or conditions in the Glad database to select and deliver specific advertising content/campaign to the user. At the very minimum, the Glad placement application posts targeted Glads to the user even if there are no daily events based on other conditions for the day, such as weather, seasonality, holidays, and other factors. In addition, the Glad placement application may verify that the campaign is appropriate for the demographics, date, day-of-week, and weather, of a user. If a Glad is determined to be a good match, then the Glad is presented to the user.

Figure 42:
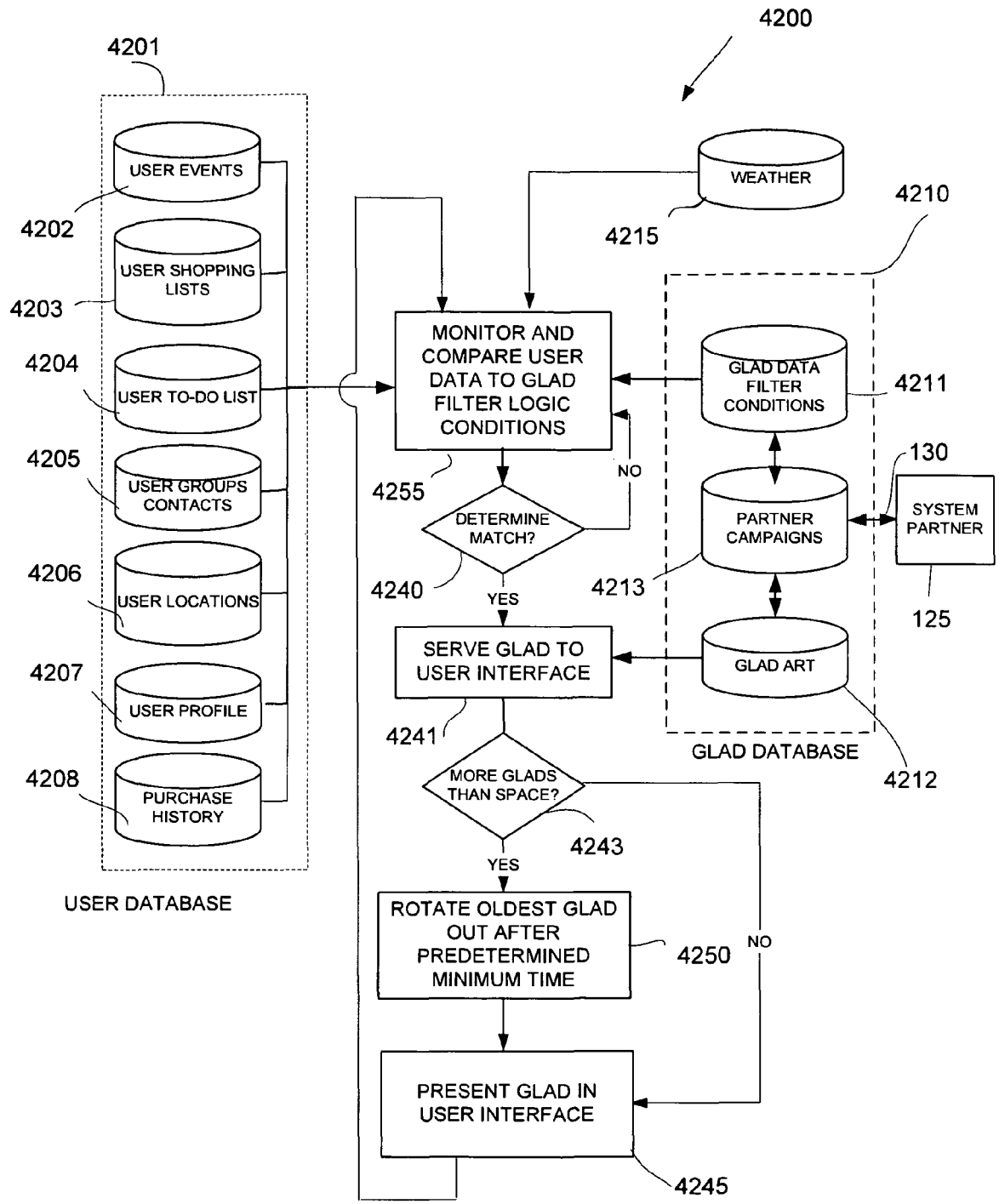
FIG. 42 shows an exemplary glad placement block diagram.

FIG. 42 shows one example 4200 of the glad placement application process. The user database 4201 includes information on user events, shopping list, to-do list, groups, locations, and profile including a purchase history. The system also includes a database of advertisements 4210, such as, for example, Glads. The Glad database 4210 includes Glad Filters 4211 and Glad Art 4212. In addition, some of the Glads may be provided by a system partners 125 running Glad campaigns 4213, as explained in further detail below. In addition, other information sources, such as a weather database 4215 or information outlet (e.g., national weather service) may provide information to the system about weather conditions for a user. The service provider system Glad placement application continuously monitors time sensitive items from the user database 4220. In particular, the system may monitor those items of the user database having time elements, such as user calendar events, the to-do list, and the shopping list.

The Glad placement application constantly monitors the dynamic and ever changing user data stored in association with the user database to determine if any Glads are good candidates for presentation to a user 4255. In order to determine if any Glads are appropriate, the system monitors the user database 4201 and compares items in the database for each user to the filters 4211 associated with the Glads to determine any user data items matching those conditions 4255. The determination may include using a natural language interpretation (NLI) application and a search function (e.g., described above for focusing). In addition, information stored by the user database (e.g., the user profile) may be used to interpret what if any goods, products, or services are associated with an item on a shopping, to-do list, or calendar event. For example, since the system maintains a shopping/buy history database to store items purchased by the user, and since people often buy the same items over-and-over, the shopping history may be useful in aiding the system to interpret items entered on the shopping list. The determination also may include checking current or predicted weather from a weather database or nation weather service 4215. When determining a match, the system Glad placement logic uses data in the condition filters to determine if the Glad truly is a good candidate or match for a particular user. For example, the system may determine if the Glad is for the right user demographic, the right day/day-of-week, that the Glad is active, the right temperature at a user location, and that the user has not already placed an order or bought the item.

If a match is determined 4240, the Glad Art 4212 is served to the user interface for presentation in the graphic bar of the user interface 4241. The system Glad placement application also determines if there is enough space in the graphic bar to present the Glad 4243. If there is enough space, the Glad is presented 4245. If the graphics bar is already full of Glads, the system rotates out the oldest glad after a predetermined minimum period for display for the oldest Glad is met 4250, and then presents the new Glad in the vacated slot 4245.

Figure 43:
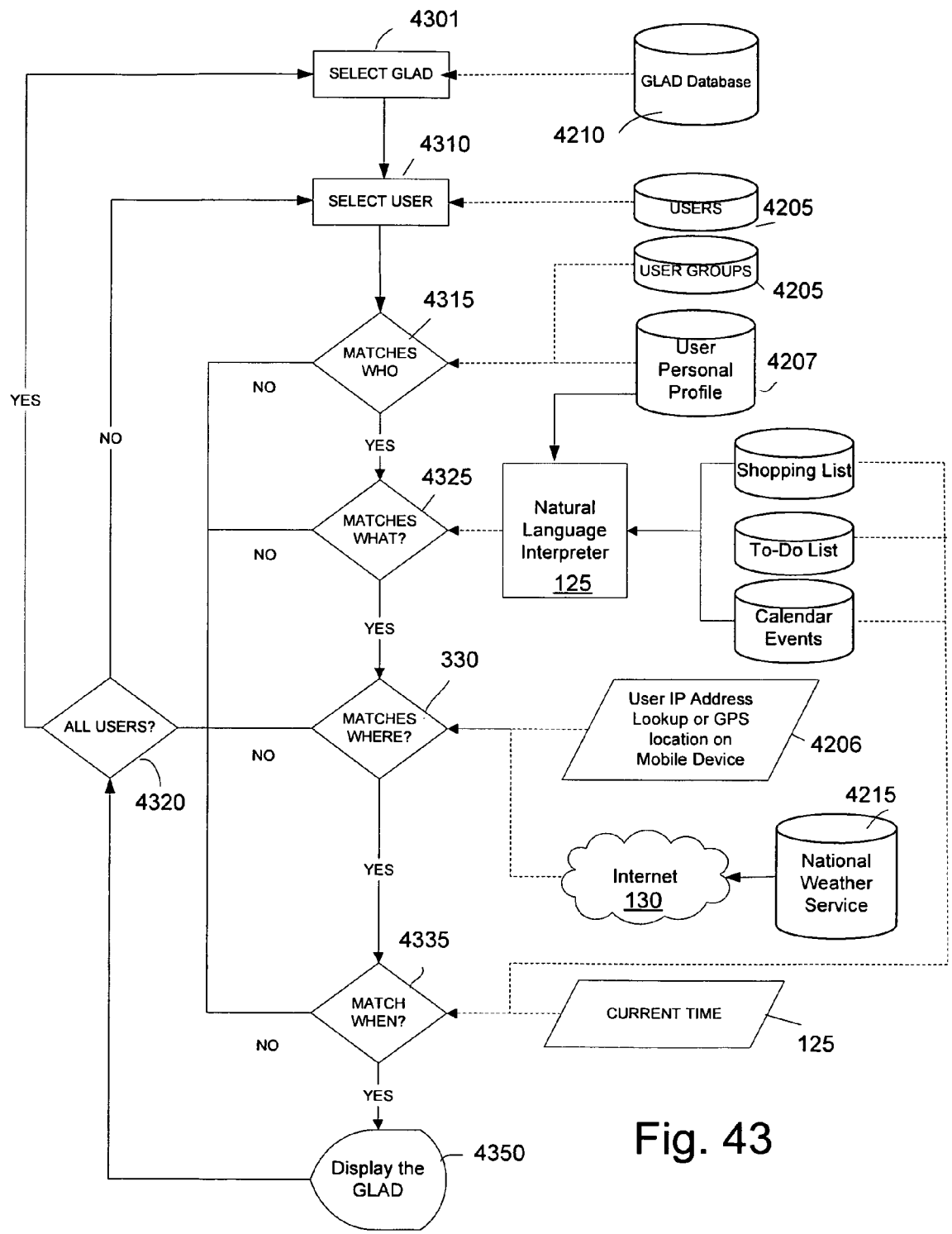
FIG. 43 shows an exemplary block diagram of application of glad filters.

FIG. 43 shows another example 4300 of the Glad placement logic for making a comparison between a user and the Glad logic filters. The Glad placement application selects a Glad from the Glad database 4301, and selects a user from user database 4310.

The application compares the who filter associated with the Glad to determine if the demographics of the conditions specified apply to the user 4315. For example, for each who filter condition specified, the system determines if the condition is met for the user. In this case all condition specified must be met. Any unspecified condition is met. If no who conditions are specified, the who filter is automatically satisfied. Examples of the conditions include user demographics, family/friends demographics, and group demographics. In order to check these conditions the system checks the user profile 3807 and the user contacts/groups 3805. If any condition is not met, then the application determines that filter is not satisfied, and the application determines if all users have been checked 4320. If not, the application selects another user for processing for the selected 4301.

The application also compares the what filter associated with the Glad to determine if the conditions specified apply to the user 4325. For example, for each what filter condition specified, the system determines if any condition is met for the user. Any unspecified condition is met. If no What conditions are specified, the What filter is automatically satisfied. Examples of the conditions include a SKU, a Product Name, a Brand, a Category, an primary activity (a user's activity), a Secondary activity (one a user is invited to). In order to check these conditions the application determines if items in the users shopping list, to-do list, and calendar events meet the condition. To do this, a NLI may be used to determine if an item on the list corresponds to an item in the condition. In addition, the user profile and shopping history may be consulted to aid in the identification and/or provide disambiguation between multiple meanings for items. If any condition is met, then the application determines that filter is satisfied. If no what conditions are met, the application determines if all users have been checked 4320. If not, the application selects another user for processing for the selected Glad 4310. If all users are checked, the application selects another Glad for processing 4301.

The application also compares the where filter associated with the Glad to determine if the conditions specified apply to location of the user 4330. For example, for each filter condition specified, the system determines if the condition is met for the user. Any unspecified condition is met. If no where conditions are specified, the what filter is automatically satisfied. Examples of the conditions include a home location, a calendar event determined destination, a mobile (GPS) location, or weather at a user's location. If the where conditions are not met, then the application determines that filter is not satisfied, and the application determines if all users have been checked 4320. If not, the application selects another user for processing for the selected Glad 4310. If all users are checked, the application selects another Glad for processing 4301.

The application compares the when filter associated with the Glad to determine if the timing conditions specified apply to the user 4335. For example, for each filter condition specified the system determines if the condition of the timing of the Glad and the timing of the user is met. The timing conditions include a current time and a scheduled timing. The current time is a post/pull calendar dates. Unlike the other items, the post/pull dates filter condition may always be specified. In addition, day of the week and time of day (e.g., morning, afternoon, evening, late night) may be specified for the current time. A second condition is between x days before/after a scheduled timed item and y days before/after a scheduled timed item or calendar event. In this case, if the condition satisfying that What condition was a timed event (e.g., a calendar event or a shopping list/to-do item with a time specified), then the second timed condition is applied. If any condition is not met, then the application determines that filter is not satisfied, and the application determines if all users have been checked 4320. If not, the application selects another user for processing for the selected Glad 4310. If all users are checked, the application selects another Glad for processing 4301.

If all the Glad filter conditions are satisfied, the user is considered a match; the Glad is served to the user interface associated with the user 4340. The application determines if all users have been checked 4320. If not, the application selects another user for processing for the selected Glad 4310. If all users are checked, the application selects another Glad for processing 4301.

It should be noted that the matching of filters for who, what, where, and when, may be performed in any order; however, certain orders may provide faster processing speeds. Optimal orders of filters may be determined over time from empirical data and testing. In addition, parallel processing of the logic is possible. For example, multiple applications and processors may focus on a specific number, selection, or group of Glads and/or users from within the whole system.

The following example illustrates the Glad placement process.

A Glad #113 includes a .jpg file of a coupon for $5 off "Spicy Good BBQ sauce" and includes a link to the website www.spicygoodbbq.com. The Glad filter conditions are specified as follows: WHO [user demographics=men and 18-50 years old, family/friends demographics=unspecified, group demographics=unspecified]; WHAT [SKU=unspecified, product name=barbecue sauce, brand=unspecified, category=condiments, activity=barbecue, picnic, BBQ secondary activity=unspecified]; WHERE [home=unspecified, calendar event determined destination=unspecified, mobile (GPS)=unspecified, weather=unspecified]; and WHEN [current time=between post/pull calendar dates Jun. 21, 2008 to Sep. 21, 2008, Day of week=unspecified, and Time of day=unspecified; and scheduled time=between "x days before the scheduled calendar event" and "y days before the calendar event" x,y=30, 0].

A system user Martha a 35 year old female living in Seattle Wash. has an appointment on her calendar for Sunday, July 13 titled "BBQ." Martha's husband Bill, also a system user, is a 39 year male with the same appointment on his calendar. The Glad placement application selects Glad #113 for placement on Jun. 23, 2008. The placement application searches through system users' for placement of the Glad. Selecting Martha the application applies the Who filter. In this case, the application determines demographic filter is for men between 18-50 and compares it Martha's personal profile and determines she is female age 35. The condition is not met.

The placement application selects the next user Bill. The application applies the Who filter. In this case, the application determines the demographic filter is for men between 18-50 and compares it to Bill's personal profile and determines he is male age 39. The condition is met. The remaining who conditions are unspecified, and therefore are met.

The placement application applies the What filter. The placement application determines the Glad #113 what conditions are barbecue sauce on shopping list, any kind of condiments on shopping list, or any upcoming events on their calendars with the words barbecue, picnic, or BBQ. Comparing these to Bill the system finds BBQ in an event for Bill and the what condition is met.

The application applies the where filter. In this case, all where conditions are unspecified, so the where condition is automatically met.

The application applies the when filter. The placement application determines Glad #113 when conditions are that the Glad will run between Jun. 21, 2008 and Aug. 21, 2008" (summer) and that if it was a timed item or event that satisfied the What condition, the triggering timed or calendar event must be within the next month (30 days before to 0 days before). The current date at Bill's user device is Jun. 23, 2008 so the first condition is met. Day of week and time of Day are unspecified so they are met. In addition, the item triggering the what condition was a calendar event so the application determines the BBQ appointment is for July 13 and therefore is within the next 30 days or month so the second condition is met.

As all filters Who, What, Where, and When have been met, the application places an image on Bill's user interface of BBQ Ribs with the Text SPICY GOOD $5 dollars OFF a bottle with any purchase. Bill sees the Glad and clicks on it, and a window opens to window to the website www.spicygoodbbq.com with the offer and a description of the product. Enticed Bill drags the Glad to his shopping list. The coupon is then offered for printing when Bill downloads or prints his shopping list.

Figure 44:
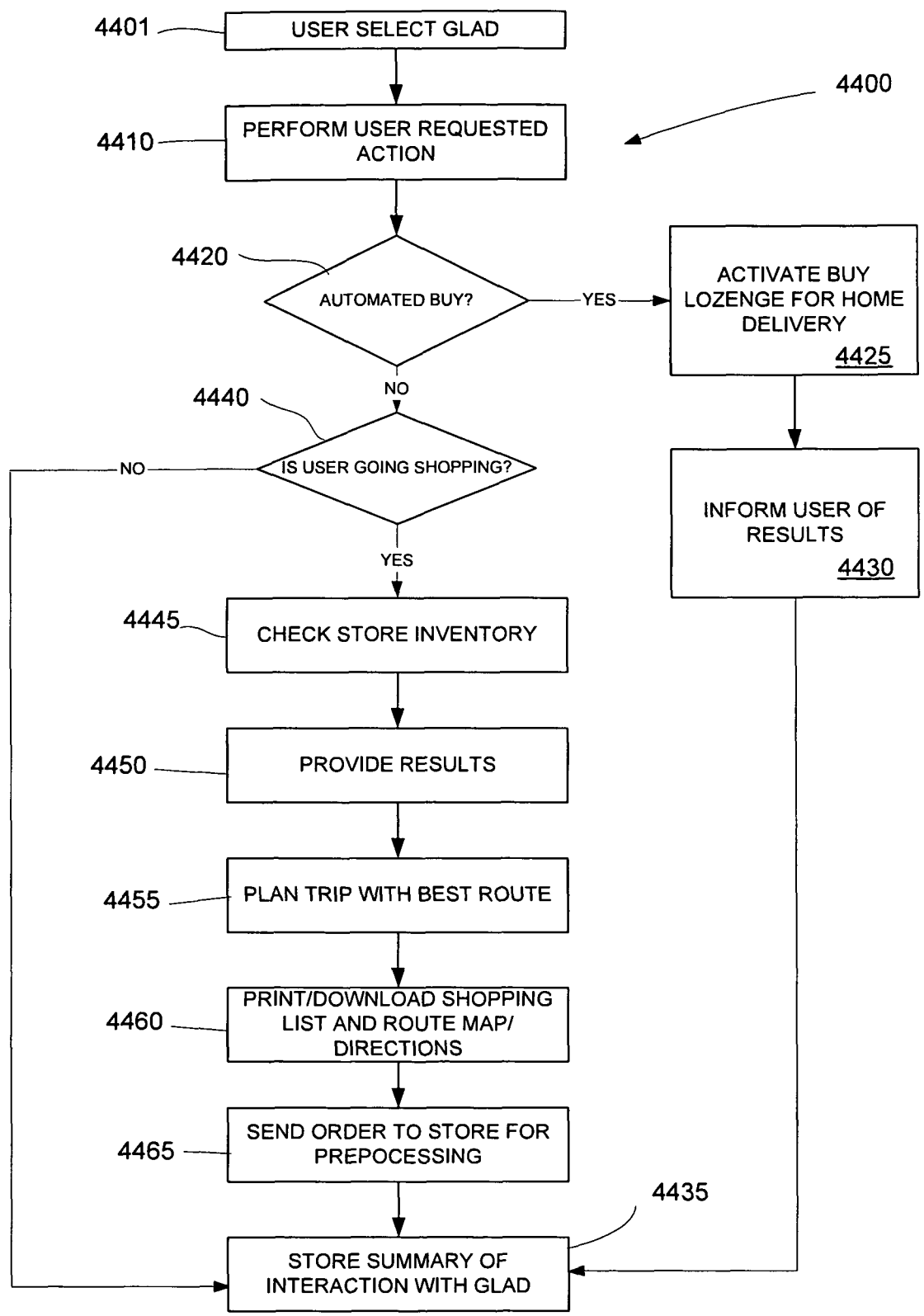
FIG. 44 shows an exemplary block diagram for responding to user interaction with a glad.

FIG. 44 shows on example 4400 of a process for user interactions with Glads once the Glad is served to the graphics bar of the user interface. When user selects a glad 4001, the system identifies the user input and performs the desired action 4410. For example, if the user drags a glad to the calendar the system creates and event with the Glad. The system also determines if the user interaction is dragged the item to the buy lozenge to attempt to purchase the related item 4420. If the user drags the Glad to buy lozenge, the buy lozenge is activated and the system attempts to purchase the related item 4425 using the instructions provided via the buy lozenge, and apply, present, redeem any incentive or discount provided by the Glad. The system informs the user of the results the user 4430. If the system purchases the item and the Glad was triggered by an item on the user's shopping or to-do list, the system queries the user if it should tick of the item as completed. In addition, the system stores a summary of the interaction with the Glad for the campaign database 4435.

Figure 45:
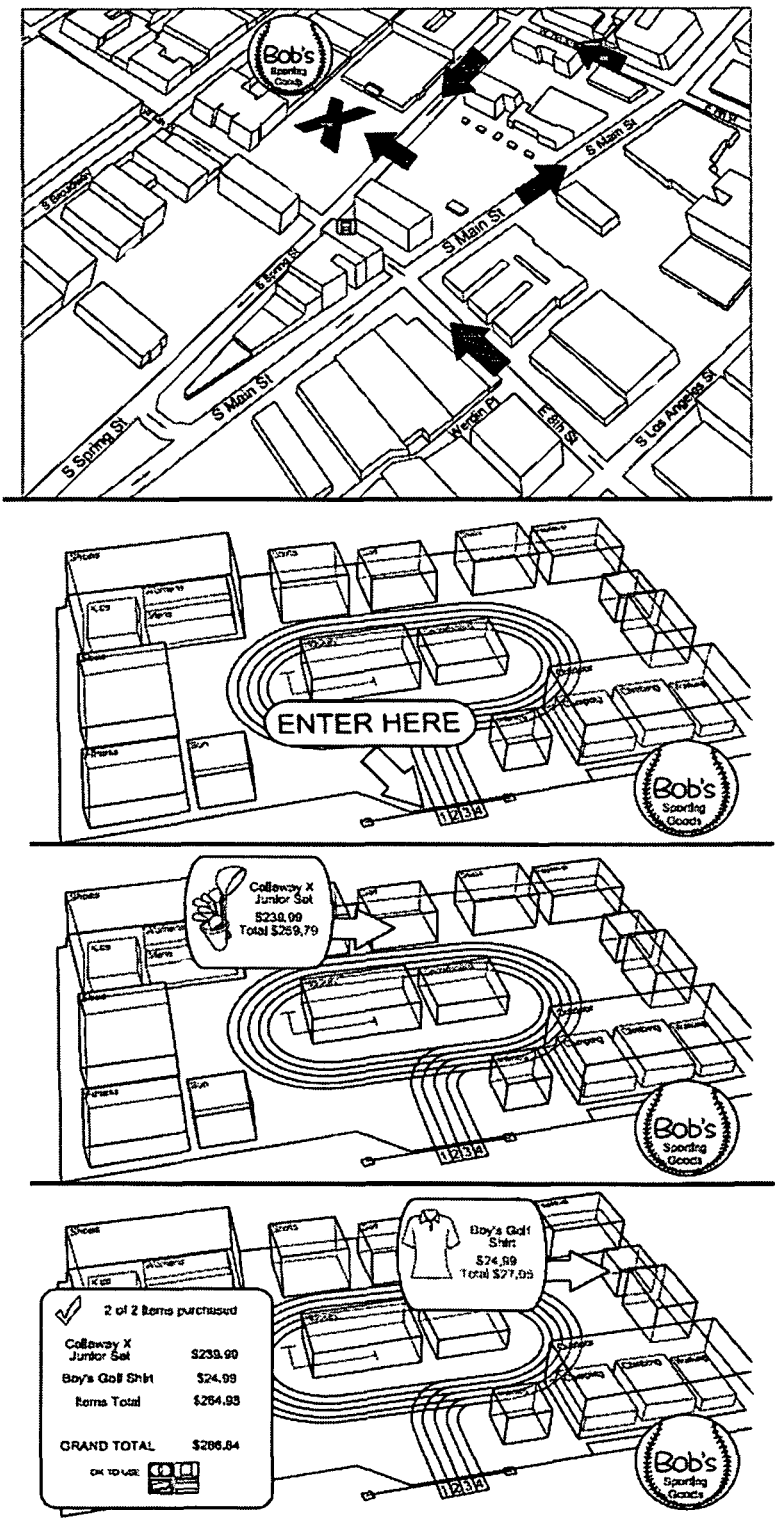
FIG. 45 shows an exemplary a shopping map route.

If the user has not engaged the system in an automatic buying of a product, the system determines whether the user is going shopping 4440. If user is not shopping, the system stores a summary of the interaction with the glad for the campaign database 4435. If the user is going shopping, the system checks local store inventors for the item and any other items on the user's shopping list 4445. If the a relationship with a local business is established to allow the system servers to access store specific information and inventory data, the system searches this information to determine if a store has existing inventory and where the items are located. The system provides the results of the inventory search to the user 4450. The system also plans the shopping trip by selecting the best route or commute for the user 4455. The system finds the best route using a mapping database to provide directions from store-to-store needed to purchase all items on the shopping list. The map, route, and direction may be presented on the Maps lozenge of the user interface. In addition, the system also may provide point-to-point driving directions and in-store maps to find the items on the list, an example of which is shown in FIG. 45. If the user is at home, a pop-up a box offering to print the Glad and or any incentives or coupons associated with the Glad is provide and a shopping agenda is provided to the user at the user's specified home device 4460. The system also offers to download the information to the mobile device to store coupons, directions, and a shopping agenda. The user also is given the option to send an order to the store for any items on the shopping list, to preprocess the order and have the user's selection waiting for them for pickup and/or payment 4465. In addition, the system stores a summary of the interaction with the Glad for the campaign database 4435.

System Partners

A system partner 125 may be any type of individual, group, or entity that provides products, goods, or services. The system partner also may be a branding company that subsidizes or sponsors a user account on the service provider system. The sponsored accounts may be offered to a user as a branded gift, a customer promotion, or incentive. The graphical user interface, described above, providing access to the service provider system via one of the sponsored accounts may be branded with logos, art, images, and advertising, and other digital media and/or content to brand the user interface and promote the system partner. In particular, a branded user interface provides a year-round targeted marketing vehicle for the system partner's products, goods, and services. The service provider system also provides the system partner with a powerful marketing/advertising tool that is able to target individual users with increasing degrees of specificity to provide the right information or incentive, at the right time and location and therefore substantially increase the likelihood of the user interacting with or using the advertisement. The service provider system 110 allows system partners 125 to design ad campaigns that market directly to users based on their interaction with the service provider system 110 and the user information stored by the system databases.

Each system partner 125 is granted access to the service provider system 110 through a communication path 130 to create and design a glad campaign, to view the results of previous and existing campaigns, and to edit campaigns. In one example, a system partner 125 may be provided with a username, a password, and an address or a locator to provide a browser with access to a website provided for system partner 125 by the service provider system 110. The system partner website provides a portal for the system partner 125 to access a glad placement application to manage a glad campaign. The glad creation application provides a system partner user interface that includes a Glad creation screen and a report screen. The Glad creation screen provides an interface to a system partner to upload information to create and edit Glads and determine how Glads are targeted to system users. The report screen provides the system partner with a tool to monitor glad placement and glad campaigns.

Figure 46:
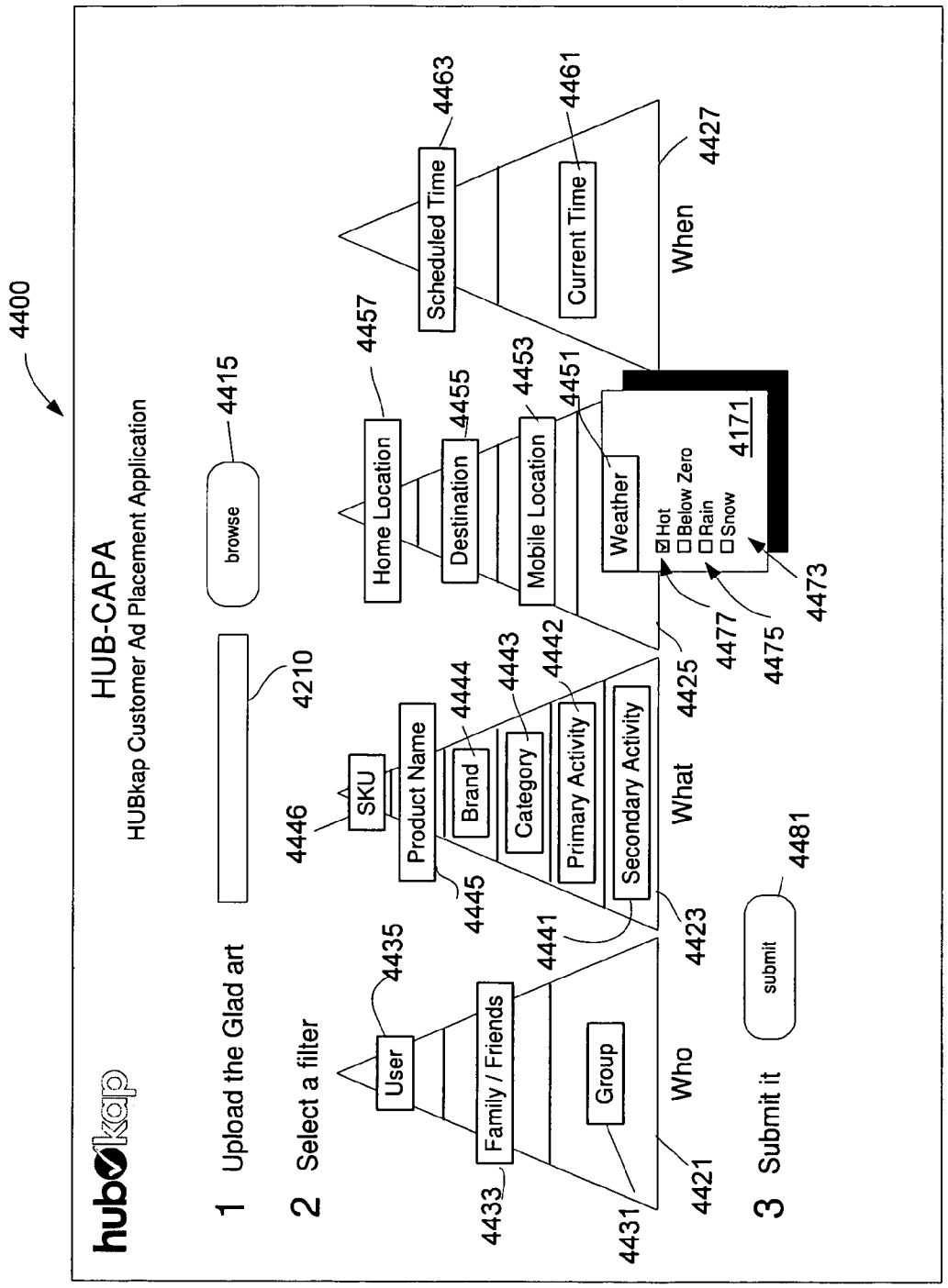
FIG. 46 shows an exemplary system partner user interface screen for Glad creation.

FIG. 46 shows one example 4600 of a Glad creation screen used to create Glads. Creating a Glad includes uploading the digital media and description that is served up to the user, selecting filters used by the service provider system for Glad placement, and submitting the Glad. The creation screen includes a file entry field 4210 and browse button 4615. The file entry field 4610 is used to enter a file location for the digital media that will be used to create the Glad. The browse button 4615 provides a convenient way to search for the file location of a glad by providing a drop down menu (not shown) of file locations and navigation buttons to help location a desired glad file. Once the file is located and/or selected the file path/location is displayed in the file entry field 4615.

The creation screen also provides a visual representation of glad filters depicted as a series of pyramids. The pyramids include inputs to set filters for serving the Glads to system users. The pyramids include a WHO pyramid 4621, a WHAT pyramid 4623, a WHERE pyramid 4625, and a WHEN pyramid 4627. The filters are used for comparison to user data stored in association with the WHO, the WHAT, the WHERE, and the WHEN strips of user interface. The each pyramid includes two or more filters that range from general (bottom of the pyramid) to specific (top of the pyramid) that may be used by a system partner to tailor a Glad campaign and how any Glad is served to a system user.

The who pyramid includes filters for groups 4631, family and friends 4633, and the user 4635. The most general filter is the group filter. The group filter targets contacts from a user group. Family and friends is more specific filter targeting individuals having a personal relation to the user, such as family members, business associates, and relationships (e.g., wife/husband, parent/child). The most specific filter is who which targets the individual user via information stored in the user's personal profile. For example, user personal profile information that may be used by the system partner to target individuals includes age, gender, income, hobbies/interests, and other demographic information about individuals stored in the user profile.

The what pyramid includes filters for a secondary activity/event 4641, a primary activity/event 4642, a category 4643, a brand 4644, a product name 4645, and a SKU 4646. The most general of the what filters is the secondary activity/event in which a particular product/service type is specified based on the activity associated with a calendar event to which a user is invited to. The primary activity/event filter specifies a particular product type based on the activity found in a calendar event generated by the user. The category filter specifies a particular product/service category or type of product (e.g., food, grocery, meat, dairy, produce, office supply, furniture, sporting equipment, clothing, electronics, books) much like the areas in a department store that are found in association with a user's to-do or shopping list. The brand filter specifies a particular brand of product. The product name filter specifies a particular product name. The most specific filter is a SKU number or code that specifies a particular product SKU (e.g., found on a user's shopping list).

The where pyramid includes filters based on location, such as weather 4651, a mobile location 4653, a destination 4655, and a home location 4657. The most general filter is the weather in which an advertiser specifies a particular product/service type based on the weather conditions at the location of a user. The mobile location filter is used to specify a particular product/service type based on the GPS location of a user's mobile device. The destination filters are used to specify a particular product/service type based on the user's scheduled destination locations (e.g., a location of an event). The most specific where filter is the user's home location which specifies a particular product/service type based on the user's device's actual physical location.

The when pyramid includes filters for a current time 4661 and a scheduled time 4663. The current time filter allows a particular product/service type to be specified based on the specific time at the user location (e.g., a current time, a day, a day-of-week, a time-of-day). The scheduled time filter allows a particular product/service type to be specified based on the time of a future scheduled event in the user's calendar.

The system partner selects a particular step of the pyramid to activate the particular filter. Multiple filters on each pyramid may be selected and filters on one of more different pyramids may be selected. A pop up window 4671 is presented to solicit additional information about specific condition within the filter if necessary. The popup window 4671 may include a list of items 4673 (e.g., hot, below zero, rain, snow), an input 4675 (e.g., a check box) to select the item, and an indication 4677 (e.g., a check mark) of selected items. Filters and conditions within filters may be left unspecified.

Examples of specific conditions that may be solicited by who pyramid are as follows. For example, the user filter a popup window may request "Provide information on the type of user you wish to target?" Options may include age range, income range, hobbies/interests, gender. For the family/friends filter the system may indicate "the item or service is not for the user, but for someone they know. What is their relationship to the user?" Options provided may include husband, wife, son, daughter, niece, nephew, grandson, granddaughter, grandmother, grandfather, mother, father, friend, and business associate. The group popup window may solicit information based on the subjects derived from system data stored for groups allowing the advertiser to specify a general subject area for groups that the user might be involved in. Subjects may be determined or drawn from actual user data broken into groups, such as recreation, sports, scholastic, hobbies, activities, outdoor, nature, etc.).

The SKU filter popup window may solicit a specific product identifier, such as a UPC code(s) (e.g.: 792850110991 for Burt's bees beeswax lip balm). The product name popup window solicits a product name (e.g., lip balm). The brand popup solicits a brand name (e.g., Chap Stick). A category popup window solicits a product category which may be selected from a pre-made list or via a data entry field (e.g., personal care products). The primary activity/event window may solicit a particular product type based on a user created activity found on calendar event generated by the user (e.g., beach, skiing, boating) and activities drawn from actual user data, such as recreation, sports, scholastic, hobbies, activities, outdoor, etc. The secondary activity/event popup window solicits the same information as primary event except that it specifies activities that the user is invited to.

The weather popup window solicits information about weather at the user's location, such as hot (over 90°), warm (over 60°), cold (below 40°), freezing (below 0°), rain, and snow.

The scheduled time window solicits information about when to deliver the glad based a date range and on a future or past date. The window may provide a date entry field and/or mini calendar to enter a date range for the glad. The current time popup window provides inputs for specific times that may be provided specified to deliver the glad based on a current time, such as days of the week, time of day (e.g., morning, afternoon, evening, late night).

Once the file location of the glad digital media has been specified and the filters have been determined, the system partner may select the submit button 4681 to upload the Glad digital medium to the glad database and save the select filters in association with the glad. The browser uploads the file using any of the available automated file transfer protocols. The glad digital and the proposed filter setting are stored in a database in a package called a Glad Pack. The system service provider may review the Glad Pack to assure that the content meets the minimum standards (e.g., file type, graphics, content, decency) and the filter settings provided. Once approved the Glad Pack data is provided to the customer incentive database, or they contact the system partner to make changes or adjustments to the Glad Pack info.

In one example, a system partner Big Time Golf wants to create a glad for upcoming father's day sale of 20% Supreme golf clubs. Big Time golf uploads an image of a man receiving a card from his son with his wife looking on and a big bow around a set of new Supreme golf clubs including Big Time Golf logo and the indication 20% off all Supreme Clubs. Setting the filters, Big time golf specifies who (family and friends=father, son, daughter, wife, grandfather), what (product name=golf clubs; brand=supreme; category=sports primary activity=golf; secondary activity=golf), and when (scheduled time=June 1 through June 16).

The service provider system continuously checks the glad database to determine if any glads are presented via the user interface. The system searches through data stored for each user in association with the who, what, where, and when strips and the user profile. In particular, the system searches the items in the lozenges associated with each strip to compare the data stored for each user lozenge to the filters provided for the glad in the system partner campaign database. For example, the system searches items stored for the To-Do and Shopping lists, and interprets the items for comparison against the contents of the conditions in the glad database to trigger any specific glad for presentation to a user. When the system determines the user data meets the conditions stored in association with the glad, then the glad is presented via the user interface.

Figure 47:
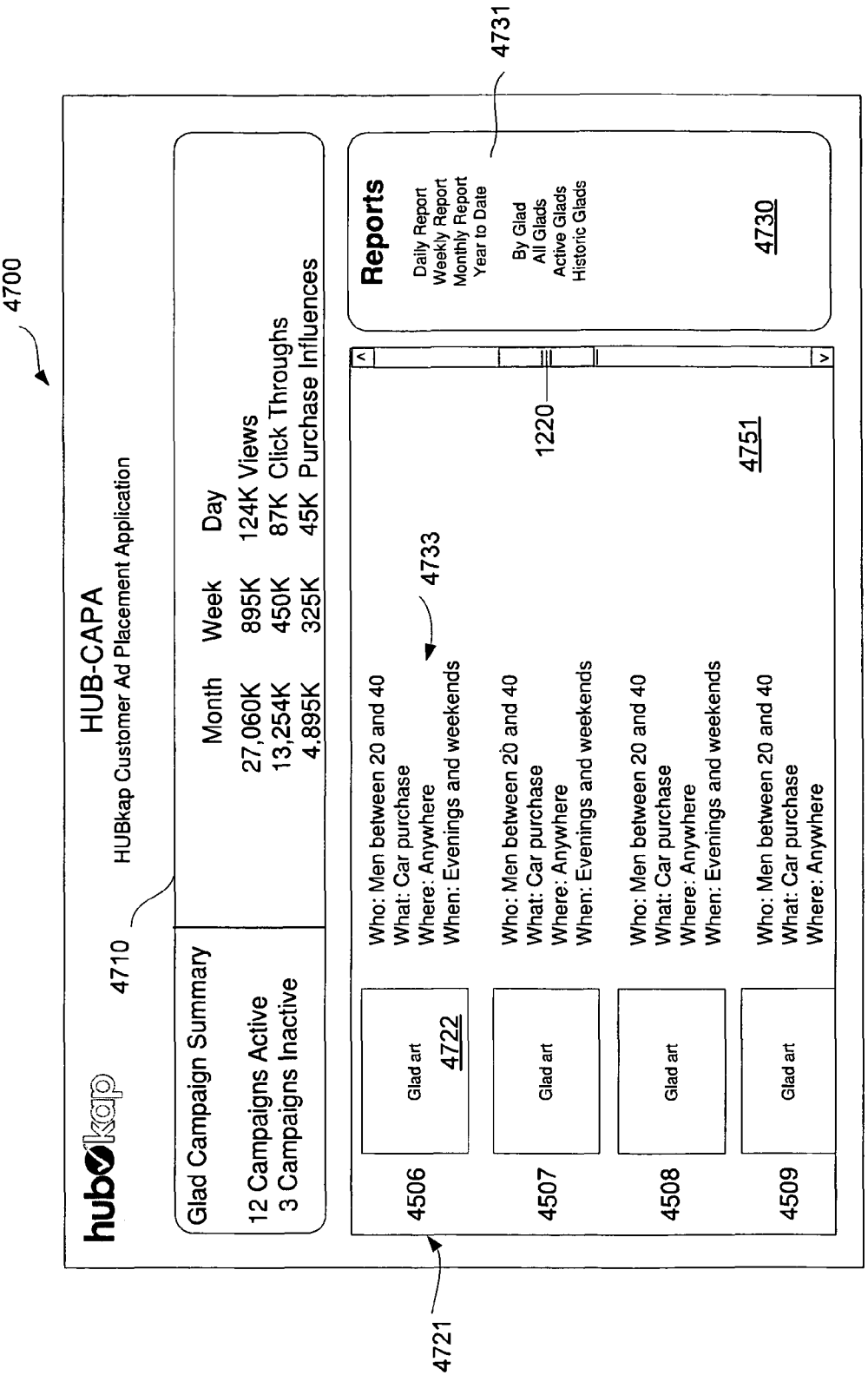
FIG. 47 shows an exemplary system partner user interface to monitor Glad campaigns.

FIG. 47 shows an example 4700 of the report screen. The report screen displays a summary of a Glad campaigns, detailed information, and reports for each Glad campaign that has been created by a system partner. The screen includes a summary window 4710, a details window 4720, and a report window 4730. The summary provides an indication of how many Glads campaigns are active and inactive. In addition, the summary provides overall information of how many Glads have been presented, how many Glads have been selected or otherwise viewed, and how many Glads have been associated with product purchases by time periods, such as month, week, and day.

The detail window 4720 presents individual information for each Glad campaign. The window 4720 includes a system identifier of the Glad 4721, a thumbnail representation/preview of the Glad 4723, associated filter information (e.g., under which conditions it is shown) 4724 and specific information for how many times a Glad has been displayed, interacted with by a user (e.g., viewed, manipulated, selected, dragged, and/or clicked on), and how many times a Glad has been associated with or influenced a purchase. A navigation aid 1220 is provided to navigate the list of Glads if there insufficient area within the detail window 4720 to display all Glads at any one time.

A reports window 4730 is provided to automatically compile and generate reports from system data regarding the Glads. The window 4730 provides various inputs 4731 that may be selected by the system partner to generate a desired report. The inputs 4731 specify a time period and types of Glads. The time periods that may be selected include: a daily report, a weekly report, a monthly report, and a year to date report. The types of Glads for which reports may be run include: by individual Glad, by all Glads, by active Glads, and by Historic Glads. Examples of other information an data which may be stored, tracked and presented include a campaign number, a campaign name (not shown), a campaign preview (e.g., a graphic), a number of views by users (not show), seconds on screen (not shown), number of "clicks" or "hits" (not shown). System partners also may review specific user's "clicks" in an archive history of user matches. Partners also may use the data to determine a level of interactivity, a level of user response to promotion, and to analyze hits by user locations and geography and other real time information to change or "fine tune" content or a campaign.

Drag and Drop Glads

Figure 48:
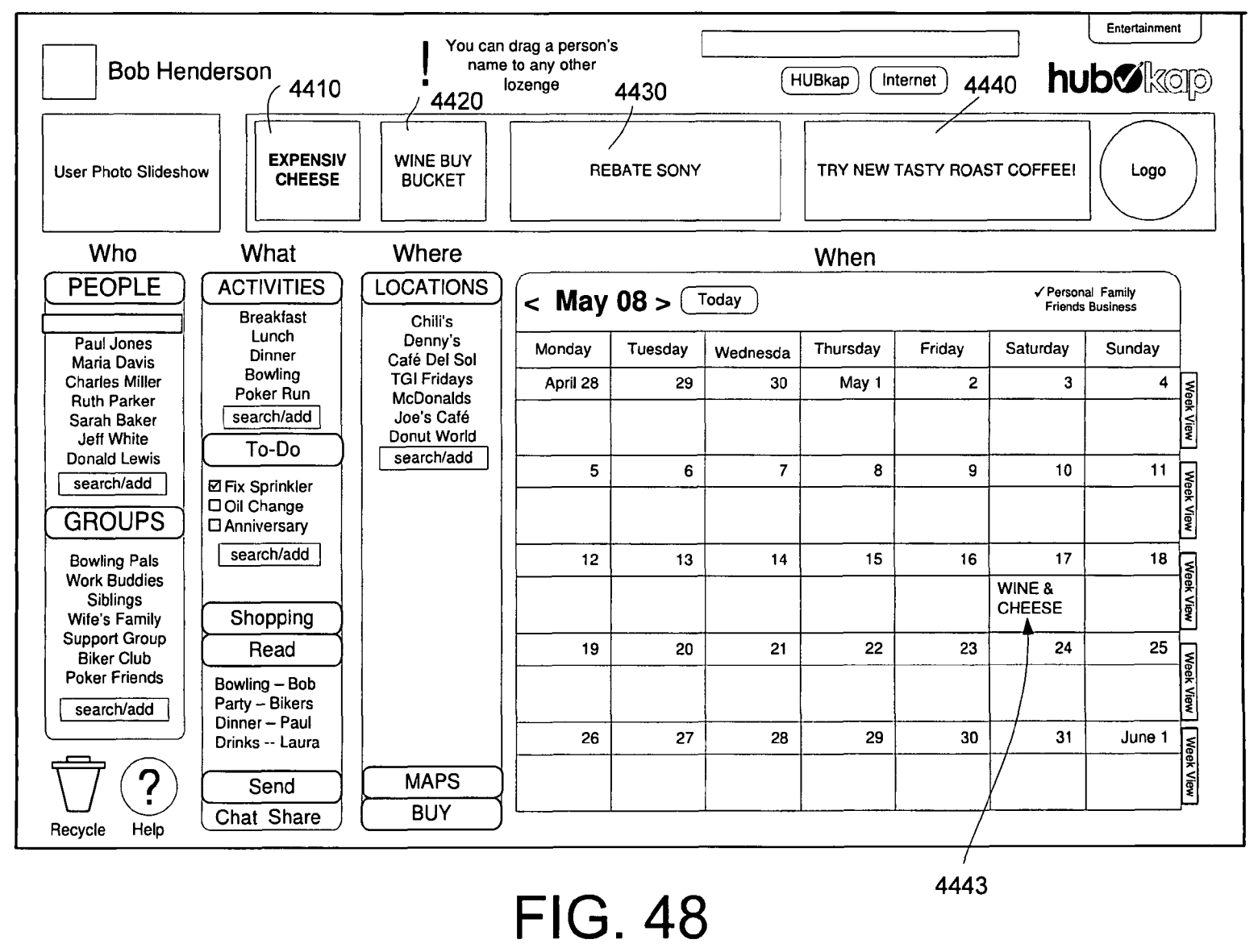
Figure 49:
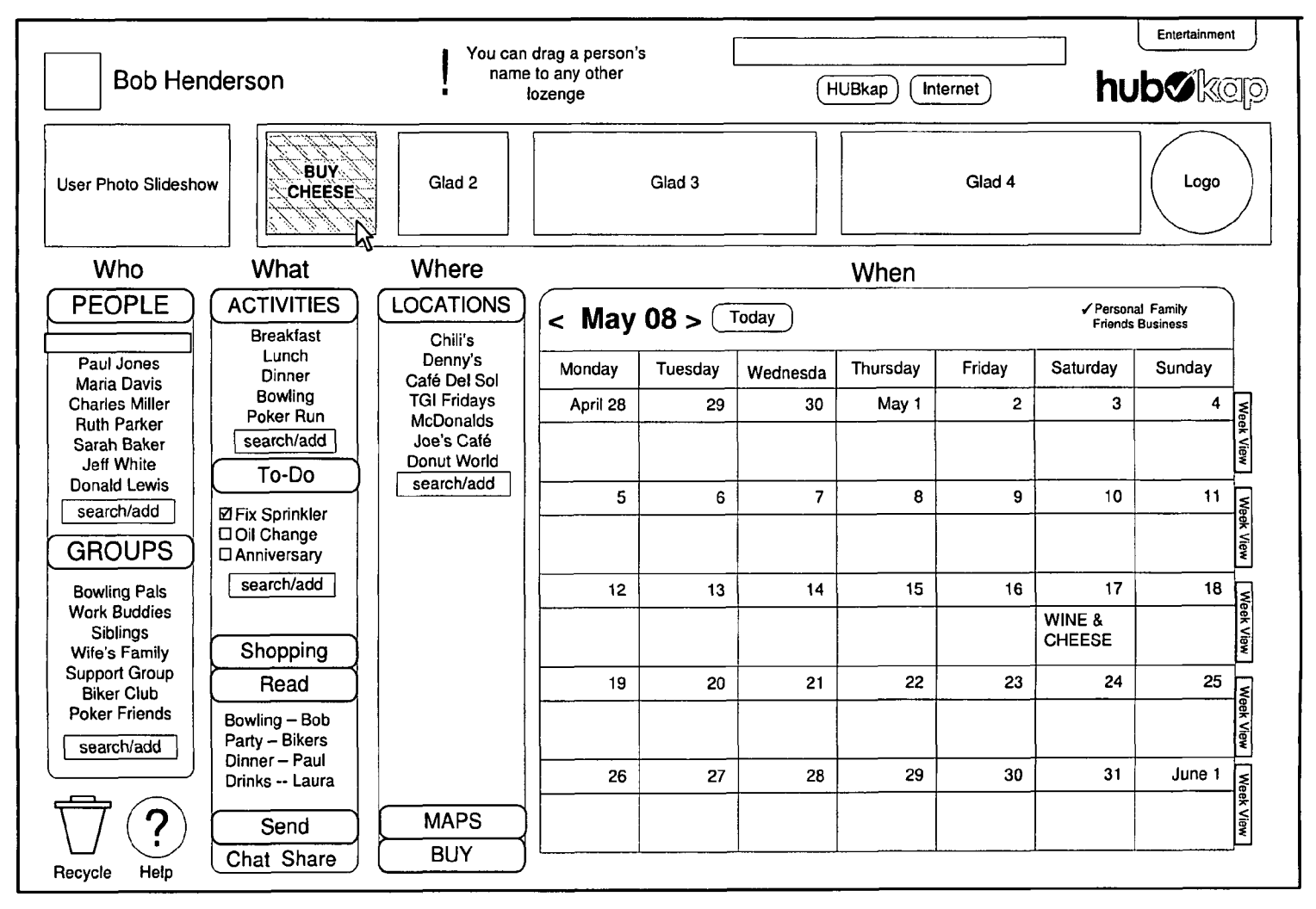
Figure 50:
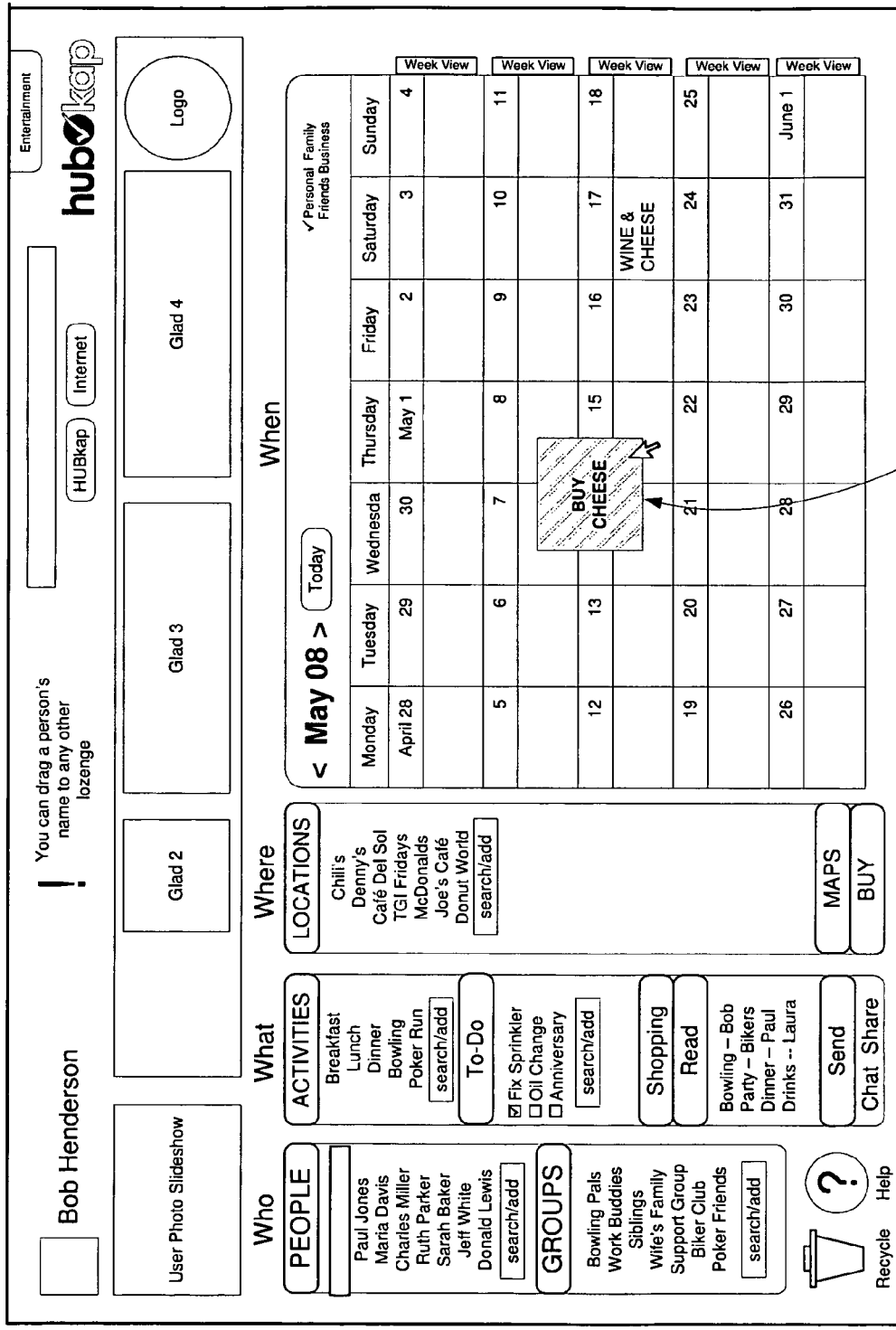
Figure 51:
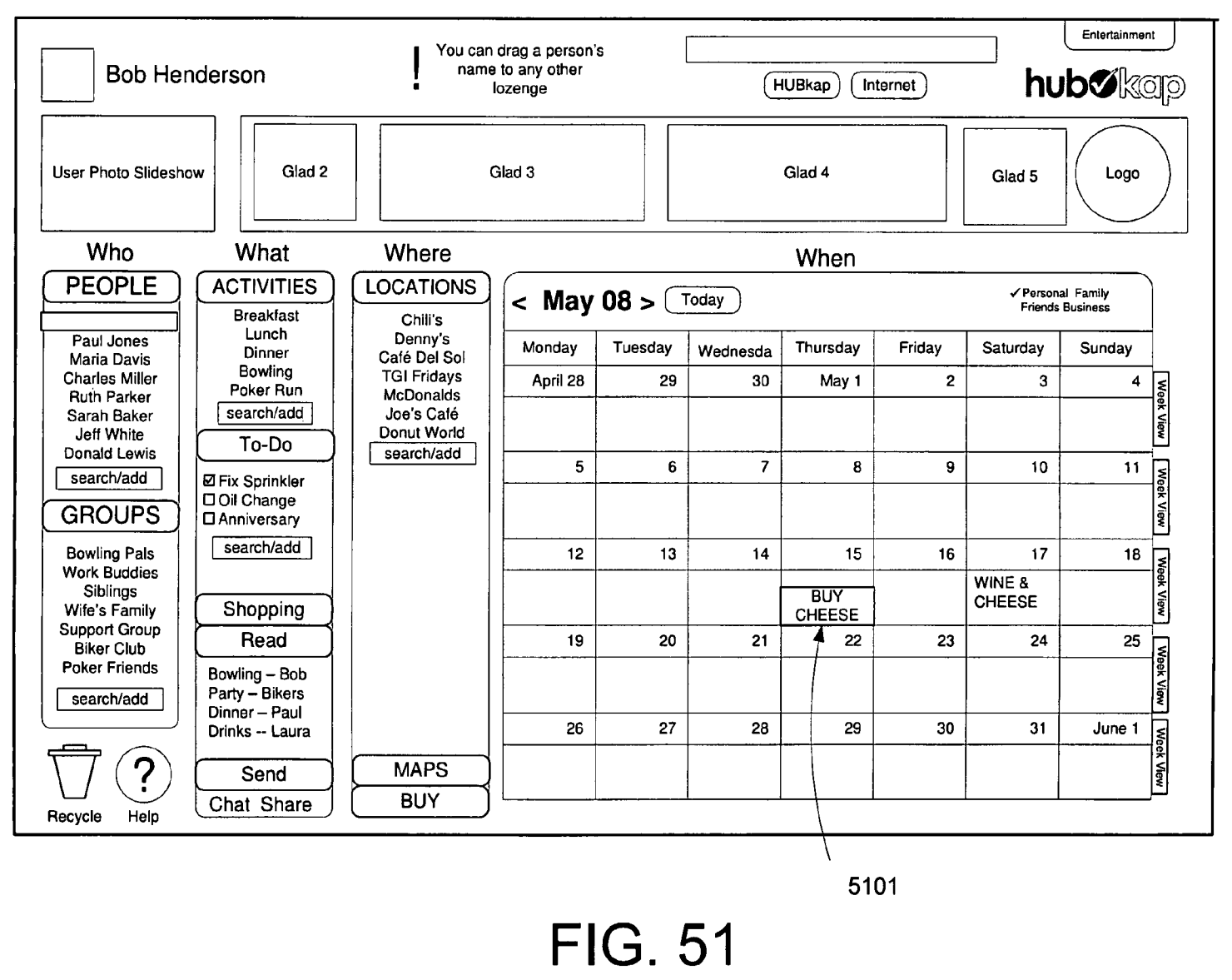

As mentioned above, when a glad is triggered or served it is placed in the graphics bar of the user interface. As shown in FIG. 48 the graphics bar 426 includes four Glads for 20% off Expensive Cheese 4810, Wine by the Bucket 4820, Rebate on All Sony products 4830, Try new coffee 4840. These Glads have been served to the user interface using the Glad placement logic. Once a Glad is displayed, a user may interact with the Glad. In particular, as described above, various items presented in the user interface may be dragged and dropped from one area to another (e.g., drag a contacts name from the group lozenge to the calendar lozenge to create an appointment with the contact). This is also true for Glads as shown in FIGS. 48-51. In an example shown in FIG. 48 a user notices a Glad for 20% off Expensive Cheese found in a Gourmet food chain with a store located in the user's town. The user is interested because they are attending a wine and cheese party this weekend (e.g., as indicated by the event "wine and cheese" event 4843 on their calendar). The user decides this coupon 4810 might be just the thing to bring to the event but is not going shopping today. Therefore, in order to save the coupon for her shopping trip Thursday morning, she places a user selection device (e.g., a pointer or a cursor) in position (e.g., over the glad) to select a glad (e.g., clicking a mouse button) for the glad coupon for cheese, as shown in FIG. 49. As shown in FIG. 50, the glad is captured and dragged 5001 to the calendar lozenge and dropped on a specific date or event. If no event on the calendar is present and event is created. If an event does exist the coupon is added to the event. In this case the service provider system automatically saves the glad coupon by creating an event 5101 associated with the user's calendar on May 15, 2008, as shown in FIG. 51. The user is automatically reminded or presented with the coupon on that date. The glad also may be accessed at any time by selecting the event. Glads also may be dragged to the top-do list, for example, a glad for lumber dragged to a to-do item build deck. Likewise, Glads may be dragged to the shopping list of the shopping lozenge to be associated with an item on the list. A glad may be dragged to an event to be stored in association with the event. A Glad may be dragged to a person on the people lozenge or group on the group lozenge to be sent by the user to the person or group. Dragging a Glad to the lozenge without direction to a particular item may be used to automatically create and item. For example, drag a glad to the shopping lozenge or to-do lozenge may be used to add the item to the shopping list or to-do list.

Family Organizer

The family organizer may be implemented as a platform on a home appliance 155, as separate user device 150 that is added to an existing appliance, or as a standalone user device 150. The family organizer presents a specialized version of the user interface, described above, that provides a household or family with many useful functions of the standard user interface in addition to other features specifically tailored to the home environment. The family organizer also includes additional hardware, as described below.

Figure 52:
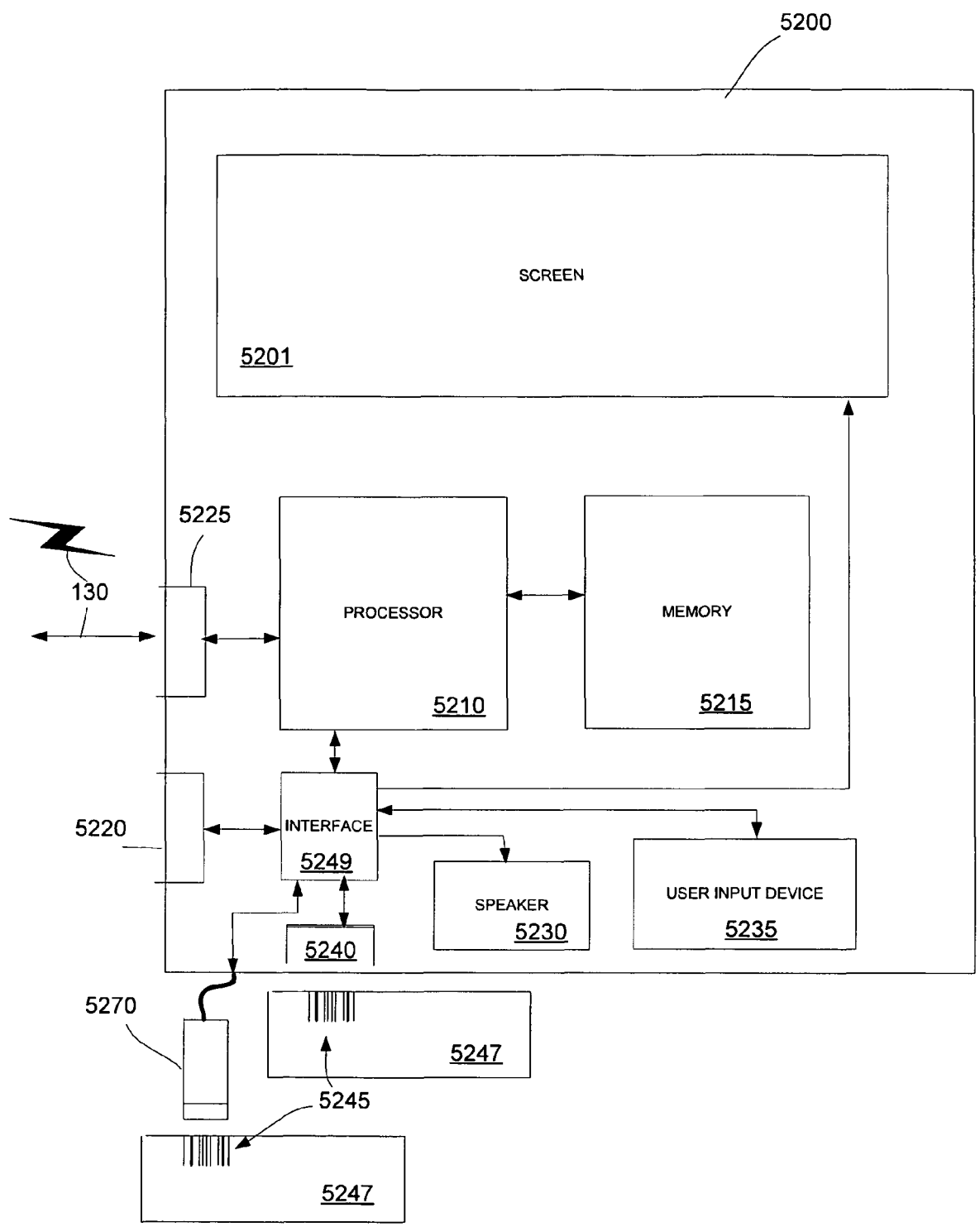
FIG. 52 shows an exemplary family organizer system.

As shown in FIG. 52, unlike the previous user interfaces described above the family user interface may be designed to run on a specific type of family user device 5200. The family user device 5200 includes the following features and functions. In one example, the family user device 5200 may include a display 5201. In one example the display may be sized to fit in a family environment, such as a kitchen appliance or countertop. For example, the user device display may be a seven to fourteen inch diagonal, although other sizes may be used. Any type of display that may be used to present digital content may be use, as described above for a user device. In one example, the display may be a continuously on, and backlit color LCD display or equivalent. In one example, screen of the display 4701 may be a touch screen, such as full-screen stylus or stylus-free touch-screens, or multi-touch touch screen technologies that interface with a browser application of the family device to provide its user primary input device. For example, the screen may be touched to select and manipulate content, such as items on lozenges and Glads from the graphics bar.

The family user device 5200 includes a processing device 5210 and memory device 5215 with, at a minimum, sufficient processing power and capacity to provide at least basic Internet browser functionality, such that a specialized version of the user interface (i.e., the family user interface) may be run on it. The processing device 5210 and memory device 5215 may be used to run applications and store data. The processing device, memory, and applications may be the same as described above for a user device 101.

The family user device 5200 also may include a built-in microphone, ADC, and support hardware 5220 to allow limited voice recordings to be stored on the device's non-volatile memory. However, voice messages and recording also may be recorded and stored as sound files (e.g., .mp3 or .wav files) and provided to the service provider system 110 via a communications interface 5225 that may exchange data and content with the service provider system 110 using various communications paths 130. The family user interface may access the sound files or data for playback to the user. A built-in speaker 4830 and amplifier connected to the processing device 5210 which is large and powerful enough to play voice records and sound effects at a volume that may be heard in a noisy family kitchen environment is provided. One or more user input devices 5235 (e.g., a keyboard, keypad, mouse, and/or buttons) may be provided (in addition to the touch screen or in place of the touch screen if only an LCD display is provided) to operated and command the family device, its components, and to manipulate and interact with the family user interface. One or more generic or separate interfaces/drivers 4849 may be provided to allow the processing device 5210 to communicate with and/or drive the various peripheral components (5220, 4830, 5235, and 5240).

A Wi-Fi or other wireless access Internet technologies, functions or interfaces may be provided for or as part of the communications interface 5225 to allow the family user device 5200 to easily connect to the user's home wireless network or other wireless RF networks. For example, the organizer also may include RF mobile phone or cell technology components including an antenna and software and/or a dedicated processing device (not shown) to enable the sending and receiving a calls through a mobile network. The built in microphone 5220 and speakers 5230 and its associated D/A and A/D circuitry may be used in this application.

The family user device 5200 also may include a power source (not shown) such that the device is always on, always backlit, and/or ready to use at any time. The family user device 5200 provides the family user interface when turned on or powered on, and there is no need for the user to launch any applications or make any selections in order to get the device 4800 to operate.

In one example, the family user device 5200 may be implemented as a standalone device similar in size and shape to "digital picture frames." The stand-alone family organizer may include a fastening device that attaches to an appliance, such as a refrigerator, with rubberized non-slip magnets, or to other prominent locations with adhesive strips, such as inside the back door of the house, on the wall above a light-switch, or on a garage wall next to an entry to the house. A built in family device 4800 is essentially identical to the stand-alone device, except that it is built into an appliance, such as a refrigerator.

The family user device 5200 also includes and optical reader, such as a bar-code reader 5240. The family user device 5200 is provided with an activation device (e.g., a user input via the screen or a user input device or a mechanical switch or button on the housing of the organizer). A user may activate the barcode reader 5240 to scan optical codes, such as a barcode 5245 on an item 5247. Once activated, the barcode reader 5240 may remain on or active for a period of time (e.g., 15 seconds) allowing multiple items 5247 to be scanned. The barcode reader 5240 may automatically shut-down after expiration of the period. In one example, the barcode 5245 may be a universal product code (UPC) barcode. The family user device 5200 also may include sufficient non-volatile memory to store a barcode database (e.g., about 90 meg) allowing the processing device 5210 to quickly look up and/or determine the UPC and a corresponding description of a barcode 5245 read from the barcode reader 5240. The processing user device 5210 periodically updates the UPC database by downloading data from the service provider system 110. A hard button (not shown) also may be provided on the family user device 5200 to manually operate the bar code reader 5240. In this case, operation of the button automatically causes the processing device 4810 to send the data for scanned items to the service provider system 110 to be added to a shopping list for the family. In another example, an external barcode reader 5270 that may be integrated with the communications interface and/or plugged into a port of the user device 101 along with any corresponding software and drivers, may allow a user device 101 to operate as a fully functional family organizer.

Figure 53:
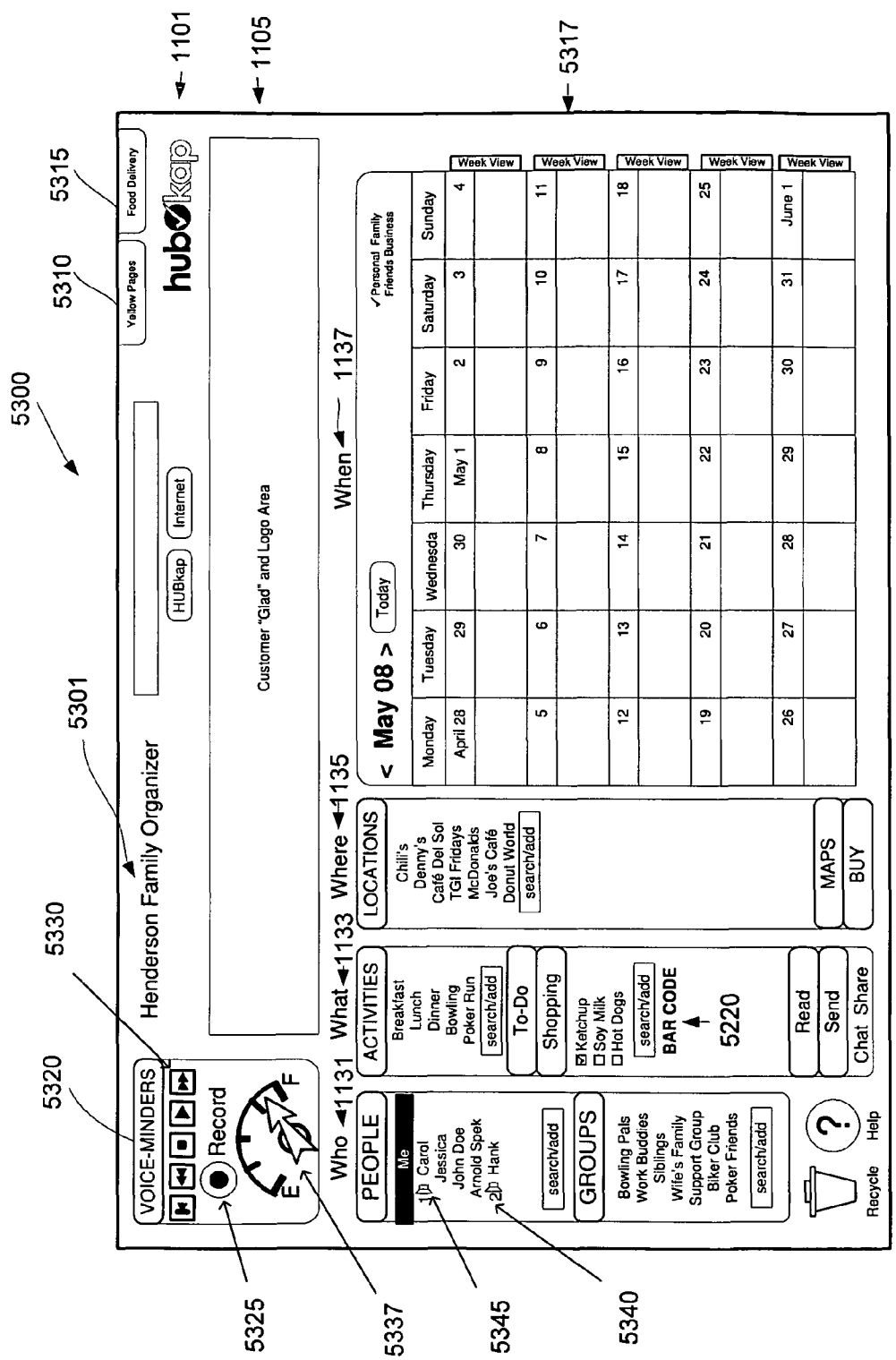
FIG. 53 illustrates one example of a family user interface screen for the family organizer.

FIG. 53 illustrates one example 5300 of a family user interface screen for the family organizer. The family user interface provides all of the functionality and inputs of the system user interface described above. For example, the family user interface includes an information bar 1105 and a graphics bar 1107. The information bar may include a customized descriptor 5301 ("Henderson Family Organizer). Two additional inputs are also provided: yellow pages 5310 and food delivery 5315.

In addition, family user organizer 5217 also includes the WHO 1131, WHAT 1133, WHERE 1135, and WHEN 1137 strips. Each of the strips also is provided with their corresponding lozenges (e.g., people, groups, activities, maps, etc) and inputs. In addition, the shopping lozenge includes an additional input 5320 "barcode." Selecting this input causes the barcode reader to activate and read barcodes off items.

The family user interface also may include an additional voice reminder lozenge 5320. The voice minder lozenge 5320 may be small or medium. The small voice lozenge only includes the title "voice minder." The medium voice minder lozenge 5320 also includes a voice recorder skin with inputs 5325 record a message, and inputs 5330 to play, pause, fast forward, rewind, and replay messages, and an indicator dial 5337 of the amount of space left to record messages. To record a message, a user drags the name from the people lozenge to record a message for that person. The people lozenge includes an indication 5340 of how many new messages a person has, and an input 5345 that may be selected to play the message.

Figure 54:
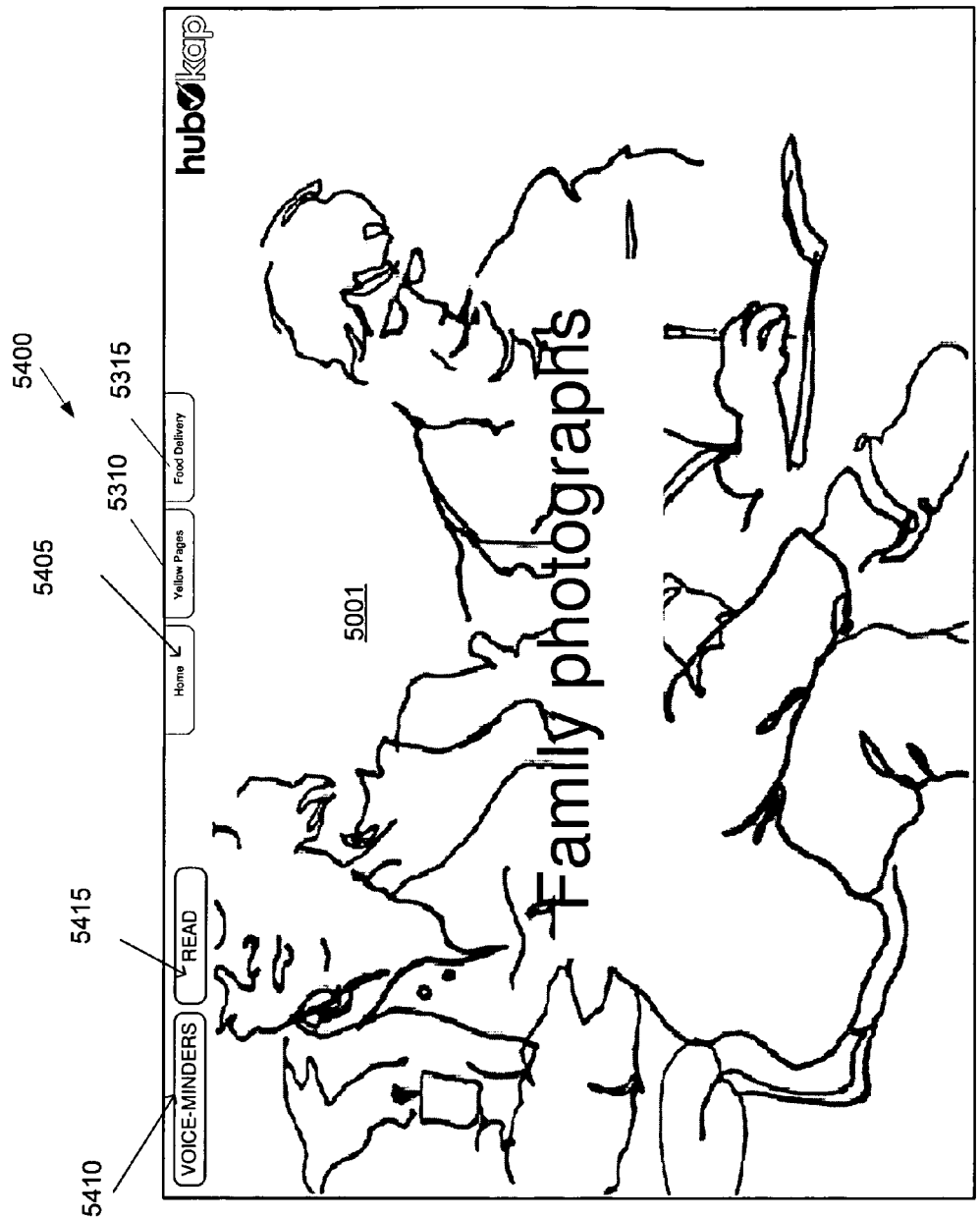
FIG. 54 illustrates a second display for the customized family organizer.

The family organizer also may be customized by the user. FIG. 5404 illustrates a second display for the customized family organizer. To customize the family use interface, the user connects to the system service provider using any web-enabled user device 101, such as, for example, a user's desktop or laptop computer. A webpage is provided to the user that includes a special menu option for customization. In response, the user enters customizing choices selected from the menu and is provided with the opportunity to upload content for presentation by the family organizer. Customizing parameters and/or content are sent to the family organizer via the web and changes are seen after a short delay. The user can customize the family organizer to decorate the screen with family pictures, run a slide-show of family images continuously, play videos, and add photo avatars for themselves and their contacts. In the example shown, in FIG. 54 the user interface background 5401 is set to a slide show of family photographs. In addition, three inputs are provided: Food delivery 5310, Yellow Pages 5315, and Home 5405. Selection of food delivery and yellow pages causes separate windows to be presented as described below. Selecting the home input 5405 returns the family interface screen 5400 to the display. Indicators for new voice minders 5410 and messages 5415 may be provided.

Figure 55:
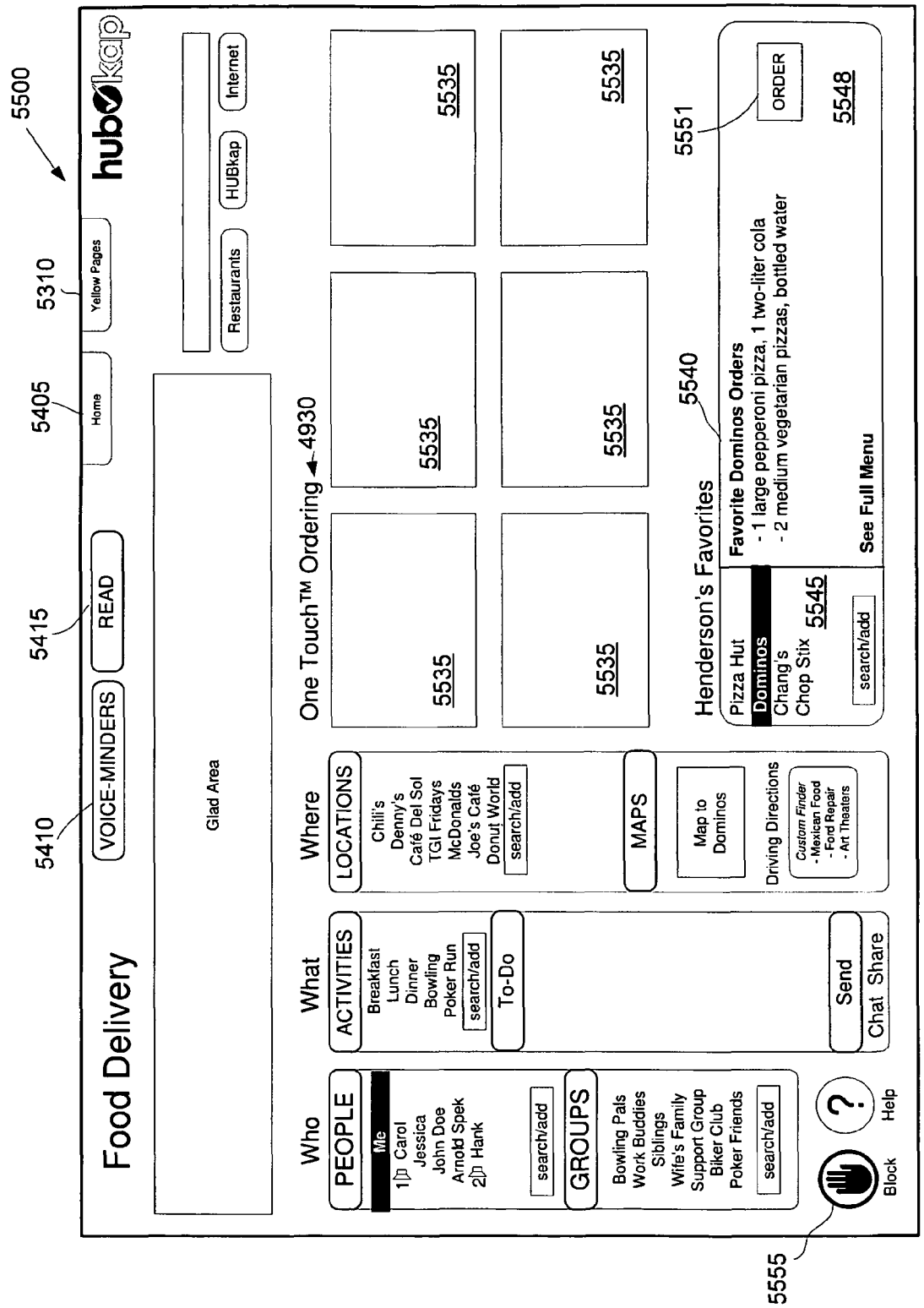
FIG. 55 shows an exemplary directory listings search interface.

FIG. 55 shows an example of the food delivery screen 5500 that is presented when the food delivery input 5315 is selected. A user may select any name in the people lozenge to focus a food choice search on that person's tastes (e.g., as stored in the user database and/or based on the information provided in their personal profile). Similarly, a user may select any name in the groups lozenge to focus a food choice search on that favorites associated with the group.

A "One Touch Ordering" area 5530 present photo boxes 5535 showing the six most recently ordered meals, regardless of restaurant or person selected. The user may simply select a box (e.g., clicking/touching the box) to cause the system service provided to automatically order the corresponding meal that was previously order for immediate delivery. In response, the system logs onto the restaurant or food deliver facilities webpage, provides the order and customer information including payment and delivery address. The system also provides confirmation message of the order in the users read lozenge.

The family favorites window 5540 (e.g., "Henderson's Favorites") includes a list 5545 of all local restaurants in order of last used. Selecting a restaurant from the list 5545 causes a second window 5548 to list, in order of frequency, the groups' favorite previous orders. A see full menu input 5550 provides a menu of the selected restaurant in the second window 5548 to allow new or custom orders to be selected a la cart from the list. After the order is selected, the user may select order input 5551 to purchase the order. This causes the system to log onto the restaurant or food deliver facility web page, provide the order and customer information including payment and delivery address. The system also provides confirmation message of the order in the users read lozenge. The system saves the order information and adds the order to the one touch order area.

Items from the one touch area and family favorites window 5540 cannot be dragged to the Activities lozenge. However, when the activities lozenge is highlighted, the family favorites foods and restaurants are focused to that activity. Any item from the one touch area and family favorites window 5540 may be dragged to the To-Do list, causing a To-do item to be created. When items from the To-Do list are highlighted, the family favorites foods and restaurants are focused to that activity. Items from the one touch area and family favorites window 5540 also may be dragged to the Send lozenge to be shared or chatted about. Similarly, Items from the one touch area and family favorites window 5540 also may be dragged to the locations lozenge, causing an item to be created. Location items, when highlighted cause windows to present the restaurant or food associated with that location. The maps lozenge always shows a map of any item or location that may be highlighted, in addition to the directions and a customer finder feature.

The recycle bin is replaced with block input 5555, which removes a search entry from ever appearing again in the search boxes. As a result, a user may eliminate businesses from re-appearing if they do not like or have no interest in those businesses.

Figure 56:
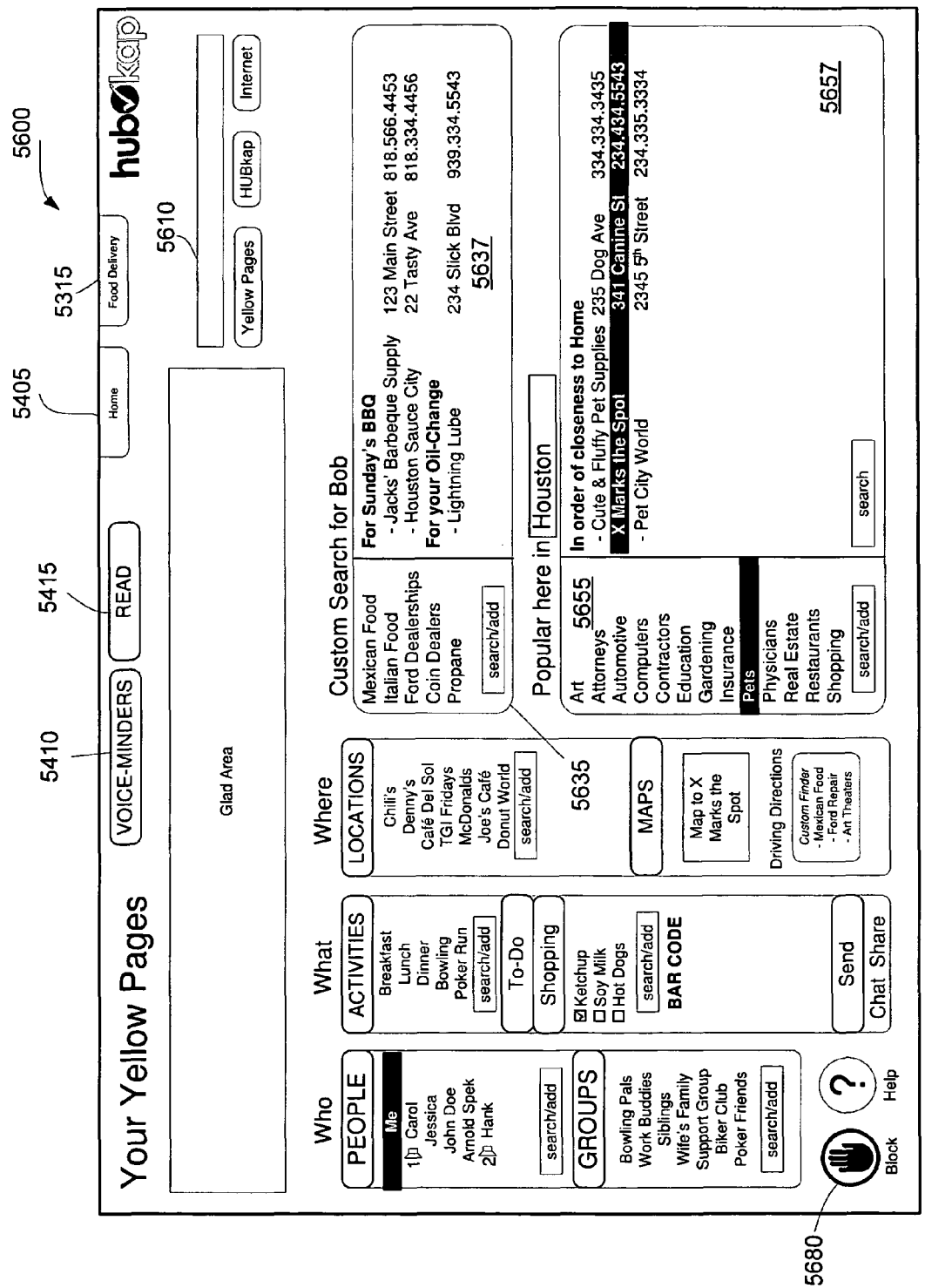
FIG. 56 shows an exemplary food delivery screen interface.

FIG. 56 shows an example of the Yellow Pages or listings directory screen 5600 that is presented when the Yellow Pages input 5310 is selected. A user may select any name in the people lozenge to focus a Yellow Pages or other listings directory search on that person's interests (e.g., as stored in the user database and/or based on the information provided in their personal profile). Similarly, a user may select any name in the groups lozenge to focus a Yellow Pages or other listings directory search on that favorites associated with the group.

The custom search window 5630 default position is a search for the special interest items to the user or "me" in the peoples lozenge (e.g., "Bob Henderson"). The window 5630 includes two sections 5635 and 5637. The first section 5635 shows custom yellow pages categories. The second section 5637 shows information for specific businesses. The sections 5635 and 5637 display pre-fetched search items determined by the system based on data in their personal profile, to-do list, shopping list, and calendar.

The Popular search window 5650 shows items based on the user's local area (e.g., "Houston"). The window 5650 includes two sections 5655 and 5657. The first section 5655 shows custom yellow pages categories based on what is popular in that area. The second section 5657 provides choices for a selected category that are presented in order of distance to the user's home.

Certain items from the search window sections 5637 and 5657 may be dragged to the activities, such as items that may be associated with an activity. The associations are stored in a database. When activities are highlighted, the windows 5637 and 5657 focus to find businesses associated with that activity. Any search item may be dragged to the To-Do list to cause an item to be created. When highlighted To-Do items focus to find businesses associated with that to-do list item. Search items may not be dragged to the shopping list; however, shopping items, when highlighted, cause the windows to focus to find businesses associated with that shopping item. Search items may be dragged to the Send lozenge to be shared or chatted about. Any search item can be dragged to the Locations lozenge, causing an item to be created. When highlighted, location items focus the search window to find businesses associated with that location. The maps lozenge always shows a map of any search item, or location that may be highlighted, in addition to directions and a customer finder feature.

The search bar 5610 features a yellow pages search in addition to the system and Internet search to focus searches, as described above.

The recycle bin is replaced with block input 5680, which removes a search entry from ever appearing again in the search boxes. As a result, a user may eliminate businesses from re-appearing if they do not like or have no interest in those businesses.

Figure 57:
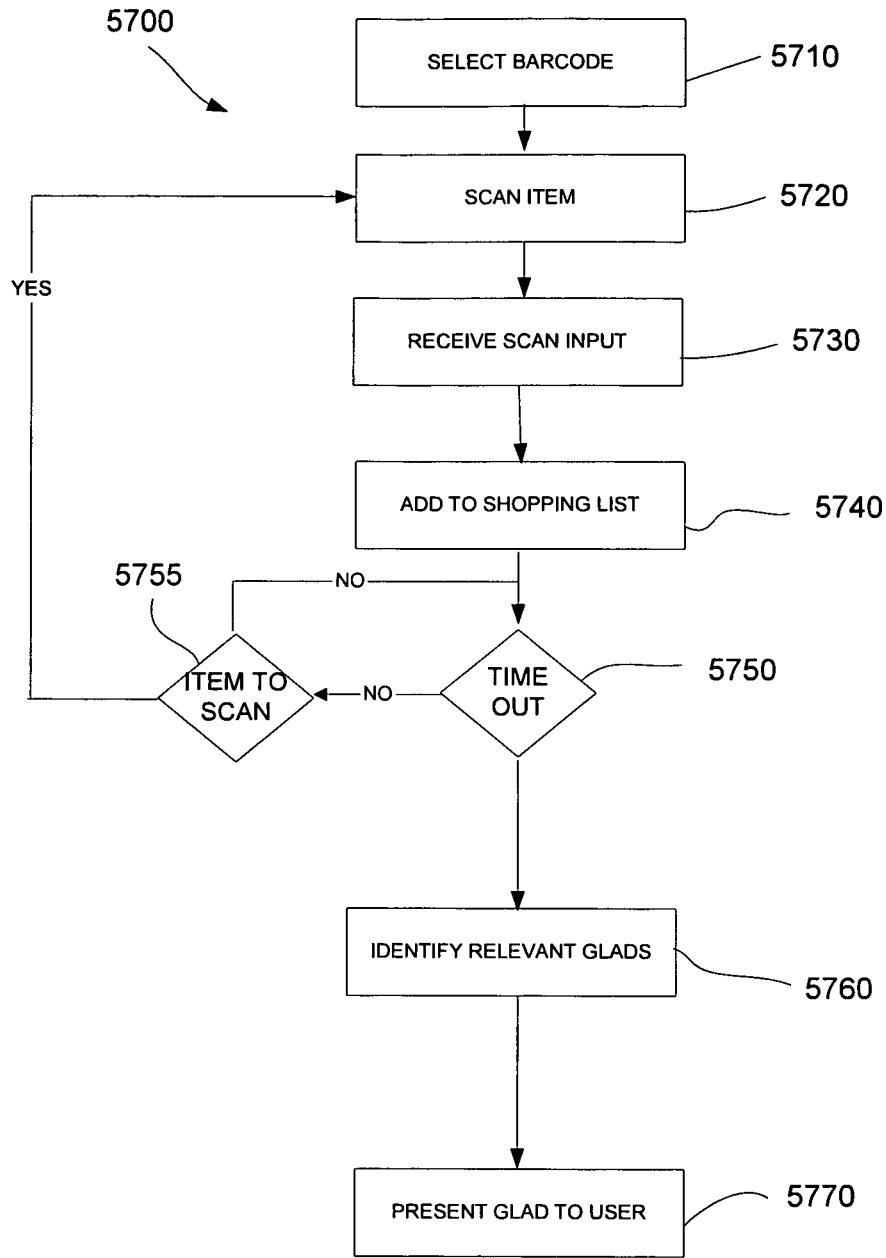
FIG. 57 illustrates one exemplary block diagram for shopping with the family organizer.

FIG. 57 illustrates one exemplary process 5700 for shopping with the family organizer. In one example, the family organizer is placed in the kitchen on or in proximity to an appliance where food is stored and/or disposed of. When an item is used up or more of an item is desired, for example, milk, the user activates the barcode reader or via the button or the user input on the shopping lozenge of the family organizer interface 5701. The processing device instructs the barcode reader to scan a barcode on the item (e.g., the UPC code on the item) 5710. The barcode reader scans the bar code and provides the results to the processing device 5720. The item associated with the bar code is determined by looking up the bar code in memory, by sending bar code data to the service provider system for identification, or by accessing an online database 5730.

Once the processing device system service provider identifies the scanned item, for example, milk, the scanned item is automatically added to the family shopping list the group family is selected on the groups lozenge or the shopping list of a specific family member if their name is selected on the people lozenge 5740. Once activated, the barcode reader may remain active for a predetermined period of time. The processing device determines if the predetermined period of time has elapsed 5750. If not, the processing device determines if there are additional barcodes to scan 5750. If there are the barcode reader and processing device may continue to scan items and add them to the shopping list until there are not items left and/or the timeout occurs. If the bar code data is provided to the system for identification, it may be sent as each barcode is read or as a batch if there are more than a single or a large number of items.

Once the items have been added to the shopping list, the system monitors the shopping list to identify any relevant Glads for the items on the shopping list 5760. In addition, when items are scanned and added to the list, the system automatically knows what the item is as the item was identified by its UPC. As a result, the system does not need to interpret these items on the list using the NLI and may directly identify potential Glads to serve to the graphics bar 1126 of the family organizer. Any identified Glads or incentives are presented to the user 5770. Identified Glads presented to the graphics bar may be dragged to the shopping list or the calendar for saving.

As described herein, the shopping list may be printed and/or provided to the mobile device interface (e.g., a mobile phone or smart phone). Alternatively, if the user orders items from using an online shopping service, the system may be automatically setup to store specific scanned item by UPC numbers, name of item, and/or types of items (e.g., groceries and drugstore items) in a special shopping list associated with a specific online store or shopping service. When these items are scanned they are automatically stored on the store shopping list. The system may then be activated via the shopping lozenge to periodically log on to the online shopping site, provide the required user information including passwords and payment information (e.g., credit/debit card information), orders the items on the list, and schedule delivery. The personal profile allows a user to specify specific items and types of items the system service provider 110 may automatically buy for the user. The user may specify what price ranges (e.g., a maximum, a minimum or both) that are okay for the system service provider to user in determining whether to make a purchase. The user profile buy information may include payment information, such as credit card, debit card, paypal, online banking information, a single purchase spending limit, a monthly purchase spending limit, and a card balance limit. The user also may delivery preferences, such as time of day or day of week. This automated buy feature may be activated/deactivated at any time by the user and a manual override may be provided. Any item with a barcode and/or a UPC information may be added to the shopping list and/or ordered this way.

Of course, the add/search field of the shopping lozenge may be used by a user to manually entered a UPC number or product code (e.g., by typing, dragging, or cut and pasting) to add the item to the shopping list. In addition, the organizer may display pictures of items that are not normally associated with or have bar code items, for example, produce, such as vegetables, fruit, and bulk items. The user may select these items using a user input device to add these items to the shopping list.

In addition, food associated items may be scanned to automatically look up recipes that user the food items or food items from the shopping list may selected to look up recipes. The recipes may be presented in a pop-window. The recipes may include food items with hyperlinks or other indicia allowing selection (e.g., check boxes, buttons, etc.) for each food item. The user may add individual food items to the shopping list by selecting the food item using a user input device. In addition a user selection is provided to select and add all food items in the recipe to the shopping list in amounts at least sufficient to make the recipe. Additionally, the user may print out the recipe.

The shopping list/barcode feature is a powerful device for family users. Using this feature a user no longer has to worry about forgetting to put items on the shopping list. Furthermore, because any item that is scanned is automatically added to the shopping list in real time, even if an item is used up after someone has left to go shopping, the scanned item may be displayed on a user's mobile device shopping list of the mobile interface almost instantly and therefore the item is purchased. For example, a working parent plans to go shopping after work, and their kids at home after school use up all the milk. When the kids scan the item as the throw out the carton, the shopping list is instantly updated and Dad is none the wiser when he checks his shopping list at the store, thinking milk was on there all the time.

Dynamic Social Networking

Figure 58:
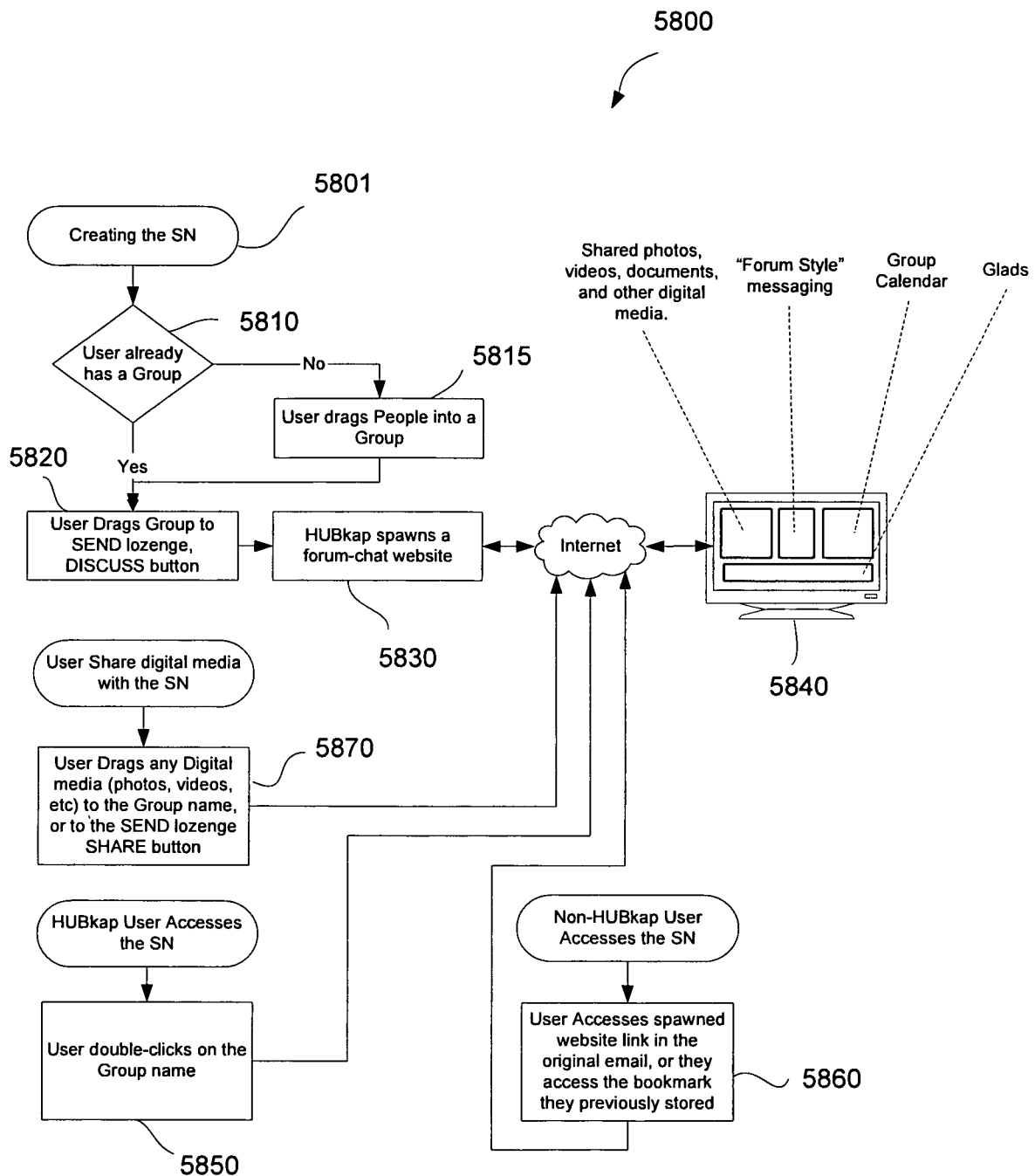
FIG. 58 shows an exemplary process for social networking.

FIG. 58 shows a process 5800 for creating a social network. When a user decides to create a social network 5801, they must first create a group 5810. A group includes a set of associated contacts stored in the system database under a common identifier. The group name is listed under the groups lozenge of each system user who is a member of the group. If a group does not exist, a user must first form a group before creating the social network 5815. As described above, a group may be formed simply by adding a group name to the group lozenge and dragging names of contacts from the people lozenge to the group name. As names are dragged to the group name on the group lozenge, the service provider system 110 automatically adds those names to the group and stores the associated with the group in the user database. When the group is being formed, or whenever a new member is added, the service provider system then creates and sends a message to each invited system user, such as, for example, "Bob Henderson has invited you to join the Boating group. Do you accept?" Two buttons are provided to accept or decline the invitation. The message appears in each potential group members read lozenge. Non system users are sent an e-mail with the invitation.

Once a group is formed, any user in the group may utilize the social networking feature by selecting the group name from the group lozenge and dragging the name to the discuss input on the send lozenge of the user interface 5820. In response, the system service provider spawns a website specific for the group 5830.

The spawned website 5840 is a custom webpage just for members of the group to facilitate communications and exchange of data between group members. When a group name is dragged to the discuss input, the application server 144 of the service provider system 110 creates a new instance in a server directory that is unique for the group. In one example, there may be only one instance of the webpage per group. A corresponding link, address, or identifier (e.g., a URL) is provided to all group members. All group members who are system users are notified of the creation of the group webpage via a message delivered to their read lozenge. If any group members are non-system users, the server automatically generates an e-mail that includes a link to access the system server, such as the groups unique URL. The non-system user may select the link or cut and pastes the link a standard web browser of their client device to access the group webpage via a communication link.

Selecting the link to the group webpage causes a browser to access the web page. Once a group webpage 5840 is created, the instance may be maintained as long as the group exists and/or the webpage is used. In one example, the system server 144 monitors access of the website to determine whether to maintain the instance of the group web page 5840 for access by the group members. In this example, the entry in the server directory may be removed after a predetermined period of time without access by any member of the group. For example, if no member of the group has accessed the group webpage for a predetermined period of time (e.g., 1 day, a week, or 30 days), the directory may be cleared and the link deleted.

Once the custom group website has been spawned, a user who is a member of the group may access the webpage using the group name from the group lozenge 5850. For example, the user may select the group name (e.g., using a cursor or pointer the user double click on the name with a user input device) to cause a browser to display the group webpage. Alternatively, a group member may select the link provided in the thread of the original invitation message provided in the read lozenge. A non-system user group member may access the group website by activating the link provided in the invitation e-mail sent to their email address, pasting the link in a browser address field, or by selecting a bookmark created by the non-system user during a previous viewing of the group webpage 5860. Once created, group members may access the group webpage to exchange digital content, engage in a chat with other members via a forum style messaging window, and access a group calendar, among other things 5870.

Figure 59:
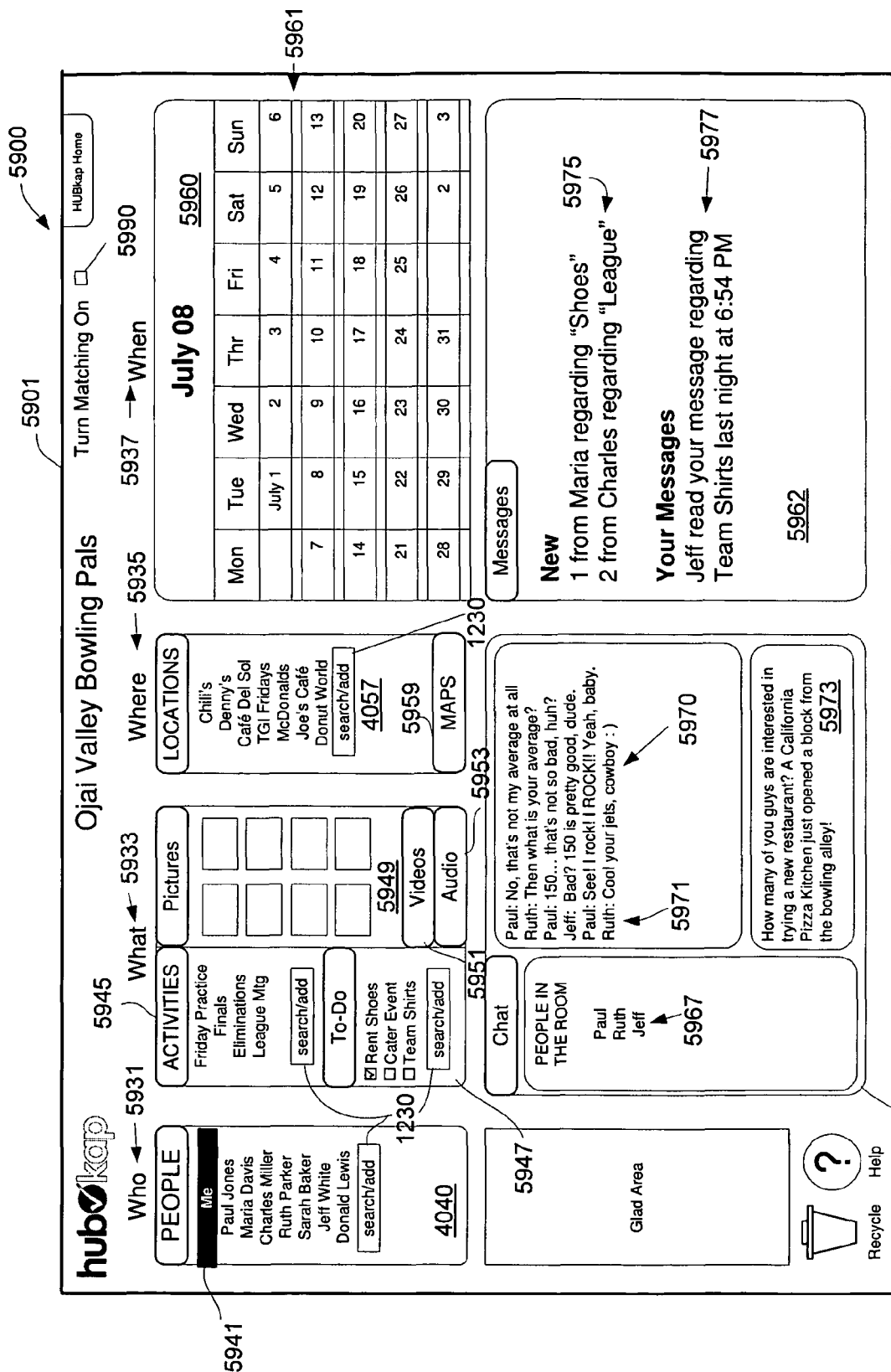
FIG. 59 shows an exemplary spawned website for social networking.

FIG. 59 shows an example 5900 of the user interface provided by the group webpage. The group webpage may be a modified version of the system user interface that is customized for the group. The webpage includes the group name 5901. The webpage also includes a group WHO 5931, a group WHAT 5933, a group WHERE 5935, and a group WHEN 5937 strip, as shown in FIG. 59.

The group WHO strip 5931 includes a people lozenge 5940 listing all members of the group. A me identifier 5941 is provided for the user viewing the group webpage 5901.

The group WHAT strip 5933 includes an activities lozenge 5945, a to-do lozenge 5947, a pictures lozenge 5949, a videos lozenge 5951, and an audio lozenge 5953. The activities lozenge 5945 is the same as described above with reference to the system user interface except that the lozenge only lists activities for the group. Similarly, the To-Do lozenge 5947 is the same as described above with reference to the system user interface except that the lozenge only lists to-do items of the group. Any group member may add to the lists using the search/add data entry fields as described above. The pictures lozenge 5949 includes identifiers 5955, such as a name, a thumbnail, an icon, or other indicators to identify pictures from group members. A user may select an identifier 5955 to cause a popup window to appear showing the picture. A user may select all or multiple identifiers 5955 to cause a popup window to engage in a slide show display of the pictures. A user may add photos for members of the group to view by dragging an identifier or file name of a picture stored in the user device to the picture lozenge 5949 causing a plugin of the user browser to access the picture file on the user device and automatically upload it to the service provider system 110 using any one of the existing automated file transfer protocols. If the picture file is already stored in the user database of the service provider system 110, a group link to the picture file is created for access via the group webpage 4001. Similarly, the video lozenge 5951 and audio lozenge 5953 may be used to provide and access video files and audio files. Of course a lozenge may be provided for any type of digital content, such as documents.

The group WHERE strip 5935 includes a locations lozenge 5957 and a maps lozenge 5959. These lozenges are the same as those described above except that they list locations and maps for the group.

The group WHEN strip 5937 includes a calendar lozenge 5960. The calendar lozenge 5960 provides a mini-calendar 5961 showing indications for all group events. The user may hold a cursor over any event indicator (not shown) to cause a popup window (not shown) to show more detailed information about the event or the user may select the calendar lozenge 5960 to expand over the message area 5962 to increase the size of the calendar. The user can schedule a group event by dragging an item from a lozenge to the calendar or selecting a date on the calendar.

The group webpage 5901 also includes a chat area 5965. The chat area 5965 includes a window 5967 displaying an indicator for each group member currently participating in a group chat. The chat area 5965 includes a dialog window showing a chat text communication 5970 and the originating group member 5971. A dialog window 5973 is provided. The dialog window 5973 may be used to enter characters for a chat communication to be displayed in the dialog window.

The group webpage 5901 also includes a message area 5962. The message area 5962 includes indicators 5975 of any new messages from group members to the user and the status 5977 of any messages sent to group members from the user. A user may select a message indicator causing a popup box with the message thread to be displayed.

A products and services branding area 5980 to display advertising (i.e., glads) and logos for business clients 120 (e.g. a system sponsor). This area 5980 also may be customized or used to promote a business for a sponsored user interface. The area may include identification of the business, such as a name, symbol, or logo. Selecting the business logo causes the user interface to open an additional browser to present the user with a website or other online content associated with the business. This area 4080 of the user interface also may provide advertising content including coupons.

The webpage 5900 also include an input 5990, such as a check or tick box, to activate or deactivate a social matching service. A user may select the box to activate social matching or deselect the box to deactivate the social matching service.

The system also has the ability to bring people together with a social matching service. As described above, each system user has an associated user profile. Included in the user profile are indications of various user interests, such as likes, activities, and hobbies. For each user interest the user is given the option of turning on a matching service for each specific interest. For example, a user "Bob Henderson" in his questionnaire may indicate user interest of bowling, square dancing, gospel music/choirs, and Mexican food. When answering the questionnaire or editing the user profile, a user may indicate for each interest whether to activate the matching service for each individual interest. In this example, Bob indicates matching for square dancing. To continue, Bob Henderson moves to Nampa, Id. Bob is really into square dancing, so he creates a group named "Nampa Square Dancing" and the drags all of his dancing buddies and partners into the group. Eager to find new square dancing buddies, Bob activates the matching service when creating the group. The service provider system determines that a group interest is dancing and searches the personal profile database of users within a vicinity of Bob. If the system determines any matches exist, the system introduces each match via a message. If both users select an affirmative answer, the system automatically adds the contact information of each user to the people lozenge of the other user. In addition, the newly identified user is added to the "Nampa Square Dancing" group.

Figure 60:
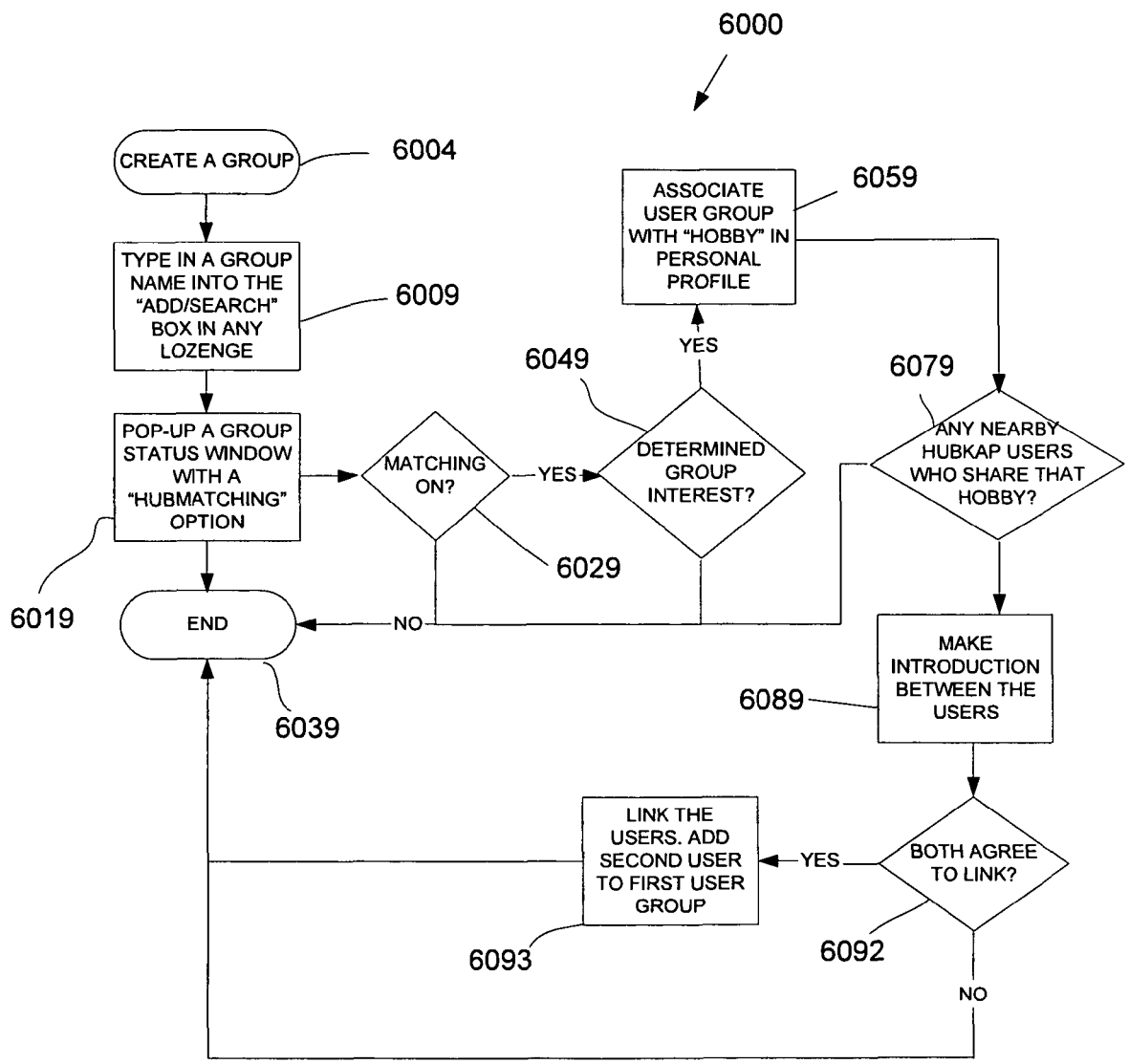
FIG. 60 shows an exemplary process for social matching.

FIG. 60 shows one exemplary process 6000 for the social matching service. In order to utilize the matching service the user creates a group 6001. The user types in the name of the group in the add/search box of the group lozenge 6009. The system responds by providing a group pop-up window providing an option to activate the matching service for the group 6019. The user decides whether or not to activate the matching service and creates the group 6029. If the user does not activate the matching service, the group is created as described above and the social matching process ends 6039.

If the user activates the matching service, the system attempts to determine a group interest 6049. For example, the system search for any interests of the users in the group for which matching is activated. The system also examines group data, such as the name of the group and any other data specific to the group that may identify interests of the group (e.g., listed activities, to-do items, and/or locations). The system may use an automated natural language interpreter and/or search tool to compare any identified group interest data with the identified interests of any user in the group. The system determines if a correlation was found. If a correlation between the group interest and a member interest is determined, the system stores one or more social identifiers associated with the group as the correlated interest 6069. If not, the social matching service ends 6039.

For example, a group with the name "Roath Racquet Club" has members listed with the interest tennis identified for matching. The system may determine that tennis and racquet correlate and store "tennis" as the club's social interest. In another example, a group with the name "Roath Bashers" may have members with the interest "tennis" identified for social matching. In the club's list of to-do items, the club may have an entry "buy tennis balls for practice" and/or the club locations may list "Roath Tennis Club" and "Pendleton Racquet Club." The system may determine that "tennis" for members interests combined with "buy tennis balls" and/or "Tennis club" or "Racquet Club" indicates the group social interest is "tennis," and stores "tennis" as the club's social interest. If the system is unable to determine a social interest, the process may end. Alternatively, if the system determines a correlation may exist and/or is unable to identify a correlation with certainty, the system may present a list of suspected interest for verification or selection by the group.

The system searches through the user profile database for users within a predetermined vicinity associated with the clubs determined social interest 6079. For example, the vicinity may be stored as a distance, a locality, a community, a state, a region, a nationality, or global. Virtual locations also may be specified. The system searches the profile database for system users with social interests matching the group social interest within the specified vicinity. For each identified user who is not already a group member, the system makes an introduction between the identified user and the group users through a message provided to each user 6089. If both users select an affirmative answer 6092, the system automatically adds the contact information of each user to the people lozenge of the other user 6093. In addition, the newly identified user is added to the list of users in the group. If not, the social matching process ends.

Figure 61:
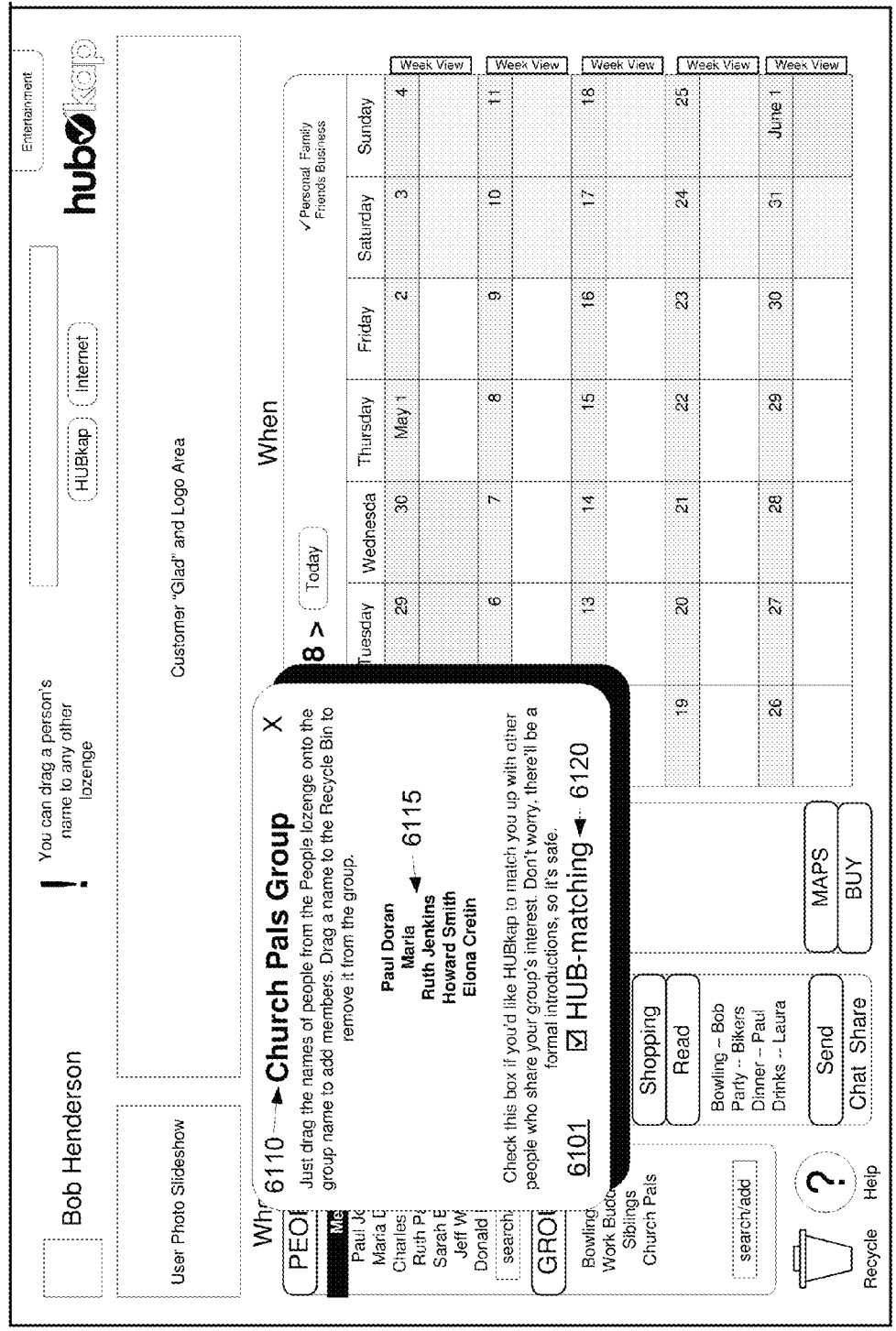
FIG. 61 shows an example of a popup window for social matching.

FIG. 61 shows an example 6100 of the pop-window 6101 that is presented to the user when first creating the group. The window 6101 lists the group name 6110 and members of the group 6115. An input 6120 is provided to activate the matching service. If the user selects the input with a user input device, the matching service is activated and the system attempts to identify a social interest for the group.

The service provider system described herein avoids problems associated with conventional social network sites by providing the user with greater control of their information and who they share information with. Since the system service provider maintains a contact list for each user within the system, the user is free to create groups at any time by simply making collections of those people.

The system service provider automatically spawns a custom website for any group created using the system. The group may be created from the user interface and the groups lozenge. Messages may be sent between group members using the multi-user chat interface provided by the custom website. In addition, video and images and other digital content may be shared between group members. The custom website associated with the group provide access to any messages sent to the group, any multi-user chat between group members, any shared videos or images, and any shared files. As a result, group members may access this information at any time; however, others people beyond the group are unable to access this information.

The group spawned website and social matching system provided herein has many advantages over conventional social networking websites. For example, fear about harassment, stalking, propositioning, molestation, and hassling is reduced because the group is hand-selected by a system service provider user. This is particularly valuable when kids are involved. Since groups are selected from among system users, concerns about shared images, videos, or files from becoming "public domain" or spread without authorization are minimized. Groups can be used by companies to share information in a free and open environment without worry about confidential information being exposed to the wrong eyes. Groups can be temporary and highly task based. For example, a group can be quickly created to organize a family reunion and share information. As a result, a social networking site may be spawned when needed, exist exactly until it is no longer needed, then be pulled down by system service provider so that the data is removed from the web. Because system service provider already has a personal profile on file for all users, participants in groups don't need to bother creating profiles. As a result, starting new groups is facilitated because of personal profile information already stored in the user database. For example, a person that wants to form a bowling league in Burbank Calif. can form a group Burbank Bowling. Invitations may then be sent to other users who list bowling as an interest and live in Burbank.

Groups are useful for many uses, including organizing, sharing images and videos, chatting and collaborating for: organizations such as soccer teams, bowling teams, school clubs, and church social groups; work related project teams; home projects, such as "remodel kitchen" or "clean out garage;" special events like "plan wedding," "organize Dad's surprise party," and "Bob's retirement party."

In addition, conventional sites often have problems associated with stalking because there is no way to ban "bad" or unwanted users. For example, if the user's account is closed, they just open another. Because the dynamic social system collects a lot of user data and if users are a paying customers in good stranding, system administrators can close an account of a misbehaving user, and, utilizing a user's personal information (e.g., a person's home phone number), not allow the user to open another account.

Travel

Figure 62:
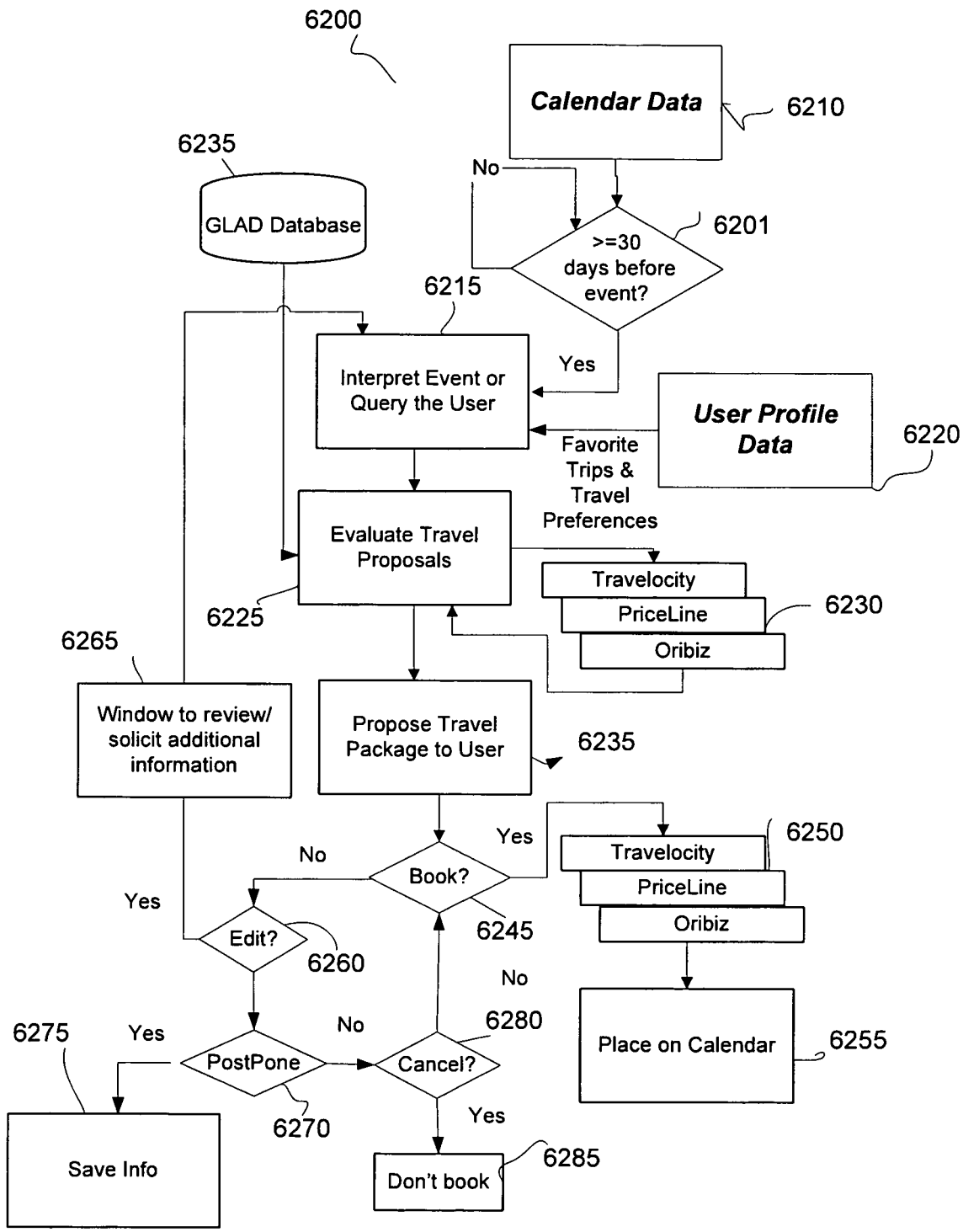
FIG. 62 shows an example a travel service booking process.

FIG. 62 shows an example of the logic implemented by the service provider system to aid system users in their travel. The user databases of the service provider system 110 store records and/or files of all user data and system partner data. Included in the user data are calendar events, to-do lists, shopping lists, activities, locations and all of the data associated with the various lozenges of the graphical user interface. In particular, events include information about activity, timing, content, location, event type, invitees, in addition to other timing information such as holidays, anniversaries, and birthdays. This information is continuously updated by the service provider systems. The system service provider uses this information to recommend and book travel for the user thereby relieving the user of some of the burden surrounding planning trips.

As shown in FIG. 62, a travel service 6200 of the service provider system 110 scans 6201 the calendar data 6210 for any events associated with a user occurring within a predetermined time frame or window (e.g., thirty days into the future from the current date). This timing may be modified by the system, a system administrator, and/or selected by the user during setup or editing of the system options associated with the user to another predetermined time period (e.g., 1 day, multiple day, by week, month, quarter, and year). The scanning 6201 may be done on a periodic basis, such as, for example, every predetermined number of seconds, minutes, hours, or on a daily basis.

For any event found by the system 110 scheduled during the predetermined time frame, the system 110 interprets and/or queries the user about the event 6215. The system 110 interprets the event by analyzing the event and its associated data stored in a record in the database, such as, for example, one or more of a name, notes, or descriptors, timing, activity, event type, location, associated groups is analyzed. The system 110 may extract or use words stored in the records as keywords to by parsed by a natural language interpreter (NLI) to analyze the event description, name, and other language associated with the event, and any of the event data (e.g., activity type holiday) or event type (e.g., vacation) to determine whether the event may require travel (e.g., a trip, a vacation, a business meeting in another city, state, or country, a group outing, such as a ski holiday, a family gathering, such as "Thanksgiving at Grandma's"). If the system determines with a predetermined confidence level that the event involves travel, the system 110 may evaluate the user profile data to find user favorite travel locations and travel preferences. If the system evaluates the event is very likely a trip, but is not certain, a pop-up window with a message indicating the type of trip the system has determined the user is planning may be presented (e.g., "Are you flying to Grandmother's for Thanksgiving?), or a message is generated to ask the user for confirmation of the event type. The popup window may include inputs "Yes" "No" "Cancel" that may be selected by the user to confirm the determination. If yes, the system continues. If No, the system can provide a window for review of the information the system is using to make its determination. The window may include fields that can be edited by the user to correct the data being used for the system evaluation and/or to focus the system in its search. If the user selects cancel, the system stops the evaluation process.

In addition, the system may interpret the other data stored in the system databases 6220 associated with the user to determine if the user may be travelling. For example, the system may analyze the to-do list for items (e.g., "Plan Family Ski Vacation to Colorado") or the shopping list ("Train tickets" or "New Suitcase") to determine if the user is planning travel.

The user profile data that a user entered when initiating their account or when updating their account includes information about the user interests, habits, and family, among other things. If the system determines the user is travelling, the system then uses the data to evaluate various travel proposals 6224. The system uses the user-names and the passwords stored in the user profile data base to log onto travel websites 6230 (e.g., Orbitz.com, Travelocity.com, and Priceline.com, USAir, Amtrak, Greyhound). The system gathers pricing and other information for the trip the user is planning. The system may gather various trip related information, such as flight information, train information, taxi, bus, and metro information, cruise information, lodging, and rental cars. The amount of information gathered may be set by user preferences or the type of trip (e.g., day travel, travel to a family member, distance traveled, time traveled, destination, duration of visit and such). The system 110 may be configured to try numerous variations (e.g., different flight days, times, and airports) in order to meet a particular user or system specified criteria, (e.g., to find the best possible deal, the shortest travel time, most direct travel, least change of carrier, amenities, discounts, bundled packages). The system also checks system partner GLAD database 6235 which stores coupons, incentives, and offers provided by partner businesses. These offers are offered for different amounts, different packages, at different calendar dates. The system then generates one or more travel packages and transmits them to the user interface based on its analysis of the travel site and Glad database 6235.

For example, the system may generate a pop up window titled "best deal to Europe" or message "Proposed Business Trip Plan to Zurich" to the read lozenge. The window may display the deals that the system has found and present them to the user. The window may include several choices presented, such as: lowest price, best match to user preferences, most flexible. In response, window or message may provide a number of user option inputs, such as "Book it," "Edit," "Postpone," or "Cancel," that may be selected by an input device of the user device 101. Alternatively, the window may be displayed in the Glad bar as Glad for selection by a user and rotated with the other Glads displayed there. If the user selects the travel Glad the popup window is then presented to the user.

If the user selects to book the trip 6245, the system re-logs onto the website or websites to access travel information or deal selected by the user and books the travel information selected using the user's credit card information 6250. The information is then saved to an event on the user calendar in the calendar database 6255.

If the user chooses edit 6260, the system provides a popup window in the graphical user interface 6265 listing the travel information in a number of fields the system used to prepare the proposed travel package. The user may change information in the fields (e.g., destination, duration, mode of travel (ground, air, rail, plane, bus, train, taxi, metro, ship, multi), carrier (e.g., United, British Airways, Lufthansa), time of travel, amenities, lodging, hotel, frequent traveler discounts (e.g., award miles), travel preferences and/or travel criteria, using a user input device of the user device 101. Various tick boxes to select or unselect criteria may be provided in addition to drop down menu pre-populated with most common choices. Text fields also may be provided to enter specific text information. The user input is then provided to the interpreter to change the information the system has been using to plan the trip and to reevaluate the trip based on the new information.

If the user wishes to postpone planning of the travel 6270, the user selects the postpone input and system saves the information used to evaluate the trip 6275. The system may then restart the evaluation process at a predetermined later time. If the user does not wish to postpone, the trip maybe cancelled 6280. The user also may select cancel to notify the system that they don't want the trip planned by the system, in which case the system does not preemptively attempt to plan/book the trip for the user 6285.

Entertainment

Figure 63:
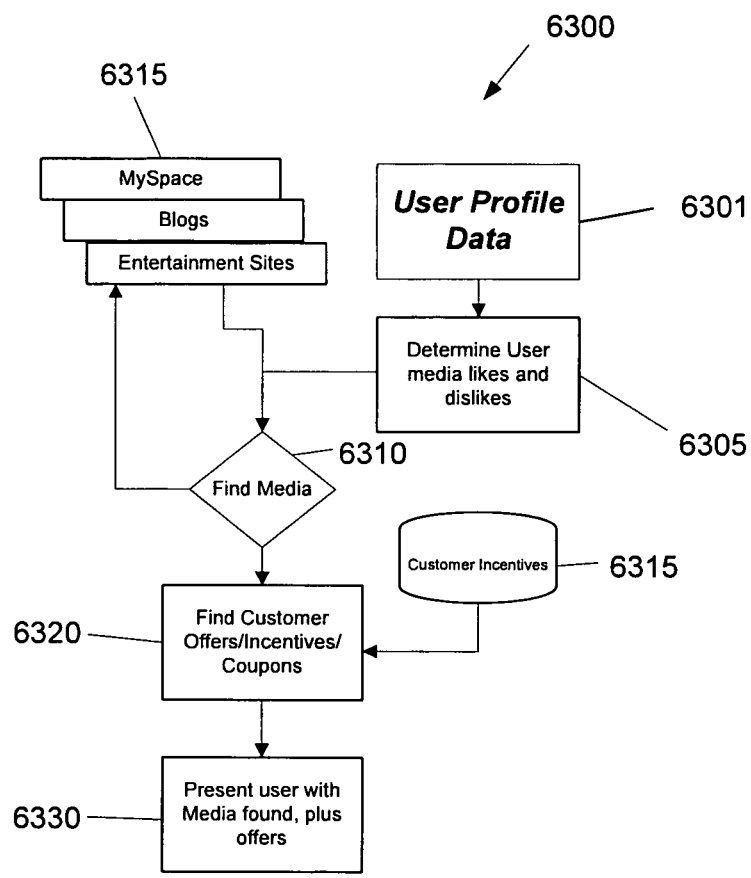
FIG. 63 shows an example media filtering process.

The system also may provide or suggest media and entertainment to user based on their user profile data and events on the calendar stored in the user database. As shown in FIG. 63, the system may provide user with a free media Channel service 6300 to provide suggested media to the user via the graphical user interface. The system uses the data stored in the user database, such as user profile data 6301, to determine user media likes and dislikes 6305. The system may use keywords found in the user profile and the various data associated with the user's lozenges, such as events, activities, locations, to-do items, shopping lists to determine preferences that match criteria, such as meta tags and keywords associated with the media available over the Internet. The system uses the compiled user information to search 6310 through a list of valid free-content websites 6315, such as MySpace, YouTube, Break.com, to harvest pictures, videos, music and audio files that match the determined keyword corresponding the user data. The system also looks at the customer Glad database 6315 to find offers/incentives/coupons that match the content found during the search 6320. For example, the user might enjoy videos of four-wheeled vehicles climbing extreme terrain. In this case, the system can find an ad, such as an ad from Ford for their new four-wheel drive vehicle. The user is shown the media "tv channel style" in a popup window or on the graphical user interface and the offers/incentives/coupons are interwoven in the content that is present, such as is customary with TV shows 6330.

Figure 64:
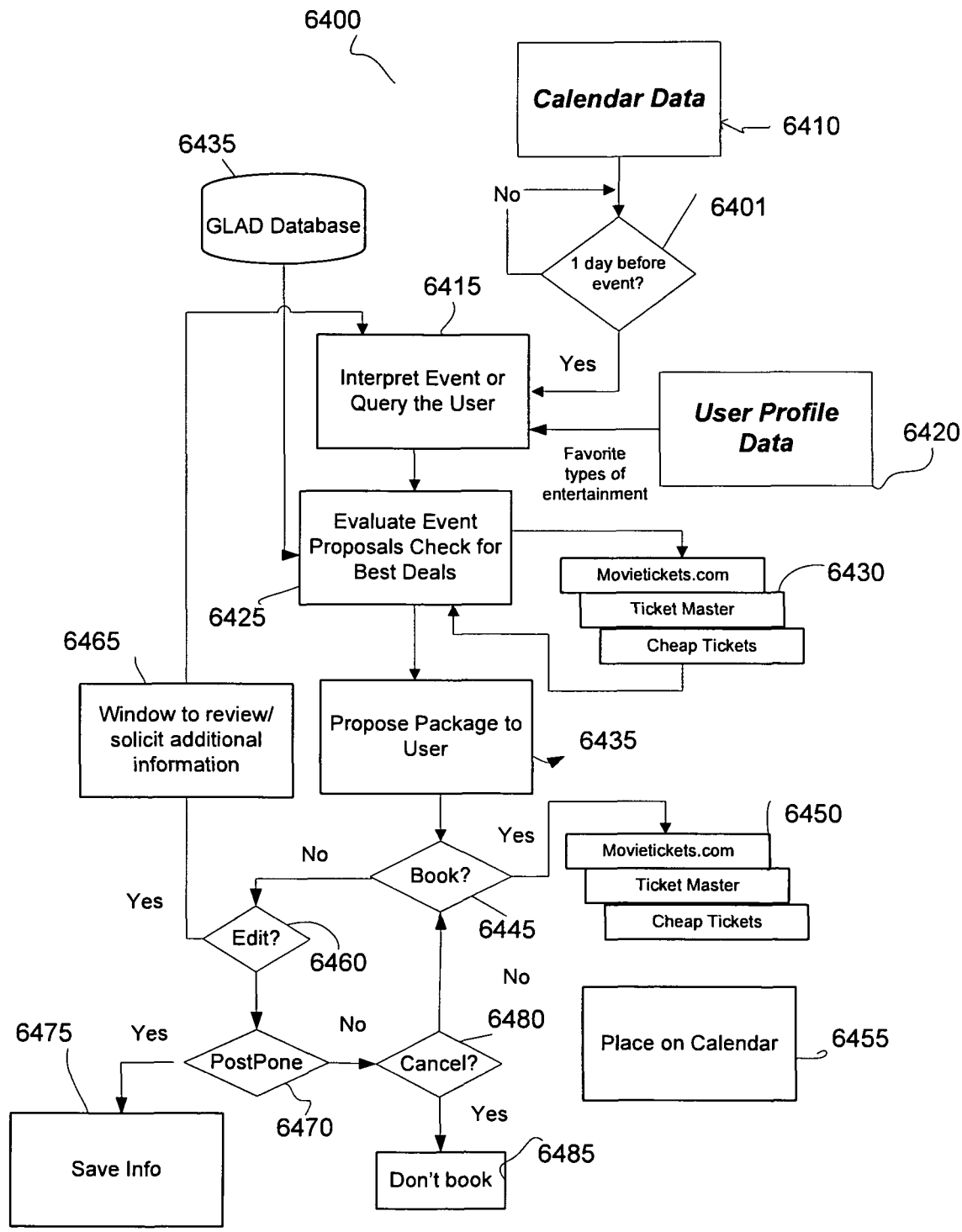
FIG. 64 shows an example an entertainment service booking process.

The system may also help plan entertainment events for a user as shown in FIG. 64. FIG. 64 shows an example of the logic implemented by the service system to aid system users in planning their entertainment. The user databases of the service provider system 110 stores records and/or files of all user data and system partner data. Included in the user data is calendar events, to-do list, shopping lists, activities, locations and all of the data associated with the various lozenges of the graphical user interface. In particular, events include information about activity, timing, content, location, event types, invitees, in addition to other timing information such as holidays, anniversaries, and birthdays. This information is continuously updated by the service provider system. The system service provider uses this information to recommend and book entertainment for the user thereby relieving the user of some of the burden surrounding planning of such events.

As shown in FIG. 64, an entertainment service 6400 of the service provider system 110 scans 6401 the calendar data 6410 for any events associated with a user occurring within a predetermined time frame or window (e.g., a day into the future from the current date). This timing may be modified by the system, a system administrator, and/or selected by the user during setup of the system options associated with the user (e.g., 1 day, multiple days, by week). The scanning 6401 may be done on a periodic basis, such as, for example, every predetermined number of seconds, minutes, hours, or on a daily basis.

For any event found by the system 110 scheduled during the predetermined time frame, the system 110 interprets and/or queries the user about the event 6415. The system 110 interprets the event by analyzing the event and its associated data, such as, for example, one or more of name, notes or descriptors, timing, activity, event type, location, associated groups is analyzed. The system 110 may use the NLI to analyze the event description, name, and other language associated with the event, and any of the event data (e.g., activity type movies) or event type (e.g., date night) to determine whether the event is associated with planning an entertainment outing or activity (e.g., a movie, a show, a dinner, a sporting event, a date, a meeting, a happy hour). If the system determines with a predetermined confidence level that the event involves an entertainment or outing, the system 110 may evaluate the user profile data to find user favorite entertainment types and preferences. If the system evaluates the event is very likely an entertainment event or outing, but is not certain, a pop-up window (e.g., "Are you going to dinner Friday Night?") or message is generated to ask the user for confirmation of the event type. The popup window may include inputs "Yes" "No" "Cancel" that may be selected by the user to confirm the determination. If yes, the system continues. If No, the system can provide a window to the user for review with the information the system is using to evaluate its determination. The window may have field that can be edited by the user to correct the data being used and/or to focus the system in its search. If the user selects cancel, the system stops the evaluation process.

In addition, the system may interpret the other data stored in the system databases 6420 associated with the user to determine if the user may be planning an entertainment related outing or activity. For example, the system may analyze the to-do list for items (e.g., "Plan Date") or the shopping list ("Movie tickets") to determine if the user is planning travel.

The user profile data that a user entered when initiating their account or when updating their account includes information about the user interests, habits, and family, among other things. During this analysis, the system also uses the user profile data in the decision making, for example, if the user has specified particular favorites (such as, type of entertainment, food, or things to do). If the system determines the user is planning an entertainment event, the system then uses the data to evaluate various proposals 6424. The system uses the user-names and the passwords stored in the user profile data base to log onto entertainment websites 62430 (e.g., Movietickets.com, Ticketmaster, E-bay, StubHub, Cheap tickets). The system gathers pricing and other information for the event the user is planning. The system may gather various other related information, such as restaurants nearby and transportation, (e.g., taxi, bus, and metro information). The amount of information gathered may be set my user preferences or the type of event. The system also checks system partner GLAD database 6435 which stores coupons, incentives, and offers provided by partner businesses. The system then generates one or more entertainment options and transmits them to the user interface based on its analysis of the websites and Glad database 6435.

For example, the system may generate a pop up window titled "cheap Football Tickets" or message "Proposed date night with wife" to the read lozenge. The window may display the deals that the system has found and present them to the user. The window may include several choices presented, such as: lowest price, best match to user preferences, most flexible. In response, window or message may provide a number of user option inputs, such as "Book it," "Edit," "Postpone," or "Cancel," that may be selected by an input device of the user device 101. Alternatively, the window may be displayed in the Glad bar as Glad for selection by a user and rotated with the other Glads displayed there. If the user selects the entertainment Glad the popup window is then presented to the user.

If the user selects to book the event 6445, the system re-logs onto the website, booking agency or event planner (e.g., Movietickets.com, Ticketmaster, Stubhub, or cheap tickets) to access entertainment or ticket information or deal selected by the user and books the event selected using the user's credit card information 6450. The information is then saved to an event on the user calendar in the calendar database 6455. If the user chooses edit 6460, the system provides a popup window in the graphical user interface 6465 listing the event information in a number of fields the system used to prepare the proposed entertainment package. The user may change information in the fields (e.g., event type, time, date, transportation, seat location, and preferences and/or criteria, using a user input device of the user device 101. Various tick boxes to select or unselect criteria may be provided in addition to drop down menu pre-populated with most common choices. Text fields also may be provided to enter specific text information. The user input is then provided to the interpreter to change the information the system has been using to plan the event and to reevaluate the event based on the new information.

System Databases

Figure 65:
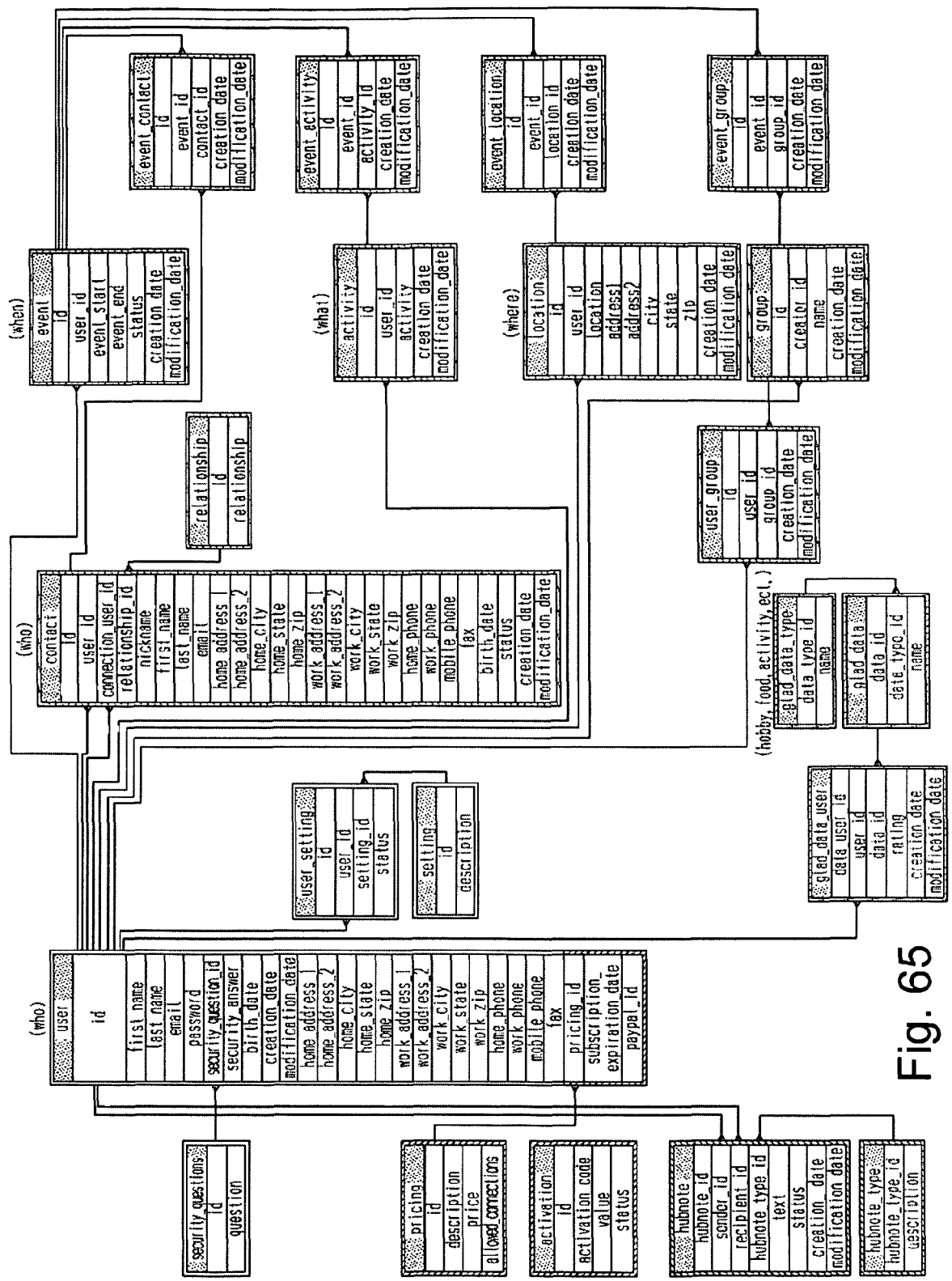
FIG. 65 shows an example of a database configuration for use with the system.

The system service provider provides powerful processing services, such as matching, focusing, Glad placement, and other dynamic customization of user interfaces. The databases provide organization of data stored for system users and partners. The databases as described above are part of the server system. An example of the database architecture and association between data sets is shown in FIG. 65. The databases include user profile, events, contacts, notifications, todos, events2contacts, groups, gladsdata, glads, gladcampaigns, publishers, adminusers. Other databases include clients, activation codes, global ids, glad action types, gladtypes, clients, activation codes, users, and reminders.

As shown in FIG. 65, the database includes a number of files and/or records associated with a user. In addition, certain records, such as may be associated with the contextual themes (e.g., Who, What, Where, and When) of the graphical user interface. Examples of the records for the user, contacts, user group, group, event groups, events, event contacts, event activity, event location, event group, relationship, user settings, setting, glad data user, glad data, glad data type pricing activation, hubnotes, hubnote type, are provided. Each record may be provided with an ID. In addition, other data is provided. For example, the user record includes personal information about the user such as name, password, birth date, security question, various addresses, such as home and work addresses, phone numbers, pricing type, subscription time, and payment type. In addition, the linking and/or hierarchy between record types is shown.

A number of exemplary implementations have been described. Nevertheless, it will be understood that various modifications may be made. For example, suitable results may be achieved if the steps of described techniques are performed in a different order and/or if components in a described components, architecture, or devices are combined in a different manner and/or replaced or supplemented by other components. Accordingly, other implementations are within the scope of the following claims.

What is claimed is:

1. A network system for serving digital content to a graphical user interface of a user device, the network system comprising:
   a user database configured to store data for a system user including:
   data indicating preferences of the system user, and
   a user calendar configured to store data indicating one or more events of the system user;
   an advertisement database configured to store a plurality of graphical advertisements (GLADs) comprising configurable digital data, the configurable digital data of each GLAD including an advertisement and a plurality of configurable filter conditions; the plurality of filter conditions of the GLAD being configured to at least one condition selected from a range of digitally selectable conditions, from general to specific, to target a particular aspect of the data of a system user stored by the system user database;
   one or more processing devices configured to automatically scan the user database to:
   determine a predetermined window of time in the future;

determine a scheduled time or date of an event stored by the user calendar in the user database;

determine whether the scheduled time or date of the event occurs during the predetermined window of time;

determine the event is associated with entertainment of the user;

access one or more entertainment services and evaluate content provided from the entertainment services with regard to the user data including the event when it is determined the scheduled time or date occurs during the predetermined window of time; and prepare content conveying an entertainment package customized for the event of the user based on the evaluated content;

determine whether the configurable filter conditions of any of the GLADs match the user data of the system user including the data indicating preferences of the system user and the data stored in the user calendar that is associated with the event; and cause the content conveying the entertainment package customized for the event of the user and one or more GLADS, each of the one or more GLADs having the configurable filter conditions that are determined to match the user data of the system user including the data indicating preferences of the system user and the data stored in the user calendar that is associated with the event, to be served as content configured for presentation by the graphical user interface.

2. The system of claim 1 wherein at least one of the one or more processing devices is configured to receive a response from the user device presenting the graphical user interface and automatically book the entertainment package in response.

3. The system of claim 1 wherein the entertainment package includes one or more of a movie ticket, a sporting event ticket, a show ticket, a event ticket of admission to an event, a dinner reservation.

4. The system of claim 1 wherein the entertainment services are one or more of a ticket agency, a website, a team, guest services, a promotional agency, and a discount service.

5. The system of claim 1 wherein the served content is configured to solicit a user response.

6. The system of claim 5 wherein the solicited response is one of book the entertainment package, edit the entertainment package, postpone booking the entertainment package, cancel the entertainment package, and access online content associated with at least one of the one or more served GLADs.

7. The system of claim 2 wherein at least one of the one or more processing devices is configured to save the package information in the database in association with the event.

8. The system of claim 1 wherein at least one of the one or more processing devices is configured to process a record stored in the database associated with the event to determine one or more keywords associated with the event to determine the event is associated with entertainment.

9. A method for serving digital content from a network system including a user database, one or more processing devices and a server to a user device for presentation on a graphical user interface of the user device, the method comprising:

storing, in the user database of the system, data for a system user including:
data indicating preferences of the system user, and
a user calendar including data indicating one or more user events the system user;

storing, in an advertisement database, a plurality of graphical advertisements (GLADs) comprising configurable digital data, the configurable digital data of each GLAD including an advertisement and a plurality of configurable filter conditions; the plurality of filter conditions of the GLAD being configured to at least one condition selected from a range of digitally selectable conditions, from general to specific, to target a particular aspect of the data of a system user stored by the system user database;

automatically scanning the database by at least one of the one or more processing devices to determine a scheduled time of an event stored by the calendar in the user database, a predetermined window of time in the future, and whether the scheduled time or date of the event-occurs during the predetermined window of time;

automatically determining by at least one of the one or more processing devices that the event is associated with entertainment;

accessing by at least one of the one or more processing devices one or more entertainment services with regard to the user data including the event when it is determined the scheduled time or date occurs during the predetermined window of time;

evaluating by at least one of the one or more processing devices entertainment content provided from the entertainment services for the event;

determining by at least one of the one or more processing devices whether the configurable filter conditions of any of the GLADs match the user data of the system user including the data indicating preferences of the system user and the data stored in the user calendar that is associated with the event;

preparing by at least one of the one or more processing devices content conveying a entertainment package customized for the event of the user based on the evaluated content; and causing by at least one of the one or more processing devices the content conveying the entertainment package customized for the event of the user and one or more GLADS, each of the one or more GLADs having the configurable filter conditions that are determined to match the user data of the system user including the data indicating preferences of the system user and the data stored in the stored in the user calendar that is associated with the event, to be served as content configured for presentation by the graphical user interface of the user device.

10. The method of claim 9 further comprising receiving a response from the user device presenting the graphical user interface, wherein at least one of the one or more processing devices is configured to automatically book the entertainment package in response.

11. The method of claim 9 wherein the entertainment package includes one or more of a movie ticket, a sporting event ticket, a show ticket, a event ticket of admission to an event, and a dinner reservation.

12. The method of claim 9 wherein the entertainment services are one or more of a ticket agency, a website, a team, guest services, a promotional agency, and a discount service.

13. The method of claim 9 wherein the served content is configured to solicit a user response.

14. The method of claim 13 wherein the solicited response is one of book the entertainment package, edit the entertainment package, postpone booking the entertainment package, cancel the entertainment package, and access online content associated with at least one of the one or more served GLADs.

15. The method of claim 10 further comprising saving the package information in the user database in association with the event.

16. The method of claim 9 further comprising processing a record stored in the user database associated with the event to determine the event is associated with entertainment.

17. The system of claim 1 wherein the configurable filter conditions of a GLAD include a who filter condition configured to target data associated with preferences or demographics of the system user; a what filter condition configured to target activities the system user engages in; a when filter condition configured to target a time, a date, or a time period; a where filter condition configured to target a location associated with the system user.

18. The system of claim 17 wherein at least one of the one or more processing devices is configured to determine whether the configurable filter conditions of a GLAD match the who filter condition, the what filter condition, the when filter condition, and the where filter condition.

19. A network system for serving digital content to a graphical user interface of a user device, the network system comprising:
- a user database configured to store user data for a system user including:
  - data indicating preferences of the system user, and
  - an event of the system user scheduled in a calendar of the system user;
- a user calendar configured to stored data indicating one or more events of the system user;
- an advertisement database configured to store a plurality of graphical advertisements (GLADs) comprising configurable digital data, the configurable digital data of each GLAD including a plurality of configurable filter conditions; the plurality of filter conditions of the GLAD being configured to at least one condition selected from a range of digitally selectable conditions, from general to specific, to target a particular aspect of the data of a system user stored by the system user database,
- a one or more processors configured to automatically scan the user database, to determine the scheduled event occurs during a predetermined window of time; to determine the event is associated with entertainment of the user; to access one or more entertainment services, to prepare content conveying an entertainment package customized for the scheduled event of the user, and to determine whether the configurable filter conditions of any of the GLADs match the user data of the system user stored by the user database including the data indicating preferences of the system user and the data stored in the calendar that is associated with the event; and
- a server configured to serve the content conveying the entertainment package customized for the event of the user and one or more GLADS, each of the one or more GLADs having the one or more filter conditions that are determined to match the user data of the system user including the data indicating preferences of the system user and the data stored in the stored in the user calendar that is associated with the event, to be served as content configured for presentation by the graphical user interface.

20. The system of claim 1 wherein the plurality of configurable filter conditions include two or more of a who filter condition target data associated with preferences or demographics of the network system user; a what filter condition target activities the network system user engages in; a when filter condition target a time, a date, or a time period; a where filter condition target a location associated with the network system user.

21. The method of claim 9 wherein storing a plurality of graphical advertisements (GLADs) in an advertisement database, includes storing the plurality of configurable filter conditions include two or more of: a who filter condition target data associated with preferences or demographics of the network system user; a what filter condition target activities the network system user engages in; a when filter condition target a time, a date, or a time period; a where filter condition target a location associated with the network system user.

22. The system of claim 1 wherein the advertisement comprises digital content or a link configured to point to where to access the digital content.

23. The method of claim 9 wherein the advertisement comprises digital content or a link configured to point to where to access the digital content.

\* \* \* \* \*